United States Patent
Jang et al.

(10) Patent No.: US 12,381,693 B2
(45) Date of Patent: Aug. 5, 2025

(54) DEVICE AND METHOD FOR TRANSMITTING OR RECEIVING CONTROL INFORMATION AND DATA IN COMMUNICATION SYSTEM

(71) Applicant: Samsung Electronics Co., Ltd., Gyeonggi-do (KR)

(72) Inventors: Youngrok Jang, Gyeonggi-do (KR); Seho Myung, Gyeonggi-do (KR); Ameha Tsegaye Abebe, Gyeonggi-do (KR); Seongmok Lim, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 313 days.

(21) Appl. No.: 17/957,810

(22) Filed: Sep. 30, 2022

(65) Prior Publication Data
US 2023/0114410 A1  Apr. 13, 2023

(30) Foreign Application Priority Data
Sep. 30, 2021  (KR) .................. 10-2021-0130169

(51) Int. Cl.
*H04L 5/00* (2006.01)
*H04L 1/00* (2006.01)
*H04L 27/36* (2006.01)

(52) U.S. Cl.
CPC .......... *H04L 5/0057* (2013.01); *H04L 1/0003* (2013.01); *H04L 27/36* (2013.01)

(58) Field of Classification Search
CPC ..... H04L 1/0003; H04L 1/0016; H04L 27/36; H04L 5/0057
See application file for complete search history.

(56) References Cited

U.S. PATENT DOCUMENTS

| | | | |
|---|---|---|---|
| 10,079,654 B2* | 9/2018 | Xia | H04L 5/0057 |
| 11,395,286 B2* | 7/2022 | Bae | H04W 72/23 |
| 11,463,191 B2* | 10/2022 | Chen | H04L 5/0044 |
| 11,705,981 B2* | 7/2023 | Shao | H04B 7/0632 |
| | | | 370/329 |
| 2015/0195819 A1* | 7/2015 | Kwon | H04L 1/0026 |
| | | | 370/329 |

(Continued)

FOREIGN PATENT DOCUMENTS

| | | |
|---|---|---|
| EP | 3 462 654 | 4/2019 |
| KR | 10-2022-0010399 | 1/2022 |

OTHER PUBLICATIONS

International Search Report dated Jan. 10, 2023 issued in counterpart application No. PCT/KR2022/014861, 9 pages.

*Primary Examiner* — Dung B Huynh
(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. A method performed by a terminal in a wireless communication system includes receiving, from a base station, channel state information (CSI) report configuration information including a channel quality indicator (CQI) table-related parameter, identifying a CQI table to be used based on the CQI table-related parameter, and transmitting, to the base station, a CQI index using the CQI table. A maximum modulation scheme of the CQI table is 4096 quadrature amplitude modulation (QAM).

20 Claims, 17 Drawing Sheets

(56) References Cited

U.S. PATENT DOCUMENTS

| | | | | |
|---|---|---|---|---|
| 2015/0312071 | A1* | 10/2015 | Chen | H04L 1/0003 |
| | | | | 370/329 |
| 2016/0323912 | A1* | 11/2016 | Nakamura | H04B 7/0626 |
| 2016/0337073 | A1 | 11/2016 | Kim et al. | |
| 2017/0207878 | A1 | 7/2017 | Chen et al. | |
| 2019/0238257 | A1* | 8/2019 | Hosseini | H04L 1/001 |
| 2020/0036394 | A1* | 1/2020 | Shinohara | H04L 27/00 |
| 2020/0077414 | A1 | 3/2020 | Ye et al. | |
| 2020/0106550 | A1* | 4/2020 | Yoshimoto | H04L 1/0026 |
| 2020/0204289 | A1* | 6/2020 | Yoshimoto | H04L 1/0025 |
| 2020/0313795 | A1* | 10/2020 | Xu | H04L 1/1812 |
| 2020/0351008 | A1* | 11/2020 | Shao | H04L 1/0009 |
| 2020/0412431 | A1* | 12/2020 | Park | H04B 7/0469 |
| 2021/0168829 | A1* | 6/2021 | Lee | H04L 5/0053 |
| 2021/0194622 | A1* | 6/2021 | Takeda | H04L 1/0003 |
| 2021/0320776 | A1* | 10/2021 | Aiba | H04L 1/0061 |
| 2021/0351821 | A1* | 11/2021 | Elshafie | H04B 7/0486 |
| 2022/0021474 | A1* | 1/2022 | Yang | H04L 1/0009 |
| 2022/0173829 | A1* | 6/2022 | Huang | H04L 1/0004 |
| 2022/0321250 | A1* | 10/2022 | Kim | H04B 7/0632 |
| 2022/0352902 | A1* | 11/2022 | Jeong | H03M 13/271 |
| 2023/0064653 | A1* | 3/2023 | Elshafie | H04L 1/0003 |
| 2023/0065810 | A1* | 3/2023 | Elshafie | H04L 1/0025 |
| 2023/0114410 | A1* | 4/2023 | Jang | H04L 1/0016 |
| | | | | 370/329 |
| 2023/0283429 | A1* | 9/2023 | Park | H04L 1/1854 |
| | | | | 370/329 |
| 2024/0121025 | A1* | 4/2024 | Zhang | H04W 52/262 |
| 2024/0259880 | A1* | 8/2024 | Echigo | H04L 1/0003 |
| 2024/0275515 | A1* | 8/2024 | Xuan | H04L 1/0016 |
| 2024/0388378 | A1* | 11/2024 | Myung | H04L 1/0016 |

\* cited by examiner

DEVICE AND METHOD FOR TRANSMITTING OR RECEIVING CONTROL INFORMATION AND DATA IN COMMUNICATION SYSTEM

CROSS-REFERENCE TO RELATED APPLICATION(S)

This application is based on and claims priority under 35 U.S.C. § 119 to Korean Patent Application No. 10-2021-0130169, filed on Sep. 30, 2021, in the Korean Intellectual Property Office, the disclosure of which is incorporated herein by reference in its entirety.

BACKGROUND

1. Field

The disclosure relates generally to a communication or broadcasting system and, more particularly, to a device and method for transmitting or receiving control and data information in a communication or broadcasting system.

2. Description of Related Art 5G mobile communication technologies define broad frequency bands such that high transmission rates and new services are possible, and can be implemented not only in "Sub 6 GHZ" bands such as 3.5 GHZ, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

However, the prior art lacks a technology for transmitting/receiving control information based on a channel quality indicator (CQI) and modulation coding scheme (MCS) table in a wireless communication system, which results in inaccurate channel quality reporting.

As such, there is a need in the art for improved CQI and MCS tables in order to determine a combination of modulation and coding techniques and to accurately report a channel quality according to target transmission or reception error probability required for efficient communication in fourth generation (4G), 5G, or beyond 5G communication systems.

SUMMARY

Aspects of the disclosure are to address at least the above-mentioned problems and/or disadvantages and to provide at least the advantages described below. Accordingly, an aspect of the disclosure is to provide a device and a method for generating (or configuring) a modulation and coding scheme (MCS) table and a channel quality indicator (CQI) used for supporting of 4096 quadrature amplitude modulation (QAM) in a communication system.

Another aspect of the disclosure is to provide a method of determining associated limited buffer rate matching (LBRM), phase tracking reference signal (PT-RS), and processing time if supporting of 4096 QAM is allowed in the communication system.

In accordance with an aspect of the disclosure, a method performed by a terminal in a wireless communication system is provided. The method includes receiving, from a base station, channel state information (CSI) report configuration information including a channel quality indicator (CQI) table-related parameter; identifying a CQI table to be used based on the CQI table-related parameter; and transmitting, to the base station, a CQI index using the CQI table. A maximum modulation scheme of the CQI table is 4096 quadrature amplitude modulation (QAM).

In accordance with another aspect of the disclosure, a method performed by a base station in a wireless communication system is provided. The method includes determining a CQI table to be used for a terminal; transmitting, to the terminal, CS) report configuration information including a CQI table-related parameter indicating the CQI table; and receiving, from the terminal, a CQI index associated with the CQI table. A maximum modulation scheme of the CQI table is 4096 QAM.

In accordance with another aspect of the disclosure, a terminal in a wireless communication system is provided. The terminal includes a transceiver and a controller. The controller is configured to receive, from a base station via the transceiver, CSI report configuration information including a CQI table-related parameter, identify a CQI table to be used based on the CQI table-related parameter, and transmit, to the base station via the transceiver, a CQI index using the CQI table. A maximum modulation scheme of the CQI table is 4096 QAM.

In accordance with another aspect of the disclosure, a base station in a wireless communication system is provided. The base station includes a transceiver and a controller. The controller is configured to determine a CQI table to be used for a terminal, transmit, to the terminal via the transceiver, CSI report configuration information including a CQI table-related parameter indicating the CQI table, and receive, from the terminal via the transceiver, a CQI index associated with the CQI table. A maximum modulation scheme of the CQI table is 4096 QAM.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
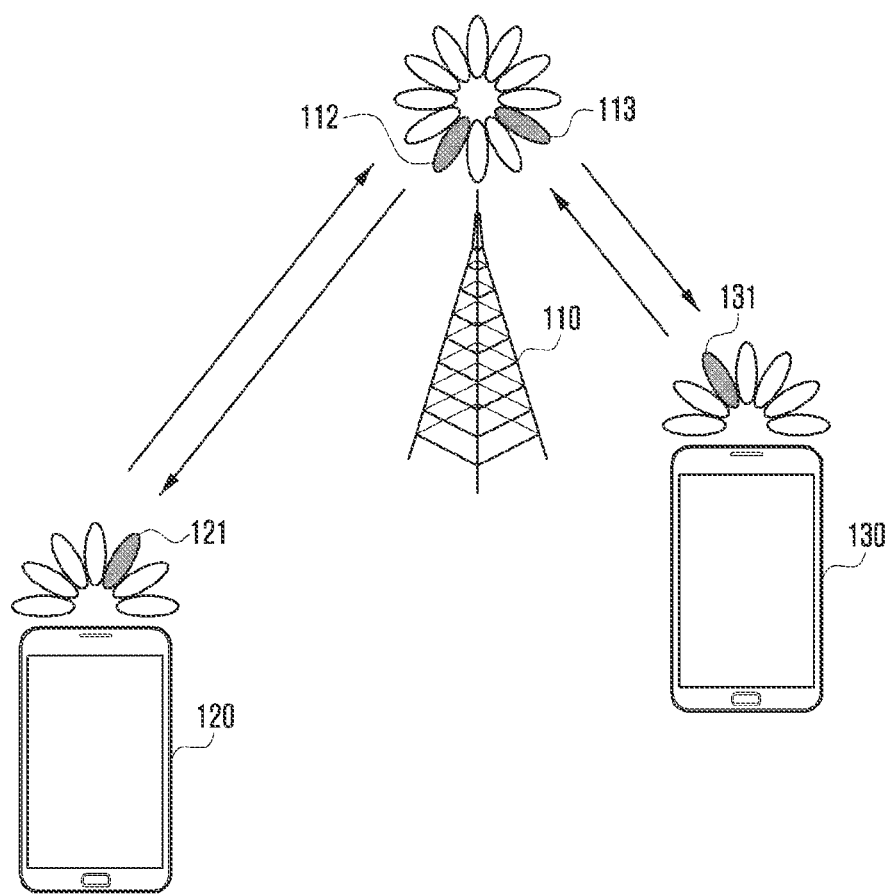
FIG. 1 illustrates a wireless communication system according to an embodiment.

Embodiments of the disclosure will be described in detail with reference to the accompanying drawings. In describing the disclosure, a detailed description of known functions or configurations incorporated herein will be omitted for the sake of clarity and conciseness. The terms which will be described below are terms defined in consideration of the functions in the disclosure, and may be different according to users, intentions of the users, or customs. Therefore, the definitions of the terms should be made based on the contents throughout the specification.

However, based on determinations by those skilled in the art, the main idea of the disclosure may also be applied to other communication systems having similar technical backgrounds through some modifications without significantly departing from the scope of the disclosure. For reference, the meaning of the term "communication system" generally includes a broadcast system, but in the disclosure, a communication may be definitely referred to as a broadcast system when the main service of the communication system is a broadcast service.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. Throughout the specification, the same or like reference numerals designate the same or like elements.

Embodiments of the disclosure will be described based on an approach of hardware. However, various embodiments of the disclosure include a technology that uses both hardware and software.

In the following description, terms for identifying access nodes, referring to network entities, referring to messages, referring to interfaces between network entities, and referring to various identification information, are illustratively used for the sake of convenience. Therefore, the disclosure is not limited by the terms as used below, and other terms referring to subjects having equivalent technical meanings may be used.

An element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Embodiments will be described using terms and names defined in some communication standards (e.g., the 3rd generation partnership project (3GPP)). However, this is merely for the purpose of illustration, and embodiments of the disclosure may be easily applied to other communication systems through modifications.

FIG. 1 illustrates a wireless communication system according to an embodiment.

FIG. 1 illustrates a base station 110, a terminal 120, and a terminal 130, as some of nodes using a wireless channel in a wireless communication system. FIG. 1 illustrates only one base station, but may further include another base station that is the same as or similar to the base station 110.

The base station 110 is a network infrastructure that provides radio access to the terminals 120 and 130. The base station 110 has coverage defined as a certain geographic area, based on a distance over which a signal may be transmitted.

The base station 110 may also be referred to as access point (AP), eNodeB (eNB), 5th generation node (5G node), wireless point, transmission/reception point (TRP), or other terms having an equivalent technical meaning.

Each of the terminal 120 and the terminal 130 is used by a user, and performs communication with the base station 110 via a wireless channel. In some cases, at least one of the terminal 120 and the terminal 130 may be operated without involvement of a user. That is, if at least one of the terminal 120 and the terminal 130 performs machine type communication (MTC), the terminal may not be carried by a user. Each of the terminal 120 and the terminal 130 may be referred to as user equipment (UE), mobile station, subscriber station, remote terminal, wireless terminal, user device or other terms having an equivalent technical meaning.

The base station 110, the terminal 120, and the terminal 130 may transmit and receive radio signals in a millimeter wave band (e.g., 28 GHz, 30 GHz, 38 GHZ, and 60 GHz). In this case, in order to improve a channel gain, the base station 110, the terminal 120, and the terminal 130 may perform beamforming. The beamforming may include transmission beamforming and reception beamforming.

That is, the base station 110, the terminal 120, and the terminal 130 may assign a directivity to a transmission signal or a reception signal. To this end, the base station 110 and the terminals 120 and 130 may select serving beams 112, 113, 121, and 131 via a beam search procedure or a beam management procedure. After the serving beams 112, 113, 121, and 131 are selected, communication may then be performed via resources that are in quasi co-located (QCL) relationships with resources at which the serving beams 112, 113, 121, and 131 are transmitted.

If large-scale characteristics of a channel, via which a symbol on a first antenna port has been transferred, can be inferred from a channel via which a symbol on a second antenna port has been transferred, it may be determined that the first antenna port and the second antenna port are in a QCL relationship.

For example, the large-scale characteristics may include at least one among a delay spread, a Doppler spread, a Doppler shift, an average gain, an average delay, and a spatial receiver parameter.

Figure 2:
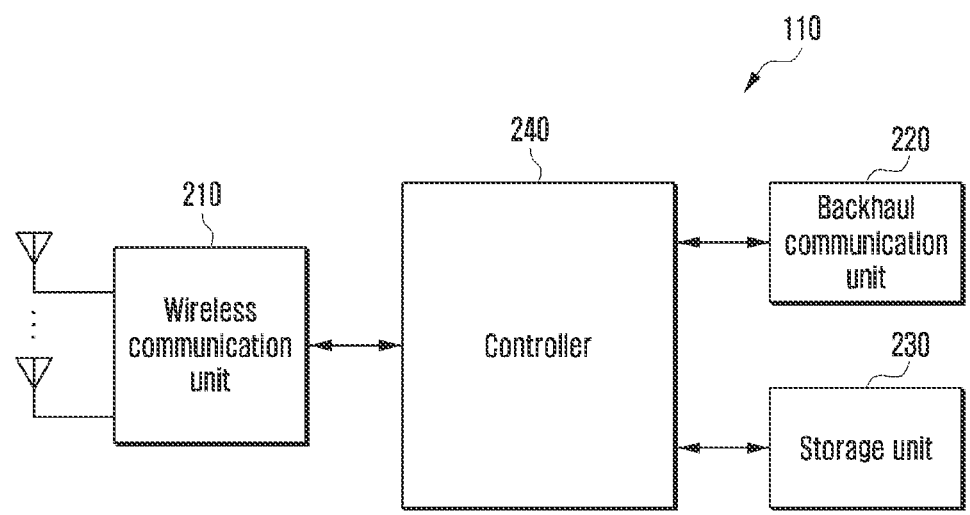
FIG. 2 illustrates a configuration of a base station in the wireless communication system according to an embodiment.

FIG. 2 illustrates a configuration of a base station in the wireless communication system according to an embodiment.

The configuration illustrated in FIG. 2 may be understood as that of the base station 110. The terms . . . unit, . . . device, etc. used hereinafter refer to a unit configured to process at least one function or operation, and may be implemented as hardware, software, or a combination of hardware and software.

Referring to FIG. 2, the base station includes a wireless communication unit 210, a backhaul communication unit 220, a storage unit 230, and a controller 240.

The wireless communication unit 210 transmits or receives a signal through a wireless channel. For example, the communication unit 210 performs conversion between a baseband signal and a bitstream according to a physical layer standard of the system. When transmitting data, the wireless communication unit 210 generates complex symbols by encoding and modulating a transmission bitstream. When receiving data, the wireless communication unit 210 restores a received bitstream by demodulating and decoding the baseband signal.

The wireless communication unit 210 up-converts the baseband signal to a radio frequency (RF) band signal, transmits the up-converted RF band signal via an antenna, and then down-converts the RF band signal received via the antenna to a baseband signal. For example, the wireless communication unit 210 may include a transmission filter, a reception filter, an amplifier, a mixer, an oscillator, a digital-to-analog converter (DAC), an analog-to-digital converter (ADC), multiple transmission/reception paths and at least one antenna array including multiple antenna elements.

In terms of hardware, the wireless communication unit 210 may include a digital unit and an analog unit, wherein the analog unit includes multiple sub-units according to an operating power, an operating frequency, and the like. The digital unit may be implemented as at least one digital signal processor (DSP).

The wireless communication unit 210 transmits and receives a signal as described above. Accordingly, all or a part of the wireless communication unit 210 may be referred to as transmitter, receiver, or transceiver. Herein, transmission and reception performed via a wireless channel may include processing performed as described above by the wireless communication unit 210, which may perform functions to transmit or receive a signal by using wired communication.

The backhaul communication unit 220 provides an interface that performs communication with other nodes within a network. That is, the backhaul communication unit 220 converts, into a physical signal, a bitstream transmitted from the base station to another access node, another base station, a higher node, a core network, etc., and converts a physical signal received from another node into a bitstream.

The storage unit 230 stores data, such as a basic program, an application program, and configuration information, for operations of the base station. The storage unit 230 may include a volatile memory, a nonvolatile memory, or a combination of a volatile memory and a nonvolatile memory. The storage unit 230 provides stored data in response to a request of the controller 240.

The controller 240 controls overall operations of the base station. For example, the controller 240 transmits and receives a signal via the wireless communication unit 210 or the backhaul communication unit 220. The controller 240 records and reads data in the storage unit 230. The controller 240 may perform functions of a protocol stack required by a communication standard. The protocol stack may be included in the wireless communication unit 210. To this end, the controller 240 may include at least one processor.

The controller 240 may transmit control information to or receive control information from the terminal 120. For example, the controller 240 may control the base station to perform operations to be described later herein.

Figure 3:
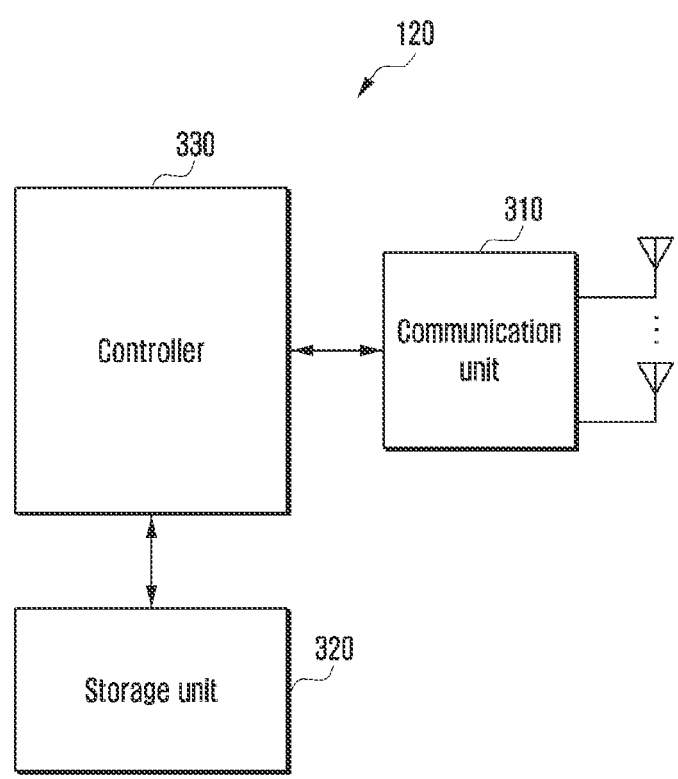
FIG. 3 illustrates a configuration of a terminal in the wireless communication system according to an embodiment.

FIG. 3 illustrates a configuration of a terminal in the wireless communication system according to an embodiment. The configuration illustrated in FIG. 3 may be understood as that of the terminal 120. The terms . . . unit, . . . device, etc. used hereinafter refer to a unit configured to process at least one function or operation, and may be implemented as hardware, software, or a combination of hardware and software.

Referring to FIG. 3, the terminal may include a communication unit 310, a storage unit 320, and a controller 330.

The communication unit 310 performs functions to transmit or receive a signal via a wireless channel. For example, the communication unit 310 performs conversion between a baseband signal and a bitstream according to a physical layer standard of the system. For example, when data is transmitted, the communication unit 310 generates complex symbols by encoding and modulating a transmission bitstream. When data is received, the communication unit 310 restores a received bitstream by decoding and demodulating a baseband signal. The communication unit 310 up-converts a baseband signal into an RF band signal, transmits the up-converted RF band signal via an antenna, and then down-converts the RF band signal received via the antenna into a baseband signal. The communication unit 310 may include a transmission filter, a reception filter, an amplifier, a mixer, an oscillator, a DAC, an ADC, and the like.

The communication unit 310 may include multiple transmission/reception paths and at least one antenna array including multiple antenna elements. In terms of hardware, the communication unit 310 may include a digital circuit and a radio frequency integrated circuit (RFIC). The digital circuit and the analog circuit may be implemented in a single package. The communication unit 310 may include multiple RF chains and may perform beamforming.

The communication unit 310 may include multiple communication modules to process signals of different frequency bands and to support multiple different radio access technologies. For example, different wireless access technologies may include Bluetooth low energy (BLE), wireless fidelity (Wi-Fi), Wi-Fi gigabyte (WiGig), and a cellular network (e.g., long term evolution (LTE)). Different frequency bands may include a super high frequency (SHF) (e.g., 2.5 Ghz and 5 Ghz) band and a millimeter wave (mm wave) (e.g., 60 GHz) band.

The communication unit 310 transmits and receives a signal as described above. Accordingly, all or a part of the communication unit 310 may be referred to as a transmitter, receiver, or transceiver. In the following description, transmission and reception performed via a wireless channel are used in a sense including processing performed as described above by the wireless communication unit 310. The communication unit 310 may perform functions to transmit or receive a signal by using wired communication.

The storage unit 320 stores data, such as a basic program, an application program, and configuration information, for operations of the terminal. The storage unit 320 may include one or both of a volatile memory and a nonvolatile memory. The storage unit 320 provides stored data in response to a request of the controller 330.

The controller 330 controls overall operations of the terminal. For example, the controller 330 transmits and receives a signal via the communication unit 310. The controller 330 records and reads data in the storage unit 320. The controller 330 may perform functions of a protocol stack required by the communication standard. To this end, the controller 330 may include at least one processor or a micro-processor, or may be a part of a processor. A part of the communication unit 310 and the controller 330 may be referred to as a communication processor (CP).

The controller 330 may transmit control information to or receive control information from the terminal 110. For example, the controller 330 may control the terminal to perform operations according to embodiments \ to be described later herein.

Figure 4A:
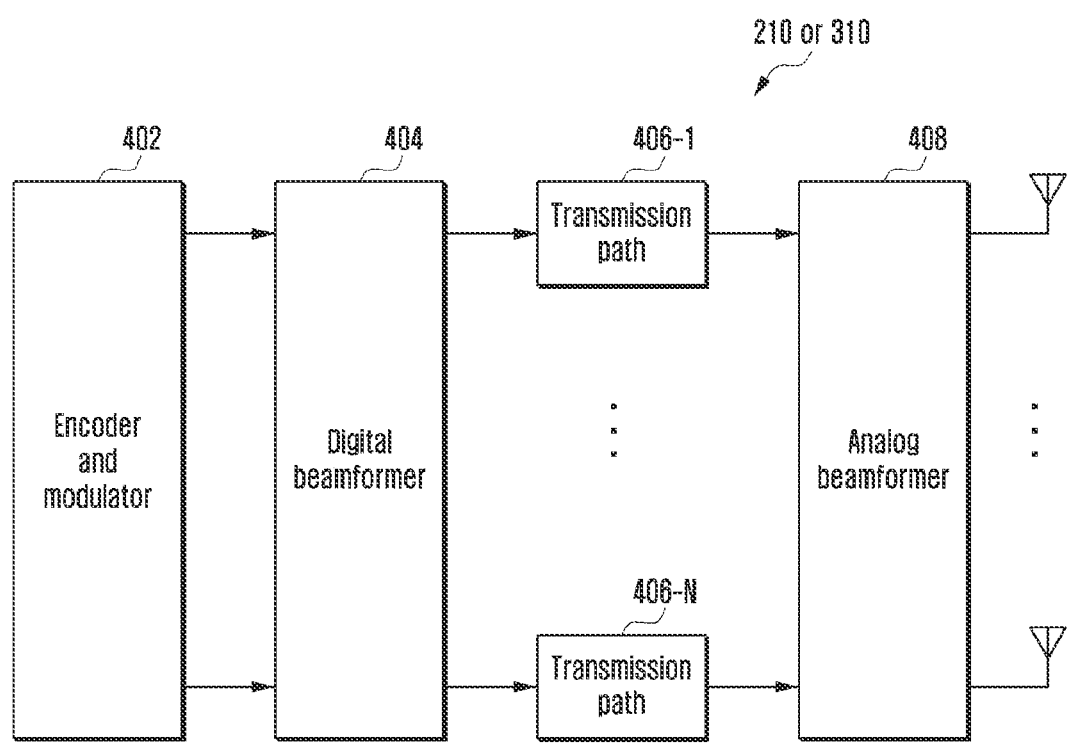
FIG. 4A illustrates a configuration of a communication unit in the wireless communication system according to an embodiment.
Figure 4B:
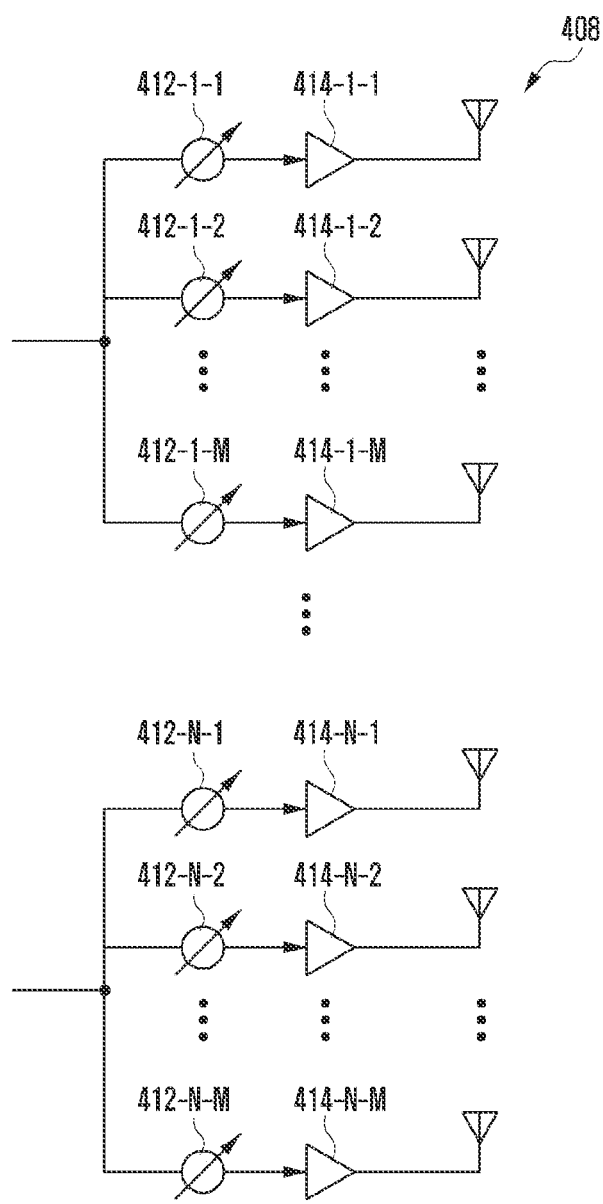
FIG. 4B illustrates a configuration of the analog beamformer of the communication unit in the wireless communication system according to an embodiment.
Figure 4C:
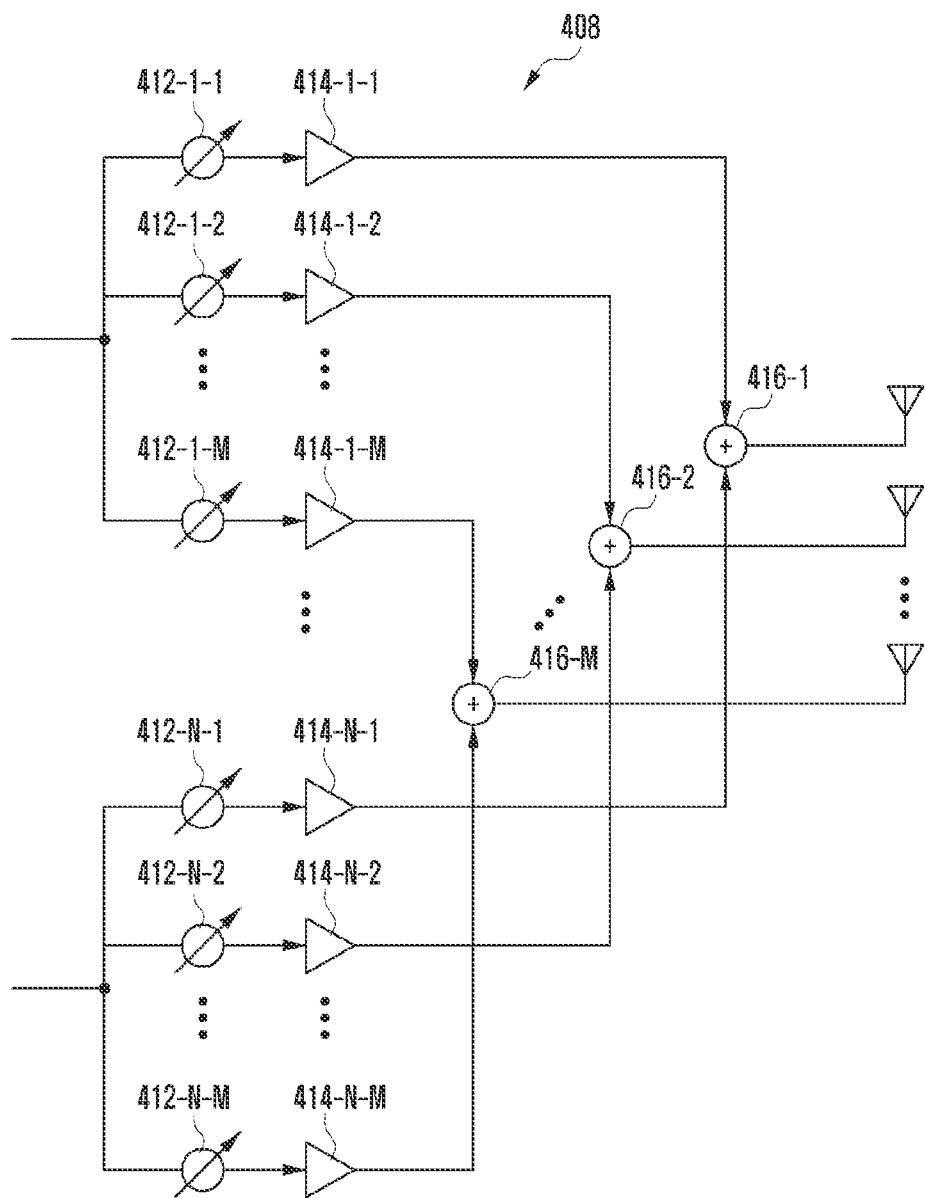
FIG. 4C illustrates a configuration of the analog beamformer of the communication unit in the wireless communication system according to an embodiment.

FIG. 4A illustrates a configuration of a communication unit in the wireless communication system according to an embodiment. FIG. 4B illustrates a configuration of the analog beamformer of the communication unit in the wireless communication system according to an embodiment. FIG. 4C illustrates a configuration of the analog beamformer of the communication unit in the wireless communication system according to an embodiment. Specifically, FIGS. 4A, 4B and FIG. 4C illustrate elements to perform beamforming, as a part of the wireless communication unit 210 of FIG. 2 or the communication unit 310 of FIG. 3.

Referring to FIG. 4A, the wireless communication unit 210 or the communication unit 310 includes an encoder and modulator 402, a digital beamformer 404, multiple transmission paths 406-1 to 406-N, and an analog beamformer 408.

The encoder and modulator 402 performs channel encoding for which at least one among a low density parity check (LDPC) code, a convolution code, and a polar code may be used. The encoder and modulator 402 generates modulation symbols by performing constellation mapping.

The digital beamformer 404 performs beamforming on modulation symbols. To this end, the digital beamformer 404 multiplies modulation symbols by beamforming weights. The beamforming weights are used to change a magnitude and a phase of a signal, and may be referred to as "precoding matrix", "precoder", or the like. The digital beamformer 404 outputs digital-beamformed modulation symbols to the multiple transmission paths 406-1 to 406-N. According to a MIMO transmission technique, the modulation symbols may be multiplexed or the same modulation symbols may be provided to the multiple transmission paths 406-1 to 406-N.

The multiple transmission paths 406-1 to 406-N convert digital-beamformed digital signals into analog-signals. To this end, each of the multiple transmission paths 406-1 to 406-N may include an inverse fast Fourier transform (IFFT) calculator, a cyclic prefix (CP) insertion unit, a DAC, and an up-converter. The CP insertion unit is for an orthogonal frequency division multiplexing (OFDM) scheme, and may be excluded when another physical layer scheme (e.g., a filter bank multi-carrier (FBMC)) is applied. That is, the multiple transmission paths 406-1 to 406-N provide independent signal processing processes to multiple streams generated via digital beamforming. However, depending on an implementation scheme, some elements of the multiple transmission paths 406-1 to 406-N may be used in common.

The analog beamformer 408 performs beamforming on an analog signal. To this end, the digital beamformer 404 multiplies analog signals by beamforming weights. The beamforming weights are used to change a magnitude and a phase of a signal. Specifically, according to a connection structure between the multiple transmission paths 406-1 to 406-N and antennas, the analog beamformer 408 may be configured as shown in FIG. 4B or FIG. 4C.

Referring to FIG. 4B, signals input to the analog beamformer 408 are transmitted through the antennas via phase/magnitude conversion and amplification calculation. In this case, signals of respective paths are transmitted through different antenna arrays. Referring to processing of signals input through a first path, the signals are converted into signal sequences having different phases/magnitudes or the same phase/magnitude by phase/magnitude converters 412-1-1 to 412-1-M, are amplified by the amplifiers 414-1-1 to 414-1-M, and then are transmitted through the antennas.

Referring to FIG. 4C, signals input to the analog beamformer 408 are transmitted through the antennas via phase/magnitude conversion and amplification calculation. In this case, signals of respective paths are transmitted through the same antenna array. Referring to processing of signals input through the first path, the signals are converted into signal sequences having different phases/magnitudes or the same phase/magnitude by the phase/magnitude converters 412-1-1 to 412-1-M, and are amplified by the amplifiers 414-1-1 to 414-1-M. For transmission through a single antenna array, the amplified signals are combined based on antenna elements by combiners 416-1-1 to 416-1-M, and then transmitted through the antennas.

FIG. 4B illustrates when an independent antenna array specific to each transmission path is used, and FIG. 4C illustrates when transmission paths share a single antenna array. However, some transmission paths may use an independent array, and the remaining paths may share a single antenna array. A structure adaptively changeable depending on a situation may also be used by applying a structure switchable between transmission paths and antenna arrays.

In an LTE system, which is a representative example of the broadband wireless communication system, a downlink (DL) adopts an OFDM scheme, and an uplink (UL) adopts a single carrier frequency division multiple access (SC-FDMA) scheme. In the multi-access scheme as described above, time-frequency resources, in which the data or control information is transmitted to each user, are assigned and operated so as not to overlap each other, that is, to establish orthogonality, thereby distinguishing the data or control information for each user.

Figure 5:
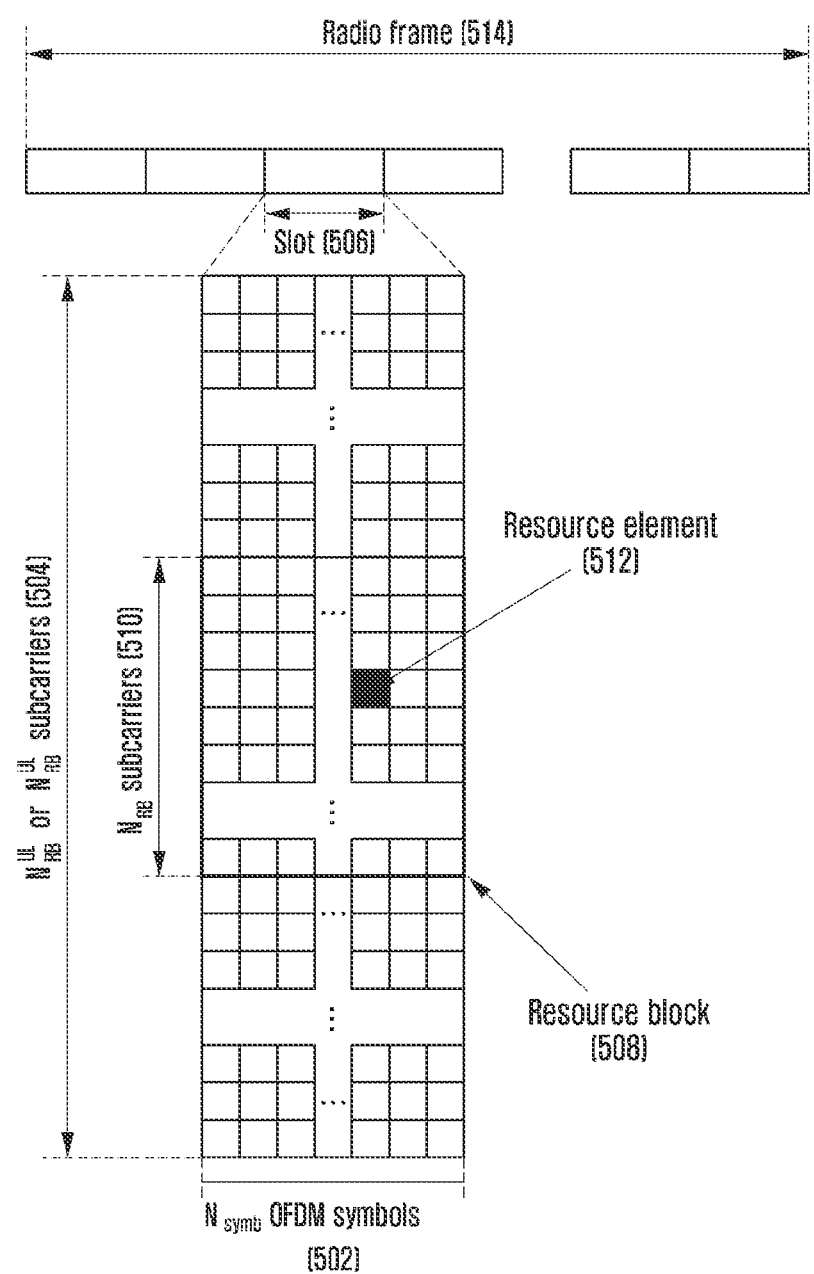
FIG. 5 illustrates a resource structure in a time-frequency domain in the wireless communication system according to an embodiment.

FIG. 5 illustrates a resource structure in a time-frequency domain in the wireless communication system according to an embodiment. FIG. 5 illustrates a basic structure of a time-frequency domain that is a radio resource area in which data or a control channel is transmitted in the DL or UL.

In FIG. 5, a horizontal axis represents a time domain and a vertical axis represents a frequency domain. A minimum transmission unit in the time domain is an OFDM symbol, and $N_{symb}$ OFDM symbols 502 are gathered to constitute one slot 506. A length of a subframe is defined to be 1.0 ms, and a length of a radio frame 514 is defined to be 10 ms. A minimum transmission unit in the frequency domain is a subcarrier, and a bandwidth of the entire system transmission bandwidth may include a total of $N_{BW}$ subcarriers 504. Specific values of $N_{symb}$, $N_{BW}$, etc. may be variably applied depending on the system.

A basic unit of a resource in the time-frequency domain is a resource element (RE) 512, and may be indicated by an OFDM symbol index and a subcarrier index. A resource block (RB or physical resource block (PRB)) 508 is defined as $N_{symb}$ consecutive OFDM symbols 502 in the time domain and $N_{RB}$ consecutive subcarriers 510 in the frequency domain. Therefore, one RB 508 includes $N_{symb} \times N_{RB}$ REs 512. In general, a minimum transmission unit of data is the RB 508.

In the NR system, $N_{symb}=14$, $N_{RB}=12$, and $N_{BW}$ and $N_{RB}$ are proportional to a bandwidth of a system transmission band. A data rate may increase in proportion to the number of RBs scheduled for a terminal. In a frequency division duplex (FDD) system that performs operation by dividing a DL and UL according to frequency, a downlink transmission bandwidth and an uplink transmission bandwidth may be different. A channel bandwidth indicates an RF bandwidth corresponding to a system transmission bandwidth.

Table 1 and Table 2 below illustrate parts of correspondence relationships between a channel bandwidth, subcarrier spacing (SCS), and a system transmission bandwidth defined in the NR system in a frequency band less than 6 GHz and a frequency band greater than 6 GHz. For example, the NR system having a channel bandwidth of 100 megahertz (MHz) with a subcarrier spacing of 30 kilohertz (kHz) includes 273 RBs. In Table 1 and Table 2, N/A may be a bandwidth-subcarrier combination that is not supported by the NR system.

TABLE 1

| | | Channel bandwidth [MHz] | | | | | |
|---|---|---|---|---|---|---|---|
| | SCS | 5 | 10 | 20 | 50 | 80 | 100 |
| Transmission bandwidth configuration (NRB) | 15 kHz | 25 | 52 | 106 | 207 | N/A | N/A |
| | 30 kHz | 11 | 24 | 51 | 133 | 217 | 273 |
| | 60 kHz | N/A | 11 | 24 | 65 | 107 | 135 |

TABLE 2

|  | Channel bandwidth [MHz] | | | |
| --- | --- | --- | --- | --- |
| SCS | 50 | 100 | 200 | 400 |
| Transmission bandwidth configuration (NRB) 60 kHz | 66 | 132 | 264 | N/A |
| 120 kHz | 32 | 66 | 132 | 264 |

In the NR system, scheduling information on DL data or UL data is transferred from a base station to a terminal via DL control information (DCI). DCI is defined in various formats, and it may be determined according to each format whether DCI is an UL grant that is scheduling information for UL data or a DL grant that is scheduling information for DL data, whether DCI is compact DCI having a small size of control information, whether spatial multiplexing using a multi-antenna is applied, whether DCI is for power control, and the like.

For example, DCI format 1-1 which is scheduling control information for DL data may include at least one of items shown in Table 3 below.

TABLE 3

| Items | Contents |
| --- | --- |
| Carrier indicator | Indicating a frequency carrier in which transmission is performed |
| DCI format indicator | An indicator for distinguishing whether corresponding DCI is for DL or UL |
| Bandwidth part (BWP) indicator | Indicating a BWP in which transmission is performed |
| Frequency domain resource allocation | Indicating an RB in a frequency domain allocated for data transmission. A resource to be represented is determined according to a system bandwidth and a resource allocation scheme. |
| Time domain resource allocation | Indicating an OFDM symbol of a slot, in which a data-related channel is to be transmitted |
| VRB-to-PRB mapping | Indicating a scheme by which a virtual RB (VRB) index and a PRB index are to be mapped |
| Modulation and coding scheme (MCS) | Indicating a modulation scheme and a coding rate used for data transmission. That is, a coding rate value that may inform of TBS and channel coding information along with information on whether the modulation scheme is quadrature phase shift keying (QPSK), 16 QAM, 64 QAM, or 256 QAM (or 1024 QAM or 4096 QAM) may be indicated. |
| Codeblock group (CBG) transmission information | When CBG retransmission is configured, indicating information on a CBG to be transmitted |
| HARQ process number | Indicating a process number of HARQ |
| New data indicator (NDI) | Indicating whether transmission is HARQ initial transmission or retransmission |
| Redundancy version (RV) | Indicating a redundancy version of HARQ |
| Transmit power control command (TPC) for physical uplink control channel (PUCCH) | Indicating a transmit power control command for a PUCCH |

In Table 3, in a physical downlink shared channel (PDSCH) transmission, time domain resource assignment may be expressed by information on a slot in which the PDSCH is transmitted, a start symbol position S at the slot, and the number L of symbols to which the PDSCH is mapped. In this case, S may be a relative position from the start of the slot, L may be the number of consecutive OFDM symbols, and S and L may be determined based on a start and length indicator value (SLIV) defined as follows.

if (L−1) ≤ 7 then
   SLIV = 14 (L−1) + S
else
   SLIV = 14 (14−L+11) + (14−1−S)
where 0<L≤14−S In the NR system, generally via a radio resource control (RRC) configuration, information on a correspondence relationship between a SLIV value, a PDSCH or a physical uplink shared channel (PUSCH) mapping type, and information on a slot in which a PDSCH or a PUSCH is transmitted may be configured in one row. Then, by using time domain resource allocation of DCI, an index value defined in the configured correspondence relationship is indicated, so that the base station may transfer, to the terminal, the SLIV value, the PDSCH or PUSCH mapping type, and information on the slot in which the PDSCH or PUSCH is transmitted.

For the NR system, the PDSCH or PUSCH mapping types are defined as type A and type B. In a case of PDSCH or PUSCH mapping type A, a DMRS symbol starts in a second or a third OFDM symbol in a slot. In a case of PDSCH or PUSCH mapping type B, a DMRS symbol starts in a first OFDM symbol of a time domain resource allocated for PUSCH transmission.

DCI may be transmitted in a physical downlink control channel (PDCCH) that is a downlink control channel via channel coding and modulation. A PDCCH may be used to refer to control information itself rather than a channel. In general, DCI is independently scrambled for each terminal by using a specific radio network temporary identifier (RNTI) or terminal identifier, and after adding of a cyclic redundancy check (CRC) and channel coding, the DCI is configured for each independent PDCCH so as to be transmitted. The PDCCH is mapped to a CORESET configured for the terminal.

Downlink data may be transmitted in a PDSCH. The PDSCH may be transmitted after a control channel transmission interval, and scheduling information, such as a specific mapping position and a modulation scheme in the frequency domain, is indicated by DCI transmitted through the PDCCH. Via an MCS in control information constituting the DCI, the base station notifies the terminal of a transport block size (TBS) of data to be transmitted or a target coding rate and a modulation scheme applied to the PDSCH to be transmitted. The MCS may be greater than, less than or equal to five bits. The TBS corresponds to a size of a transport block (TB) before channel coding for error correction is applied to a data TB to be transmitted by the base station.

Herein, a TB may include a medium access control (MAC) header, a MAC control element (MAC CE), one or more MAC service data unit (SDU), and padding bits. Alternatively, the TB may indicate a MAC protocol data unit (PDU) or a unit of data to be sent down from a MAC layer to a physical layer.

Modulation schemes supported by the NR system are QPSK, 16 quadrature amplitude modulation (QAM), 64 QAM, and 256 QAM, and each modulation order ($Q_m$) may be 2, 4, 6 or 8. That is, 2 bits, 4 bits, 6 bits, 8 bits may be transmitted in each symbol in cases of QPSK, 16 QAM, 64 QAM, and 256 QAM, respectively, and if 1024 QAM is supported, 10 bits may be mapped and transmitted in each symbol of 1024 QAM, and a modulation order may thus be 10, and if 4096 QAM is supported, 12 bits may be mapped to and transmitted in each symbol of 4096 QAM, so that the modulation order may be 12.

In terms of services, the NR system is being designed so that various services are freely multiplexed in time and frequency resources, and accordingly waveform/numerology, a reference signal, etc. may be dynamically or freely adjusted as required. In order to provide an optimal service to a terminal in wireless communication, optimized data transmission via measurement of an interference amount and a channel quality is important, indicating the importance of accurate channel state measurement. However, unlike 4G communication in which channel and interference characteristics do not change significantly according to frequency resources, in a case of a 5G channel, channel and interference characteristics vary significantly depending on services, and it is thus necessary to support a subset of a frequency resource group (FRG) level, which enables measurement by division. In the NR system, types of supported services may be divided into eMBB, MMTC, and URLLC. The eMBB aims for high-speed transmission of high-capacity data, the mMTC aims for minimizing terminal power and accessing multiple terminals, and the URLLC aims for high reliability and low latency. Different requirements may be applied depending on types of services applied to the terminal.

Figure 6A:
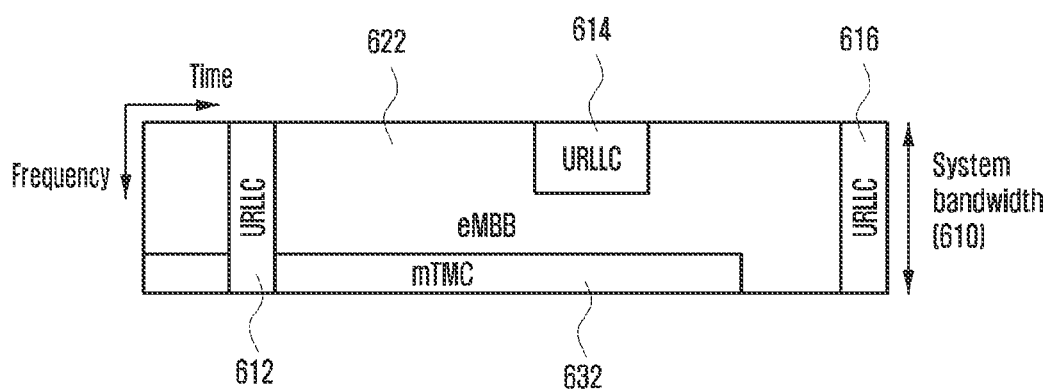
FIG. 6A illustrates a service-specific data assignment to a frequency-time resource in the wireless communication system according to an embodiment.

FIG. 6A illustrates data assignment for each service to a frequency-time resource in the wireless communication system according to an embodiment.

Referring to FIG. 6A, resources are allocated for an eMBB 622, URLLC 612, 614, and 616, and mMTC 632 in the entire system frequency band 610. When URLLC 612, 614, and 616 data is generated while eMBB 622 data and mMTC 632 data are being allocated and transmitted in a specific frequency band, the URLLC 612, 614, and 616 data may be transmitted without emptying a part having already been allocated for the eMBB 622 and the mMTC 632, or without transmitting the eMBB 622 data and mMTC 632 data. Since the URLLC requires reduction of a delay time, resources for transmitting the URLLC 612, 614, and 616 data may be allocated to a part of resources allocated to the eMBB 622. When the URLLC 612, 614, and 616 is additionally allocated and transmitted in the resources to which the eMBB 622 is allocated, the eMBB 622 data may not be transmitted in an overlapping frequency-time resource, and therefore transmission performance of the eMBB 622 data may be compromised. That is, a transmission failure of the eMBB 622 data may occur due to allocation of resources for the URLLC 612, 614, and 616. The scheme shown in FIG. 6A may be referred to as a preemptive scheme.

Figure 6B:
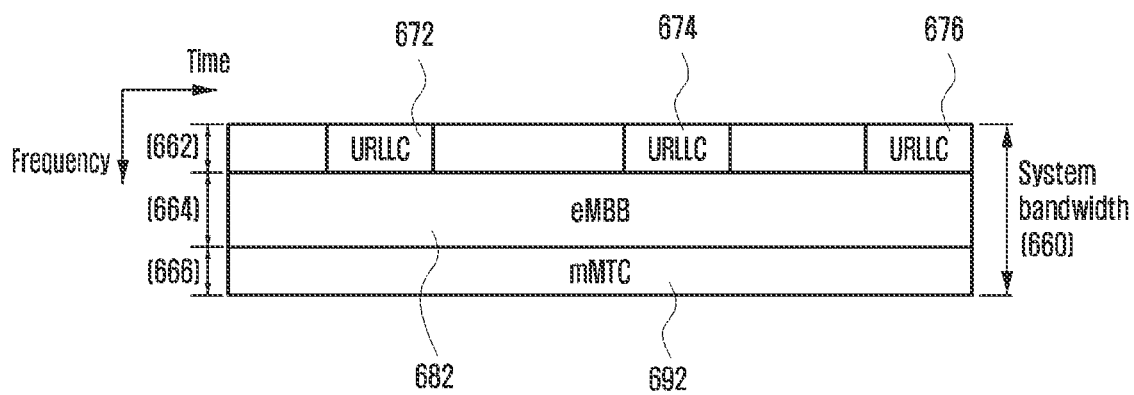
FIG. 6B illustrates a service-specific data assignment to a frequency-time resource in the wireless communication system according to an embodiment.

FIG. 6B illustrates service-specific data assignment to a frequency-time resource in the wireless communication system according to an embodiment.

FIG. 6B illustrates when each service is provided in each of sub-bands 662, 664, and 666 obtained by dividing the entire system frequency band 660. Specifically, sub-band 662 is used for transmission of URLLC 672, 674, and 676 data, sub-band 664 is used for transmission of eMBB 682 data, and sub-band 666 is used for transmission of mMTC 692 data. Information on configurations of the sub-bands 662, 664, and 666 may be predetermined, and the information may be transmitted from a base station to a terminal via higher level signaling. Alternatively, without separate transmission of sub-band configuration information to the terminal, the information on the sub-bands 662, 664, and 666 may be arbitrarily divided by the base station or a network node to provide services.

A length of a transmission time interval (TTI) used for URLLC transmission may be shorter than a length of a TTI used for eMBB or mMTC transmission. A response of URLLC-related information may be transmitted faster than eMBB or mMTC, and therefore, a terminal using a URLLC service may transmit or receive information with a short delay. Structures of physical layer channels used for respective types for transmission of the aforementioned three services or data may be different from each other. For example, at least one of TTI lengths, allocation units of frequency resources, structures of control channels, and data mapping methods may be different from each other. Although three services and three data types have been described above, additional services and corresponding data types may exist.

Figure 6C:
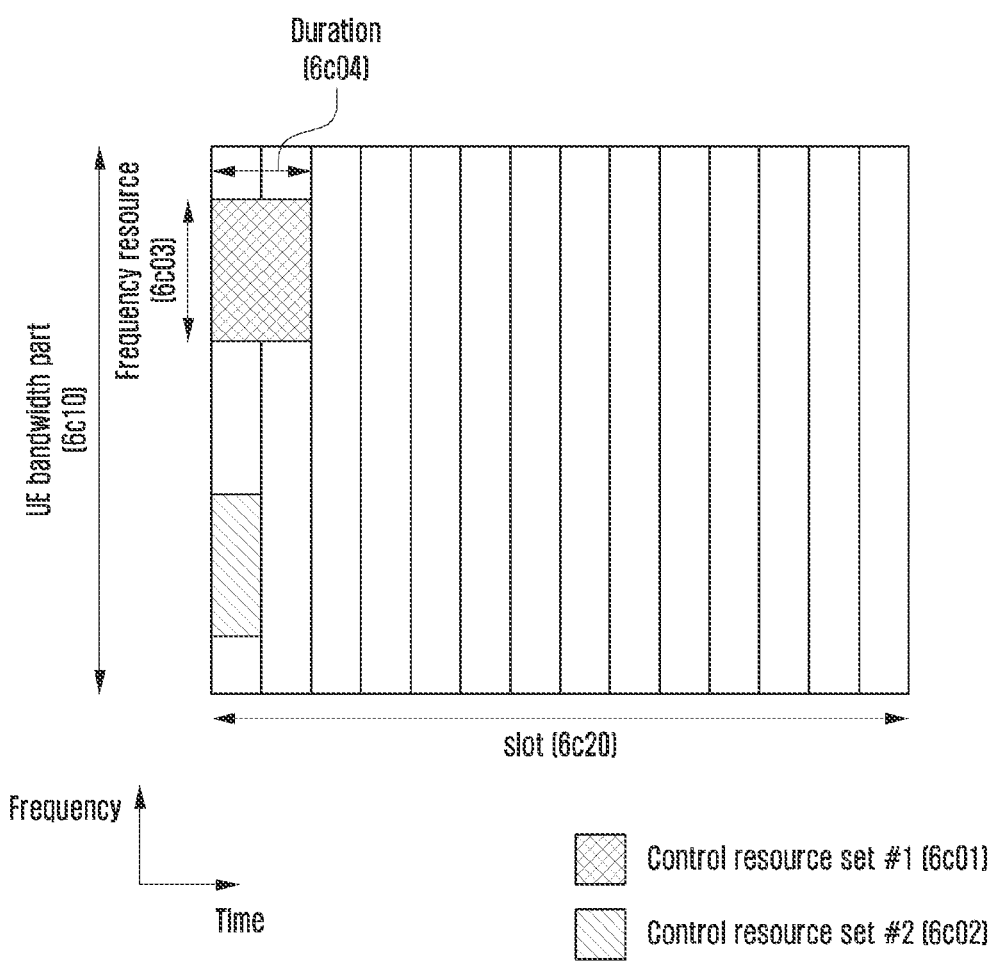
FIG. 6C illustrates a control resource set (CORESET) via which a downlink control channel is transmitted in the wireless communication system according to an embodiment.

FIG. 6C illustrates a CORESET via which a downlink control channel is transmitted in the wireless communication system according to an embodiment. FIG. 6C illustrates when a UE bandwidth part 6c10 is configured on a frequency axis, and two control resource sets (control resource set #1 6c01 and control resource set #2 6c02) are configured within one slot 6c20 on a time axis. The control resource sets 6c01 and 6c02 may be configured in a specific frequency resource 6c03 within the entire UE bandwidth part 6c10 on the frequency axis. One or multiple OFDM symbols may be configured on the time axis and may be defined as a control resource set duration 6c04. In FIG. 6C, control resource set #1 6c01 may be configured to be a control resource set duration of 2 symbols, and control resource set #2 6c02 may be configured to be a control resource set duration of 1 symbol.

The aforementioned control resource set in 5G may be configured for the terminal by the base station via higher layer signaling (e.g., system information, a master information block (MIB), and RRC signaling). Configuring a control resource set for a terminal refers to providing information, such as an identity of the control resource set, a frequency position of the control resource set, and a symbol length of the control resource set. For example, information provided to configure a control resource set is as Table 4 below.

TABLE 4

| | |
|---|---|
| ControlResourceSet ::= | SEQUENCE { |
| -- Corresponds to L1 parameter 'CORESET-ID' | |
| controlResourceSetId | ControlResourceSetId, |
| (Control resource set identity) | |
| frequencyDomainResources | BIT STRING (SIZE (45)), |
| (Frequency domain resource assignment information) | |
| duration | INTEGER (1..maxCoReSetDuration), |
| (Time domain resource assignment information) | |
| cce-REG-MappingType | CHOICE { |
| (CCE-to-REG mapping scheme) | |
| interleaved | SEQUENCE { |
| reg-BundleSize | ENUMERATED {n2, n3, n6}, |

TABLE 4-continued

```
(RGB bundle size)
    interleaverSize                ENUMERATED {n2, n3, n6},
(Interleaver size)
    shiftIndex                     INTEGER(0..maxNrofPhysicalResourceBlocks-1)
OPTIONAL -- Need S
    },
(Interleaver Shift)
    nonInterleaved                 NULL
    },
    precoderGranularity            ENUMERATED {sameAsREG-bundle,
allContiguousRBs},
    tci-StatesPDCCH-ToAddList      SEQUENCE(SIZE (1..maxNrofTCI-
StatesPDCCH)) OF TCI-StateId OPTIONAL, -- Cond NotSIB1-initialBWP
(QCL configuration information)
    tci-StatesPDCCH-ToReleaseList  SEQUENCE(SIZE (1..maxNrofTCI-
StatesPDCCH)) OF TCI-StateId OPTIONAL, -- Cond NotSIB1-initialBWP
    tci-PresentInDCI               ENUMERATED {enabled}
OPTIONAL, -- Need S
```

In 5G, a control resource set may include $N_{RB}^{CORESET}$ RBs in the frequency domain, and may include $N_{symb}^{CORE\_SET} \in \{1,2,3\}$ symbols on the time axis. One control channel element (CCE) may include six resource element groups (REGs), and an REG may be defined to be one RB during one OFDM symbol. In one control resource set, REGs may be indexed in a time-first order, starting with REG index 0 from a first OFDM symbol, a lowest RB, of the control resource set.

5G supports an interleaved scheme and a non-interleaved scheme as methods of transmitting a PDCCH. The base station may configure, for the terminal via higher layer signaling, whether to perform interleaved or non-interleaved transmission for each control resource set. Interleaving may be performed in units of REG bundles. An REG bundle may be defined as a set of one or multiple REGs. The terminal may determine a CCE-to-REG mapping scheme in a corresponding control resource set according to the following manner, depending on interleaved or non-interleaved transmission configured from the base station.

Figure 6D:
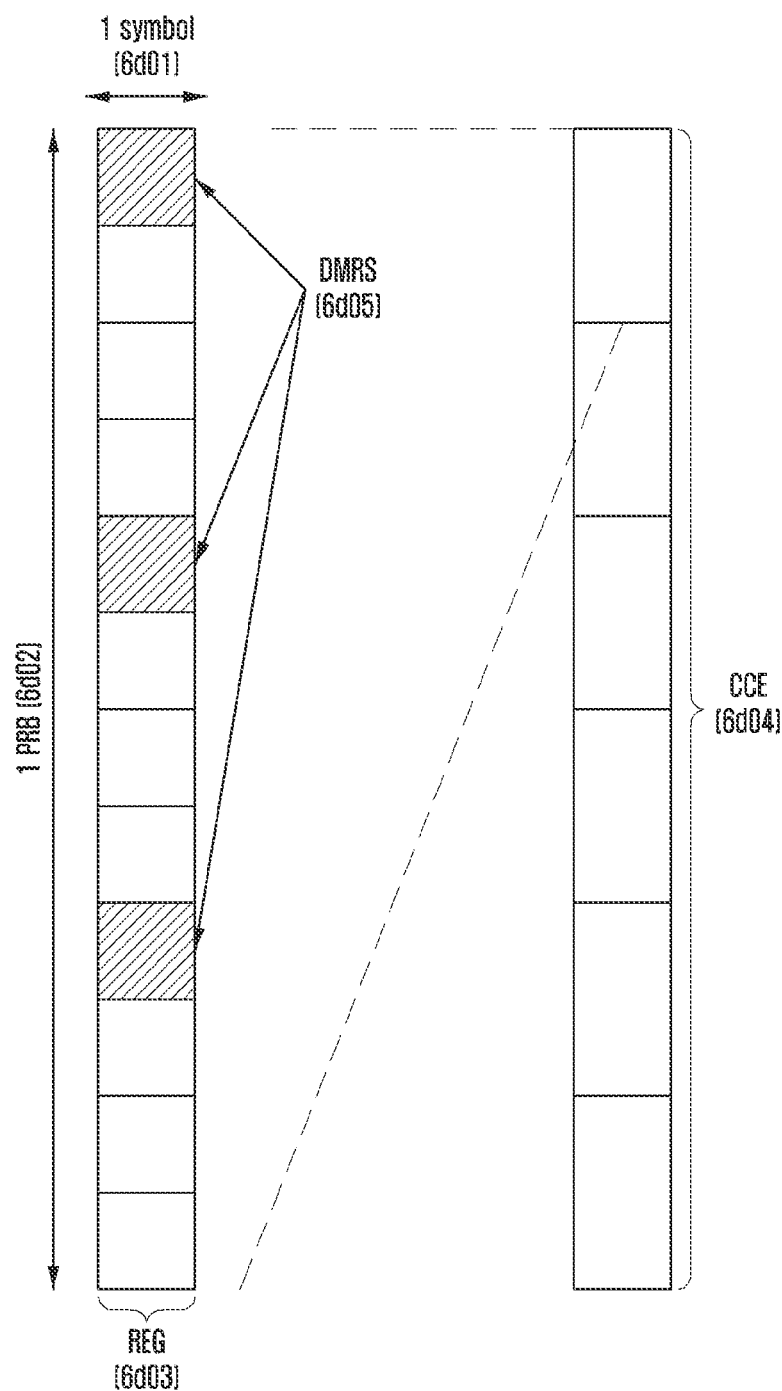
FIG. 6D illustrates when a basic unit resource element group (REG) of a downlink control channel includes both resource elements (REs) to which downlink control information (DCI) is mapped and an area to which a demodulation reference signal (DMRS) for decoding the REs are mapped, according to an embodiment.

FIG. 6D illustrates when a basic unit REG of a downlink control channel includes both resource elements (REs) to which downlink control information (DCI) is mapped and an area to which a DMRS for decoding the REs are mapped, according to an embodiment. The REG of the downlink control channel illustrated in FIG. 6D, that is, an REG 6d03, may include both REs, to which DCI is mapped, and an area to which a DMRS 6d05, which is a reference signal for decoding the REs, is mapped. As shown in FIG. 6D, 3 DMRSs 6d05 may be transmitted within 1 REG 6d03. The number of CCEs required to transmit a PDCCH may be 1, 2, 4, 8, or 16 depending on an aggregation level (AL), and different numbers of CCEs may be used to implement link adaptation of the downlink control channel. For example, if AL=L, a single downlink control channel may be transmitted via L CCEs. The terminal needs to detect a signal without knowing information on the downlink control channel, wherein a search space representing a set of CCEs is defined for blind decoding. The search space is a set of downlink control channel candidates including CCEs, for which the terminal needs to attempt decoding on a given aggregation level. The terminal may have multiple search spaces since there are various aggregation levels that make one bundle with 1, 2, 4, 8, or 16 CCEs. The search space set may be defined to be a set of search spaces at all configured aggregation levels.

The search space may be classified into a common search space and a terminal-specific (UE-specific) search space. A certain group of terminals or all terminals may monitor a common search space of a PDCCH in order to receive cell-common control information, such as a paging message or dynamic scheduling for system information. For example, PDSCH scheduling assignment information for transmission of an SIB including cell operator information may be received by monitoring the common search space of the PDCCH. Since a certain group of terminals or all terminals need to receive the PDCCH, the common search space may be defined as a set of predetermined CCEs. Scheduling assignment information for a UE-specific PDSCH or PUSCH may be received by monitoring a UE-specific search space of the PDCCH. The UE-specific search space may be defined UE-specifically, based on an identity of the terminal and functions of various system parameters.

In 5G, a parameter for a search space of a PDCCH may be configured for the terminal by the base station via higher layer signaling (e.g., an SIB, an MIB, and RRC signaling). For example, the base station may configure, for the terminal, the number of PDCCH candidates at each aggregation level L, a monitoring periodicity for a search space, a monitoring occasion in units of symbols in a slot for the search space, a search space type (common search space or UE-specific search space), a combination of an RNTI and a DCI format, which is to be monitored in the search space, a control resource set index for monitoring of the search space, etc. For example, the parameter for the PDCCH search space may include the information as Table 5 below.

TABLE 5

```
SearchSpace ::=                    SEQUENCE {
-- Identity of the search space, SearchSpaceId = 0 identifies the SearchSpace configured
via PBCH (MIB) or ServingCellConfigCommon.
    searchSpaceId                  SearchSpaceId,
(Search space identifier)
    controlResourceSetId           ControlResourceSetId
OPTIONAL, -- Cond SetupOnly
(Control resource set identifier)
```

TABLE 5-continued

| | |
|---|---|
| monitoringSlotPeriodicityAndOffset (Monitoring slot level periodicity) | CHOICE { |
| sl1 | NULL, |
| sl2 | INTEGER (0..1), |
| sl4 | INTEGER (0..3), |
| sl5 | INTEGER (0..4), |
| sl8 | INTEGER (0..7), |
| sl10 | INTEGER (0..9), |
| sl16 | INTEGER (0..15), |
| sl20 | INTEGER (0..19), |
| sl40 | INTEGER (0..39), |
| sl80 | INTEGER (0..79), |
| sl160 | INTEGER (0..159), |
| sl320 | INTEGER (0..319), |
| sl640 | INTEGER (0..639), |
| sl1280 | INTEGER (0..1279), |
| sl2560 | INTEGER (0..2559) |
| } OPTIONAL, -- Cond Setup | |
| duration | INTEGER (2..2559) |
| OPTIONAL, -- Need R (monitoring duration) | |
| monitoringSymbolsWithinSlot | BIT STRING (SIZE (14)) |
| OPTIONAL, -- Cond Setup (monitoring symbols within slot) | |
| nrofCandidates | SEQUENCE { |
| (number of PDCCH candidates for each aggregation level) | |
| aggregationLevel1 | ENUMERATED {n0, n1, n2, n3, n4, n5, n6, n8}, |
| aggregationLevel2 | ENUMERATED {n0, n1, n2, n3, n4, n5, n6, n8}, |
| aggregationLevel4 | ENUMERATED {n0, n1, n2, n3, n4, n5, n6, n8}, |
| aggregationLevel8 | ENUMERATED {n0, n1, n2, n3, n4, n5, n6, n8}, |
| aggregationLevel16 | ENUMERATED {n0, n1, n2, n3, n4, n5, n6, n8} |
| } OPTIONAL, -- Cond Setup | |
| searchSpaceType (Search space Type) | CHOICE { |
| common (Common search space) ... }, | SEQUENCE { |
| ue-Specific (UE-specific search space) -- Indicates whether the UE monitors in this USS for DCI formats 0-0 and 1-0 or formats 0-1 and 1-1. | SEQUENCE { |
| dci-Formats {formats0-0-And-1-0, formats0-1-And-1-1}, ..., } } } Setup2 } | ENUMERATED OPTIONAL -- Cond |

According to configuration information, the base station may configure one or multiple search space sets for the terminal. The base station may configure search space set 1 and search space set 2 for the terminal. The terminal may be configured to monitor DCI format A scrambled with an X-RNTI in the common search space in search space set 1, and may be configured to monitor DCI format B scrambled with a Y-RNTI in the UE-specific search space in search space set 2.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored, but the disclosure is not limited thereto.
  DCI format 0_0/1_0 with CRC scrambled by C-RNTI, CS-RNTI, SP-CSI-RNTI, RA-RNTI, TC-RNTI, P-RNTI, SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DCI format 2_3 with CRC scrambled by TPC-SRS-RNTI
  DCI format 2_4 with CRC scrambled by CI-RNTI
  DCI format 2_5 with CRC scrambled by AI-RNTI
  DCI format 2_6 with CRC scrambled by PS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and uses below.

Cell RNTI (C-RNTI): For UE-specific PDSCH scheduling

Temporary cell RNTI (TC-RNTI): For UE-specific PDSCH scheduling

Configured scheduling RNTI (CS-RNTI): For semi-statically configured UE-specific PDSCH scheduling Random-Access RNTI (RA-RNTI): For PDSCH scheduling during random-access Paging RNTI (P-RNTI): For scheduling a PDSCH on which paging is transmitted System Information RNTI (SI-RNTI): For scheduling a PDSCH on which system information is transmitted Interruption RNTI (INT-RNTI): For indicating whether to puncture a PDSCH Transmit power control for a PUSCH RNTI (TPC-PUSCH-RNTI): For indicating power control command for a PUSCH Transmit power control for a PUCCH RNTI (TPC-PUCCH-RNTI): For indicating power control command for a PUCCH Transmit power control for an SRS RNTI (TPC-SRS-RNTI): For indicating power control command for an SRS Cancellation Indicator RNTI (CI-RNTI): For indicating PUSCH transmission cancellation Availability Indicator RNTI (AI-RNTI): For indicating availability of soft resources Power saving RNTI (PS-RNTI): For indicating commands for reducing power consumption in a discontinuous reception (DRX) inactive interval The specified DCI formats described above may conform to the definition set forth in Table 6 below.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for a PUCCH and PUSCH |
| 2_3 | Transmission of a group of TPC commands for SRS transmissions by one or more UEs |
| 2_4 | Notifying the PRB(s) and OFDM symbol(s) where UE cancels the corresponding UL transmission from the UE |
| 2_5 | Notifying the availability of soft resources |
| 2_6 | Notifying the power saving information outside DRX active time for one or more UEs |

In 5G, control resource set p and a search space of aggregation level L in control resource set s may be expressed in Equation (1) as follows.

$$L \cdot \left\{ \left( Y_{p,n_{sf}^{\mu}} + \left\lfloor \frac{m_{s,nCI} \cdot N_{CCE,p}}{L \cdot M_{p,s,max}^{(L)}} \right\rfloor + n_{CI} \right) b \bmod \left\lfloor \frac{N_{CCE,p}}{L} \right\rfloor \right\} + i$$

In Equation (1):

L: aggregation level $n_{CI}$: carrier index $N_{CCE,p}$: a total number of CCEs existing in control resource set p $n_{sf}^{\mu}$: slot index $M_{p,s,max}^{(L)}$: the number of PDCCH candidates of aggregation level L $M_{snCI}=0, \ldots, M_{p,s,max}^{(L)}-1$: PDCCH candidate index of aggregation level L i=0, ..., L–1

$Yp,n_{sf}^{\mu} = (A_p \cdot Yp,n_{sf}^{\mu-1}) \bmod D$, $Y_{p,-1}=n_{RNTI} \neq 0$, $Y_{p,-1}=n_{RNTI} \neq 0$, $A_0=39827$, $A_1=39829$, $A_2=39839$, $D=65537$ $n_{RNTI}$: terminal identity A value of $Y\_(p,n_{sf}^{\mu})$ may correspond to 0 in the common search space.

In the UE-specific search space, a value of $Y\_(p,n_{sf}^{\mu})$ may vary depending on a time index and the identifier (ID) configured for the terminal by the base station or C-RNTI) of the terminal.

Hereinafter, a time domain resource allocation method for a data channel in the 5G communication system will be described.

The base station may configure, for the terminal via RRC signaling, a table for time domain resource allocation information on a (PDSCH and a PUSCH. A table including up to 16 entries (maxNrofDL-Allocations=16) may be configured for the PDSCH, and a table including up to 16 entries (maxNrofUL-Allocations=16) may be configured for the PUSCH. The time domain resource allocation information may include, for example, a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), information on a position and length of a start symbol in which the PDSCH or PUSCH is scheduled within a slot, a mapping type of the PDSCH or PUSCH, or the like. For example, information described Table 7 and Table 8 below may be notified from the base station to the terminal.

TABLE 7

PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
 k0                INTEGER(0..32)
OPTIONAL, -- Need S
(PDCCH-to-PDSCH timing, slot unit)
 mappingType             ENUMERATED {typeA, typeB}, TABLE 7-continued

```
(PDSCH mapping type)
    startSymbolAndLength           INTEGER (0..127)
(Starting symbol and length of symbols of PDSCH)
}
```

TABLE 8

```
PUSCH-TimeDomainResourceAllocationList ::=    SEQUENCE (SIZE(1..maxNrofUL-
Allocations)) OF PUSCH-TimeDomainResourceAllocation
PUSCH-TimeDomainResourceAllocation ::=    SEQUENCE {
    k2                            INTEGER(0..32)
OPTIONAL, -- Need S
(PDCCH-to-PUSCH timing, slot unit)
    mappingType                   ENUMERATED {typeA, typeB},
(PUSCH mapping type)
    startSymbolAndLength          INTEGER (0..127)
(Starting symbol and length of symbols of PUSCH)
}
```

The base station may notify one of the entries in the tables for the time domain resource allocation information to the terminal via L1 signaling (e.g., DCI) (e.g., the entry may be indicated by a time domain resource allocation field in the DCI). The terminal may acquire the time domain resource allocation information for the PDSCH or PUSCH, based on the DCI received from the base station.

Hereinafter, a frequency domain resource allocation method for a data channel in the 5G communication system will be described.

In 5G, as a method of indicating frequency domain resource allocation information for a PDSCH and a PUSCH, two types of resource allocation type 0 and resource allocation type 1 are supported.

Resource Allocation Type 0

RB Allocation Information May be Notified from the Base Station to the Terminal in a Form of a bitmap for a resource block group (RBG) which may include a set of consecutive virtual RBs (VRBs), and size P of the RBG may be determined based on a value configured as a higher layer parameter (rbg-Size) and a size value of a bandwidth part defined in Table 9 below (nominal RBG size P).

TABLE 9

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

A total number ($N_{RBG}$) of RBGs of bandwidth part i with size $N_{BWP,i}^{size}$ may be defined as follows.

$N_{RBG}=\lceil(N_{BWP,i}^{size}+N_{BWP,i}^{start} \bmod P)/P\rceil$, where the size of the first RBG is $RBG_0^{size}=P-N_{BWP,i}^{start} \bmod P$ the size of last RBG is $RBG_{last}^{size}=(N_{BWP,i}^{start}+N_{BWP,i}^{start}) \bmod P$, if $(N_{BWP,i}^{start}+N_{BWP,i}^{start}) \bmod P>0$ and P otherwise, the size of all other RBGs is P Each bit of a bitmap having a size of $N_{RBG}$ bits may correspond to each RBG. RBGs may be indexed in the order of increasing frequency, starting from a lowest frequency position of the bandwidth part. With respect to $N_{RBG}$ RBGs in the bandwidth part, RBG #0 to RBG #($N_{RBG}$-1) may be mapped from an MSB to an LSB of an RBG bitmap. If a specific bit value in the bitmap is 1, the terminal may determine that an RBG corresponding to the bit value has been assigned, and if the specific bit value in the bitmap is 0, the terminal may determine that an RBG corresponding to the bit value is unassigned.

Resource Allocation Type 1

RB allocation information may be notified from the base station to the terminal, as information on start positions and lengths for consecutively allocated VRBs. In this case, interleaving or non-interleaving may be additionally applied to the consecutively allocated VRBs. A resource allocation field of resource allocation type 1 may include a resource indication value (RIV), which may include a start point ($RB_{start}$) of a VRB and a length of consecutively allocated RBs ($L_{RBs}$). More specifically, the RIV in a bandwidth part having a size of $N_{BWP,i}^{size}$ may be defined as follows.

if $(L_{RBs} - 1) \le \lfloor N_{BWP}^{size}/2 \rfloor$ then
    $RIV = N_{BWP}^{size}(L_{RBs} - 1) + RB_{start}$
else
    $RIV = N_{BWP}^{size}(N_{BWP}^{size} - L_{RBs} + 1) + (N_{BWP}^{size} - 1 - RB_{start})$
where $L_{RBs} \ge 1$ and shall not exceed $N_{BWP}^{size} - RB_{start}$.

Channel state information (CSI) may include a channel quality indicator (channel quality information (CQI)), a precoding matrix indicator (PMI), a CSI-RS resource indicator (CRI), a synchronization signal/physical broadcast channel (SS/PBCH) block resource indicator (SSBRI), a layer indicator (LI), a rank indicator (RI), and a reference signal received power (L1-RSRP). The base station may control time and frequency resources for the aforementioned CSI measurement and report of the terminal.

For the aforementioned CSI measurement and report, the terminal may be configured, via higher layer signaling, with setting information for N (N≥1) CSI reports (CSI-ReportConfig), setting information for M (M≥1) RS transmission resources (CSI-ResourceConfig), and list information of one or two trigger states (CSI-AperiodicTriggerStateList, CSI-SemiPersistentOnPUSCH-TriggerStateList).

With respect to the aforementioned CSI report settings (CSI-ReportConfig), each report setting of CSI-ReportConfig may be associated with one DL bandwidth part identified by a higher layer parameter bandwidth part identifier (bwp-id) given by a CSI resource setting of CSI-ResourceConfig associated with the corresponding report setting. As a time domain report operation for each report setting of CSI-ReportConfig, aperiodic, semi-persistent, and periodic schemes may be supported and configured for the terminal by the base station via a parameter of reportConfigType configured from a higher layer. A semi-persistent CSI report method may support a PUCCH-based semi-persistent (semi-PersistentOnPUCCH) method and a PUSCH-based semi-persistent (semi-PersistentOnPUSCH) method. In the periodic or semi-persistent CSI report method, a PUCCH or PUSCH resource in which CSI is to be transmitted may be configured for the terminal by the base station via higher layer signaling. A periodicity and a slot offset of a PUCCH or PUSCH resource in which CSI is to be transmitted may be given by numerology of a UL bandwidth part configured to transmit a CSI report. In the aperiodic CSI report method, a PUSCH resource in which CSI is to be transmitted may be scheduled for the terminal by the base station via L1 signaling (e.g., aforementioned DCI format 0_1).

With respect to the aforementioned CSI resource setting (CSI-ResourceConfig), each CSI resource setting of CSI-ReportConfig may include S (S≥1) CSI resource sets (given via higher layer parameter csi-RS-ResourceSetList). A CSI resource set list may include a non-zero power (NZP) CSI-RS resource set and an SS/PBCH block set or a CSI-interference measurement (CSI-IM) resource set. Each CSI resource setting may be positioned in a DL bandwidth part identified by higher layer parameter bwp-id and may be connected to a CSI report setting in the same downlink bandwidth part. A time domain operation of a CSI-RS resource in CSI resource setting may be configured to one of aperiodic, periodic, or semi-persistent scheme from higher layer parameter resourceType. With respect to periodic or semi-persistent CSI resource setting, the number of CSI-RS resource sets may be limited to S (S=1), and a configured periodicity and slot offset may be given based on the numerology of a downlink bandwidth part identified by bwp-id. One or more CSI resource settings for channel or interference measurement may be configured for the terminal by the base station via higher layer signaling, and may include a CSI-IM resource for interference measurement, an NZP CSI-RS resource for interference measurement, and an NZP CSI-RS resource for channel measurement.

With respect to CSI-RS resource sets associated with resource setting in which a higher layer parameter resource Type is configured to aperiodic, periodic, or semi-persistent, a trigger state of CSI report setting having reportType configured to aperiodic, and resource setting for channel or interference measurement on one or multiple component cells (CCs) may be configured via higher layer parameter CSI-AperiodicTriggerStateList.

Aperiodic CSI reporting of the terminal may be performed using a PUSCH, periodic CSI reporting may be performed using a PUCCH, and semi-persistent CSI reporting may be performed using a PUSCH when triggered or activated via DCI, and may be performed using a PUCCH after activation is performed by a MAC control element (MAC CE). As described above, CSI resource setting may also be configured to aperiodic, periodic, and semi-persistent. A combination between a CSI report setting and a CSI resource configuration may be supported based on Table 10 below, which concerns triggering/activation of CSI reporting for the possible CSI-RS configurations.

TABLE 10

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [TS 38.321] | Triggered by DCI; additionally, activation command [TS 38.321] possible as defined in Subclause 5.2.1.5.1. |
| Semi-Persistent CSI-RS | Not Supported | For reporting on PUCCH, the UE receives an activation command [TS 38.321]; for reporting on PUSCH, the UE receives triggering on DCI | Triggered by DCI; additionally, activation command [TS 38.321] possible as defined in Subclause 5.2.1.5.1. |
| Aperiodic CSI-RS | Not Supported | Not Supported | Triggered by DCI; additionally, activation command [TS 38.321] possible as defined in Subclause 5.2.1.5.1. |

Aperiodic CSI reporting may be triggered by a CSI request field in DCI format 0_1 described above, which corresponds to scheduling DCI for a PUSCH. The terminal may monitor a PDCCH, may acquire DCI format 0_1, and may acquire scheduling information of a PUSCH and a CSI request indicator. A CSI request indicator may be configured to have $N_{TS}$(=0, 1, 2, 3, 4, 5, or 6) bits, and may be determined by higher layer signaling of reportTriggerSize. One trigger state among one or multiple aperiodic CSI report trigger states which may be configured via higher layer signaling (CSI-AperiodicTriggerStateList) may be triggered by a CSI request indicator.

If all bits in a CSI request field are 0, this indicates that CSI reporting is not requested.

If the number M of configured CSI trigger states in CSI-AperiodicTriggerStateLite is greater than $2N^{TS}-1$, M CSI trigger states may be mapped to $2N^{TS}-1$ trigger states according to a predefined mapping relation, and one trigger state among the $2N^{TS}-1$ trigger states may be indicated by a CSI request field.

If the number M of configured CSI trigger states in CSI-AperiodicTriggerStateLite is less than or equal to $2N^{TS}-1$, one of the M CSI trigger states may be indicated by a CSI request field.

Table 11 below illustrates a relationship between a CSI request indicator and a CSI trigger state that may be indicated by a corresponding indicator.

TABLE 11

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1 CSI resource#2 |
| 10 | 10 | CSI trigger state#2 | CSI report#3 |
| 11 | CSI trigger state#3 | CSI report#4 | CSI resource#4 |

A terminal may measure a CSI resource in a CSI trigger state triggered by a CSI request field, and then generate CSI (including at least one of the aforementioned CQI, PMI, CRI, SSBRI, LI, RI, or L1-RSRP). The terminal may transmit acquired CSI by using a PUSCH scheduled based on corresponding DCI format 0_1. If one bit corresponding to an uplink data indicator (UL-SCH indicator) in DCI format 0_1 indicates "1", the terminal may multiplex the acquired CSI and uplink data (UL-SCH) to a PUSCH resource scheduled by DCI format 0_1 so as to transmit the same. If one bit corresponding to the UL-SCH indicator in DCI format 0_1 indicates "0", the terminal may map only a CSI to the PUSCH resource scheduled by DCI format 0_1 without the UL-SCH so as to transmit the CSI.

Figure 6E:
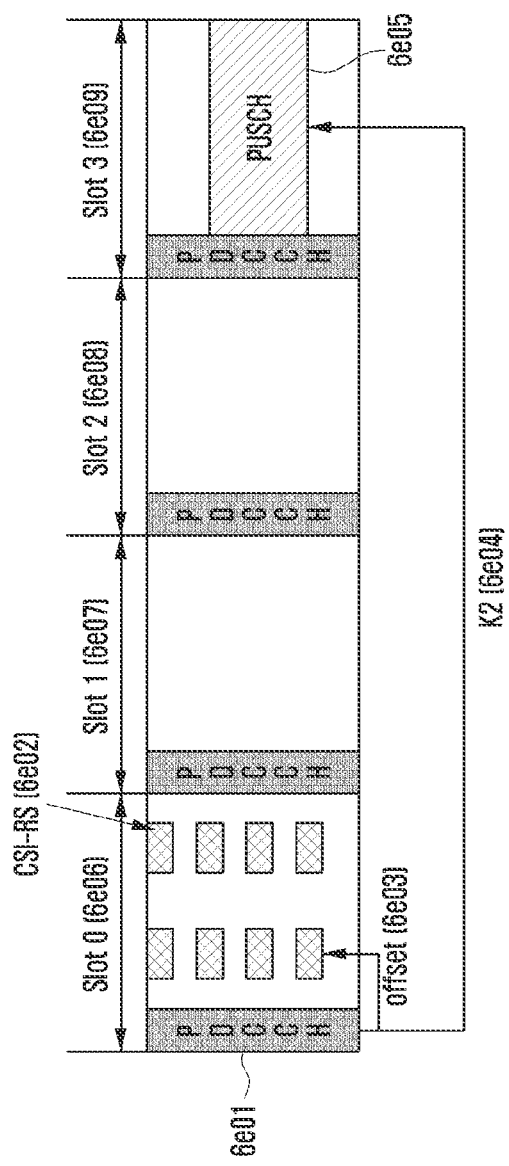
FIG. 6E illustrates an aperiodic CSI reporting method according to an embodiment.

FIG. 6E illustrates an aperiodic CSI reporting method according to an embodiment. In FIG. 6E, a terminal may acquire DCI format 0_1 by monitoring a PDCCH 6e01, and may acquire scheduling information and CSI request information for a PUSCH 6e05 from the acquired DCI format 0_1. The terminal may acquire resource information of a CSI-RS 6e02 to be measured, from a received CSI request indicator. The terminal may determine a time point at which the terminal needs to measure a resource of the CSI-RS 6e02, based on a time point at which DCI format 0_1 is received, and a parameter for an offset (e.g., aforementioned aperiodicTriggeringOffset) in a CSI resource set configuration (e.g., an NZP CSI-RS resource set configuration (NZP-CSI-RS-ResourceSet)). More specifically, the terminal may be configured with offset value X of the parameter of aperiodicTriggeringOffset in an NZP-CSI-RS resource set configuration from a base station via higher layer signaling, and the configured offset value X may exist between a slot in which DCI triggering aperiodic CSI reporting is received, and a slot in which a CSI-RS resource is transmitted. For example, the parameter value of aperiodicTriggeringOffset and offset value X may have a mapping relationship therebetween as shown in Table 12 below.

TABLE 12

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

The example of FIG. 6E illustrates when aforementioned offset value X is configured to 0 (X=0). In this case, the terminal may receive the CSI-RS 6e02 in slot 0 6e06 in which DCI format 0_1 that triggers aperiodic CSI reporting is received, and may report CSI information, which is measured based on the received CSI-RS 6e02, to the base station via the PUSCH 6e05. The terminal may acquire, from DCI format 0_1, scheduling information (information corresponding to each field of DCI format 0_1 described above) on the PUSCH 6e05 for CSI reporting. For example, in DCI format 0_1, the terminal may acquire information on a slot in which the PUSCH 6e05 is to be transmitted, from time domain resource allocation information of the PUSCH 6e05. The terminal acquires 3 as a K2 value corresponding to a slot offset value for PDCCH-to-PUSCH, and accordingly, the PUSCH 6e05 may be transmitted in slot 3 6e09, which is spaced 3 slots apart from slot 0 6e06, i.e., a time point at which the PDCCH 6e01 has been received.

Figure 6F:
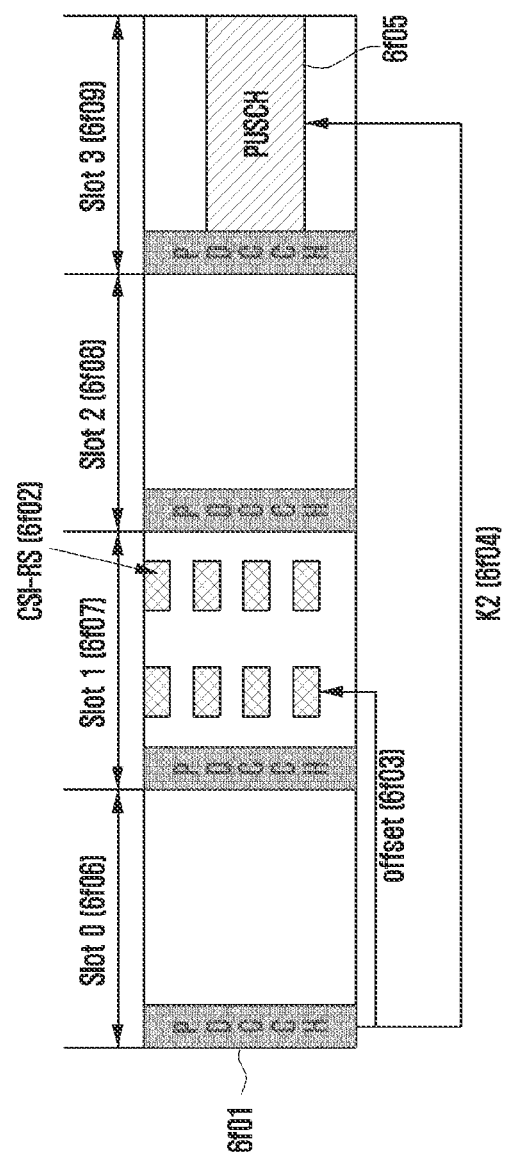
FIG. 6F illustrates an aperiodic CSI reporting method according to an embodiment.

FIG. 6F illustrates an aperiodic CSI reporting method according to an embodiment. In FIG. 6F, the terminal may acquire DCI format 0_1 by monitoring a PDCCH 6f01, from which the terminal may acquire scheduling information and CSI request information for a PUSCH 6f05. The terminal may acquire resource information of a CSI-RS 6f02 to be measured, from a received CSI request indicator. FIG. 6F illustrates when offset value X 6f03 for the aforementioned CSI-RS is configured to be 1 (X=1). In this case, the terminal may receive the CSI-RS 6f02 in the next slot (corresponding to slot 1 0f07 of FIG. 6F) of a slot in which DCI format 0_1 that triggers aperiodic CSI reporting is received. When a K2 value is 3 as an example of FIG. 6F, the terminal may report CSI information measured based on the received CSI-RS to the base station via the PUSCH 6f05 in slot 3 6e09, which is spaced 3 slots apart from slot 0 6F06, according to the K2 value 6f04 corresponding to a slot offset value for PDCCH-to-PUSCH.

Control information is transmitted within first N OFDM symbols in a subframe. Control channel transmission period N is generally N={1, 2, 3}. Therefore, the N value varies for each subframe according to an amount of control information to be transmitted in a current subframe.

For example, the control information may include an indicator indicating the number of OFDM symbols over which the control information is transmitted, scheduling information of uplink or downlink data, and a hybrid automatic repeat request (HARQ) acknowledgment (ACK)/negative ACK (NACK) signal.

The wireless communication system adopts an HARQ scheme which retransmits corresponding data in a physical layer, if a decoding failure occurs in initial transmission. In the HARQ scheme, if a receiver fails to correctly decode the data, the receiver transmits a NACK notifying of the decoding failure to a transmitter so as to enable the transmitter to retransmit the data in the physical layer. The receiver improves data reception performance, by combining data, which is retransmitted by the transmitter, with the existing data for which decoding has failed. If the receiver correctly decodes the data, the receiver may transmit an ACK notifying of a success of decoding to the transmitter so as to enable the transmitter to transmit new data.

It is important to provide a high-speed data service in the communication system by supporting a scalable bandwidth. The system transmission band of the LTE system may have various bandwidths, such as 20/15/10/5/3/1.4 MHz. Therefore, service providers may provide services by selecting a specific bandwidth from among the various bandwidths. The terminal 120 may be of various types for supporting a bandwidth of between about 1.4 MHz and 20 MHz.

In the wireless communication system, a base station informs the terminal of scheduling information for downlink data or DL or UL DCI. By defining various formats, the DCI is operated by applying a determined DCI format according to whether scheduling information is for a UL grant or a DL grant, whether the DCI is compact DCI having a small control information size, whether spatial multiplexing using multiple antennas is applied, whether the DCI is for power control, and the like. For example, DCI format 1 which is scheduling control information (e.g., DL grant) for downlink data may be configured to include the following control information.

Resource allocation type 0/1 flag notifies whether a resource allocation scheme is type 0 or type 1. Type 0 flag allocates resources on an RBG basis by applying a bitmap scheme. In the LTE system, a basic scheduling unit is an RB expressed as time and frequency domain resources, and the RBG includes multiple RBs so as to become the basic scheduling unit for type 0. Type 1 flag allocates a specific RB in the RBG.

Resource block assignment notifies of an RB assigned for data transmission. A resource to be represented is determined according to a system bandwidth and a resource allocation scheme.

An MCS notifies of a modulation scheme used for data transmission and a size of a transport block to be transmitted.

A HARQ process number notifies of a number of a HARQ process for each of HARQ data.

A new data indicator (NDI) notifies whether transmission is HARQ initial transmission or retransmission.

A redundancy version (RV) notifies of the RV of a HARQ process.

A TPC command for a PUCCH notifies of a power control command for the PUCCH.

DCI is channel-coded, modulated, and then transmitted via a PDCCH.

In general, DCI is channel-coded independently for each terminal, and then configured and transmitted as an independent PDCCH. The PDCCH in the time domain is mapped and transmitted in a control channel transmission interval. A mapping position of the PDCCH in the frequency domain may be determined by an ID of each terminal and dispersed across the entire system transmission bandwidth.

Downlink data is transmitted over a PDSCH which is transmitted after the control channel transmission interval. Scheduling information, such as a specific mapping position in the frequency domain and a modulation scheme, is notified by the DCI transmitted over the PDCCH.

The base station notifies the terminal of the modulation scheme applied to the PDSCH to be transmitted and a TBS of data to be transmitted, via a 5-bit MCS in the control information constituting the DCI. The TBS corresponds to a size of data to be transmitted by the base station before channel coding for error correction is applied.

In a cellular system, such as a 5G NR or LTE/LTE-A system, a base station needs to transmit a reference signal in order to measure a downlink channel state. For example, in a case of an LTE-advanced (LTE-A) system of 3GPP, a terminal measures a channel state between a base station and the terminal by using a channel status information reference signal (CSI-RS) transmitted by the base station. In the channel state, several factors should be considered, such as an interference amount in a DL, including an interference signal and thermal noise generated by an antenna belonging to an adjacent base station, which may be used by the terminal to determine a channel situation of the DL. For example, if a base station having one transmission antenna transmits a reference signal to a terminal having one reception antenna, the terminal determines an energy per symbol to interference density ratio (Es/Io) by determining an energy per symbol receivable in the DL from the reference signal received from the base station and an interference amount concurrently received in the reception interval of the corresponding symbol. The determined Es/Io is notified to the base station so as to enable the base station to determine a data transmission rate at which transmission is to be performed to the terminal.

Figure 7:
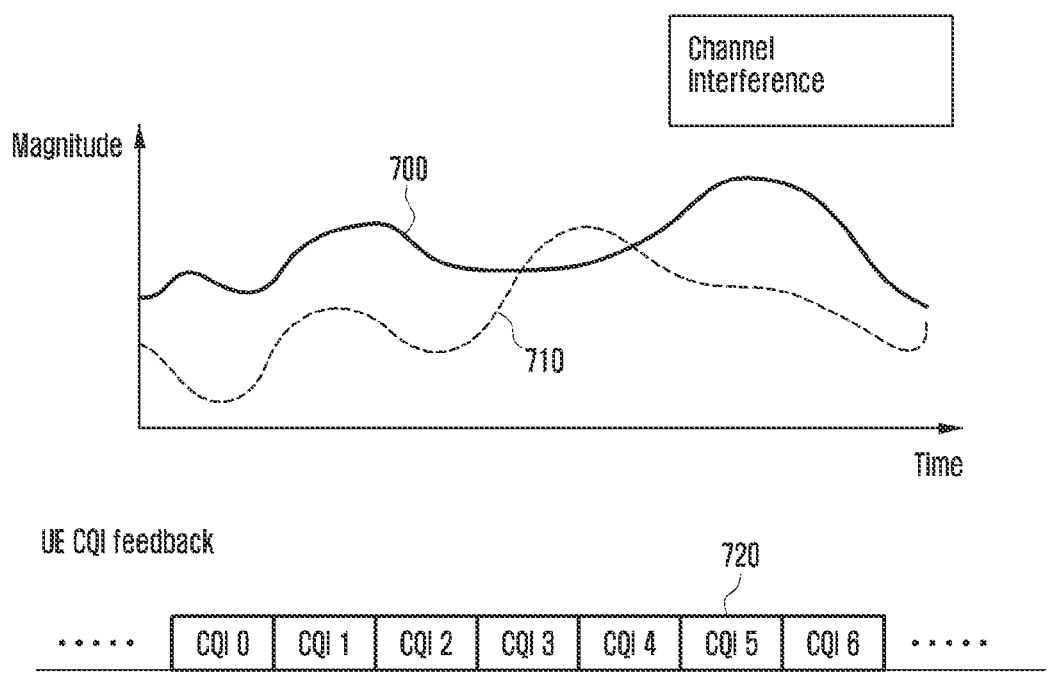
FIG. 7 illustrates transmitting a channel quality indicator (CQI) of a terminal according to an interference intensity and signal energy measured by the terminal, according to an embodiment.

FIG. 7 illustrates transmitting a CQI that is one piece of channel state information of a terminal according to interference level and signal energy measured by the terminal, according to an embodiment.

Referring to FIG. 7, a terminal may perform channel estimation by measuring a downlink reference signal, such as a CSI-RS, and may calculate, using a channel estimation result, an Es (a received signal energy) according to a wireless channel indicated by the solid curve 700.

The terminal may calculate interference and noise intensities indicated by the dotted curve 710 by using a separate resource for measurement of interference and noise or the downlink reference signal.

In LTE, in order to measure interference and noise, the base station uses a CRS that is a downlink reference signal or configures an interference measurement resource for the terminal so as to assume, as the interference and the noise, a signal measured in a corresponding radio resource. By using the reception signal energy and the interference and noise intensities acquired by the method described above, the terminal determines a maximum data transmission rate receivable with a specific success rate in its calculated signal to interference and noise ratio, and notifies the maximum data transmission rate to the base station.

The base station then determines, using the maximum data transmission rate, an actual data transmission rate of the downlink signal to be transmitted to the terminal. In the LTE/NR standard, the maximum data transmission rate at which the terminal can receive data from the base station with a constant success rate may be referred to as CQI.

In general, since a wireless channel varies over time, the terminal may notify of a CQI to the base station periodically, or may notify a CQI each time when the base station requests the CQI from the terminal. A scheme in which the base station requests the CQI from the terminal may be performed via one or more periodic and aperiodic methods.

When the terminal or the base station accurately measures CQI information, and accurately transmits or receives the CQI information, an MCS suitable for a channel environment is configured and efficient transmission or reception is thus possible while observing a target error probability configured in the wireless communication system, so that a more advanced wireless communication system requires defining a method of generating and applying CQI and MCS tables suitable for services supporting various reliability.

The disclosure sets forth a method of designing new CQI and MCS tables in order to determine a combination of modulation and coding techniques and to accurately report a channel quality according to target transmission or reception error probability required for efficient communication in 4G or 5G communication systems. Each element of the CQI table and the MCS table may be expressed by a combination of a modulation order and a code rate, spectral efficiency, or the like. The spectral efficiency may be expressed as a modulation order product rate (MPR).

The disclosure sets forth a method and device for determining a combination of efficient modulation and coding techniques based on multiple MCS tables or reporting an accurate channel quality based on multiple CQI tables according to a target transmission or reception error probability required for efficient communication in the 4G or 5G communication system. Different CQI tables and MCS tables are applicable according to a maximum modulation order or target block error rate (BLER) configured in the system. A BLER value may indicate an error occurrence probability after decoding of a received transport block is completed.

The terminal may decode multiple transport blocks and then determine the BLER value via an adequate calculation, but the terminal may determine the BLER value that is generally expected via a reception signal-to-noise ratio (SNR). When the terminal determines the BLER value that is generally expected via the reception SNR, even if actual decoding is not performed, the terminal may measure the reception SNR, predict a decoding success probability based on the SNR, and report a CQI index to the base station.

In order to report a CQI index to the base station, the terminal reports the CQI index based on a CSI reference resource. The following elements may constitute the CSI reference resource, but additional elements may also constitute the CSI reference resource.

The first 2 OFDM symbols are used as control signals.

The number of PDSCH and DMRS symbols is 12 symbols.

A CP length and subcarrier spacing, such as a bandwidth part (BWP) configured for PDSCH reception, a bandwidth size configured for CQI reporting, RV 0, REs allocated for an NZP CSI-RS and a ZP CSI-RS do not exist, a PDSCH symbol does not include a DMRS, a PRB bundling size is in a 2-PRB unit, and a PDSCH transmission can be performed with up to 8 transmission layers.

Table 13 or Table 14 below are CQI tables that may be used for CQI reporting when up to 64 QAM is available, Table 15 below may be used when CQI reporting is required when up to 256 QAM is available, and Table 16 may be used when CQI reporting is required when up to 1024 QAM is available.

Table 17 or Table 18 may be used for MCS determination or configuration when up to 64 QAM is available for a PDSCH or PUSCH, Table 19 may be used when MCS determination or configuration is required when up to 256 QAM is available for PDSCH or PUSCH, and Table 20 may be used for MCS determination or configuration when up to 1024 QAM is available for the PDSCH or PUSCH.

The CQI tables in Table 13, Table 14, Table 15 and Table 16 below may have values configured via a 4-bit indicator, such as higher layer signaling or DCI, and the MCS tables in Table 17, Table 18, Table 19 and Table 20 below may have values thereof configured via a 5-bit indicator, such as higher layer signaling or DCI.

TABLE 13

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 14

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16 QAM | 378 | 1.4766 |
| 10 | 16 QAM | 490 | 1.9141 |
| 11 | 16 QAM | 616 | 2.4063 |
| 12 | 64 QAM | 466 | 2.7305 |
| 13 | 64 QAM | 567 | 3.3223 |
| 14 | 64 QAM | 666 | 3.9023 |
| 15 | 64 QAM | 772 | 4.5234 |

TABLE 15

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 797 | 6.2266 |
| 14 | 256 QAM | 885 | 6.9141 |
| 15 | 256 QAM | 948 | 7.4063 |

TABLE 16

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 616 | 2.4063 |
| 6 | 64 QAM | 567 | 3.3223 |
| 7 | 64 QAM | 666 | 3.9023 |
| 8 | 64 QAM | 772 | 4.5234 |
| 9 | 64 QAM | 873 | 5.1152 |
| 10 | 256 QAM | 711 | 5.5547 |
| 11 | 256 QAM | 797 | 6.2266 |
| 12 | 256 QAM | 885 | 6.9141 |
| 13 | 256 QAM | 948 | 7.4063 |
| 14 | 1024 QAM | 853 | 8.3301 |
| 15 | 1024 QAM | 948 | 9.2578 |

TABLE 17

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |

TABLE 17-continued

| MCS Index $I_{MCS}$ | Modulation Order Qm | Target code Rate R × [1024] | Spectral efficiency |
|---|---|---|---|
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 18

| MCS Index $I_{MCS}$ | Modulation Order Qm | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

TABLE 19

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 20

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3301 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

Table 21 and Table 22 below are MCS tables that may be used for MCS determination or configuration for a PUSCH to which transform precoding and 64 QAM are applied. The q values in Table 21 and Table 22 are determined depending on whether pi/2-BPSK is indicated, wherein q=1 if tp-pi2BPSK is configured in higher layer signaling, otherwise q=2.

TABLE 21

| MCS Index $I_{MCS}$ | Modulation Order Qm | Target code Rate R × [1024] | Spectral efficiency |
|---|---|---|---|
| 0 | q | 240/q | 0.2344 |
| 1 | q | 314/q | 0.3770 |
| 2 | 2 | 193 | 0.6016 |
| 3 | 2 | 251 | 0.8770 |
| 4 | 2 | 308 | 1.1758 |
| 5 | 2 | 379 | 1.4766 |
| 6 | 2 | 449 | 1.6953 |
| 7 | 2 | 526 | 1.9141 |
| 8 | 2 | 602 | 2.1602 |
| 9 | 2 | 679 | 2.4063 |
| 10 | 4 | 340 | 2.5703 |
| 11 | 4 | 378 | 2.7305 |
| 12 | 4 | 434 | 3.0293 |
| 13 | 4 | 490 | 3.3223 |
| 14 | 4 | 553 | 3.6094 |
| 15 | 4 | 616 | 3.9023 |
| 16 | 4 | 658 | 4.2129 |
| 17 | 6 | 466 | 4.5234 |
| 18 | 6 | 517 | 4.8164 |
| 19 | 6 | 567 | 5.1152 |
| 20 | 6 | 616 | 5.3320 |
| 21 | 6 | 666 | 5.5547 |
| 22 | 6 | 719 | 5.8906 |
| 23 | 6 | 772 | 6.2266 |
| 24 | 6 | 822 | 6.5703 |
| 25 | 6 | 873 | 6.9141 |
| 26 | 6 | 910 | 7.1602 |
| 27 | 6 | 948 | 7.4063 |
| 28 | q | reserved | |
| 29 | 2 | reserved | |
| 30 | 4 | reserved | |
| 31 | 6 | reserved | |

TABLE 22

| MCS Index $I_{MCS}$ | Modulation Order Qm | Target code Rate R × [1024] | Spectral efficiency |
|---|---|---|---|
| 0 | q | 60/q | 0.2344 |
| 1 | q | 80/q | 0.3770 |
| 2 | q | 100/q | 0.6016 |
| 3 | q | 128/q | 0.8770 |
| 4 | q | 156/q | 1.1758 |
| 5 | q | 198/q | 1.4766 |
| 6 | 2 | 120 | 1.6953 |
| 7 | 2 | 157 | 1.9141 |
| 8 | 2 | 193 | 2.1602 |
| 9 | 2 | 251 | 2.4063 |
| 10 | 2 | 308 | 2.5703 |
| 11 | 2 | 379 | 2.7305 |
| 12 | 2 | 449 | 3.0293 |
| 13 | 2 | 526 | 3.3223 |
| 14 | 2 | 602 | 3.6094 |
| 15 | 2 | 679 | 3.9023 |
| 16 | 4 | 378 | 4.2129 |
| 17 | 4 | 434 | 4.5234 |
| 18 | 4 | 490 | 4.8164 |
| 19 | 4 | 553 | 5.1152 |
| 20 | 4 | 616 | 5.3320 |
| 21 | 4 | 658 | 5.5547 |
| 22 | 4 | 699 | 5.8906 |
| 23 | 4 | 772 | 6.2266 |
| 24 | 6 | 567 | 6.5703 |
| 25 | 6 | 616 | 6.9141 |
| 26 | 6 | 666 | 7.1602 |
| 27 | 6 | 772 | 7.4063 |
| 28 | q | reserved | |
| 29 | 2 | reserved | |
| 30 | 4 | reserved | |
| 31 | 6 | reserved | |

When determining the CQI index is described in more detail, the terminal derives or determines a highest CQI index that satisfies the following conditions for a CQI value reported in uplink slot n.

COI Determination-1

A single PDSCH transport block having a combination of a modulation order (or technique), a target code rate, and a TBS, which corresponds to the CQI index, should be received such that the following transport block error probability is not exceeded.

If CSI-higher layer parameter cqi-Table (a parameter corresponding to the CQI table, and the name may be changed according to a standard version) included in CSI-ReportConfig configures (or indicates) Table 13 or Table 15 (or Table 16), a target transport block error probability is 0.1, and if CSI-higher layer parameter cqi-Table included in CSI-ReportConfig configures (or indicates) Table 14, the target transport block error probability is 0.00001 5

CQI determination-1 refers to a relationship of a target BLER of a single PDSCH transport block and the configured CQI table and CQI index with respect to when two target BLERs, such as 0.1 and 0.00001, exist in the system. Therefore, when the target BLER of the system is more subdivided, higher layer parameters may also be configured in a more subdivided manner. When the CQI table for the case where target BLER=0.001 is given as shown below in Table 23 or Table 10 24, configurations such as the following CQI determination-2 are also possible.

TABLE 23

| CQI index | modulation | code rate × 1024 | efficiency |
|---|---|---|---|
| 0 | out of range | | |
| 1 | QPSK | 50 | 0.0977 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16 QAM | 378 | 1.4766 |
| 9 | 16 QAM | 490 | 1.9141 |
| 10 | 16 QAM | 616 | 2.4063 |
| 11 | 64 QAM | 466 | 2.7305 |
| 12 | 64 QAM | 567 | 3.3223 |
| 13 | 64 QAM | 666 | 3.9023 |
| 14 | 64 QAM | 772 | 4.5234 |
| 15 | 64 QAM | 873 | 5.1152 |

TABLE 24

| CQI index | modulation | code rate × 1024 | efficiency |
|---|---|---|---|
| 0 | out of range | | |
| 1 | QPSK | 50 | 0.0977 |
| 2 | QPSK | 78 | 0.1523 |
| 3 | QPSK | 193 | 0.3770 |
| 4 | QPSK | 449 | 0.8770 |
| 5 | 16 QAM | 378 | 1.4766 |
| 6 | 16 QAM | 490 | 1.9141 |
| 7 | 16 QAM | 616 | 2.4063 |
| 8 | 64 QAM | 466 | 2.7305 |
| 9 | 64 QAM | 567 | 3.3223 |
| 10 | 64 QAM | 666 | 3.9023 |
| 11 | 64 QAM | 772 | 4.5234 |
| 12 | 64 QAM | 873 | 5.1152 |
| 13 | 256 QAM | 711 | 5.5547 |
| 14 | 256 QAM | 797 | 6.2266 |
| 15 | 256 QAM | 885 | 6.9141 |

CQI Determination-2

A single PDSCH transport block having a combination of a modulation order (or technique), a target code rate, and a TBS, which corresponds to the CQI index, should be received such that the following transport block error probability is not exceeded.

If CSI-higher layer parameter cqi-Table included in CSI-ReportConfig configures (or indicates) Table 13 or Table 14, the target transport block error probability is 0.1, if CSI-higher layer parameter cqi-Table included in CSI-ReportConfig configures (or indicates) Table 23 (or Table 24), the target transport block error probability is 0.001, and if CSI-higher layer parameter cqi-Table included in CSI-ReportConfig configures (or indicates) Table 15, the target transport block error probability is 0.00001.

Since the condition for the transport block error probability may indicate an approximate or substantial value, an actual BLER value that is satisfied in the communication system may have a value in a range slightly greater than or less than the values of 0.1 and 0.00001 defined in the standard at least temporarily. However, the system is operated so that an average transport block error probability is approximate to the above-defined values of 0.1 and 0.00001. The approximate value may be within 10% to 50% of the configured target BLER value, or may be in another range configured in the system.

In order to derive an appropriate target BLER value determined for CQI index reporting, such parameters as a resource use rate, such as the number of RE resources, terminal implementation capability for accurate CQI index estimation, a level of an SNR difference for each target BLER when multiple target BLERs exist and whether different CQI index reporting is possible, which is caused by the SNR difference, for each target BLER in various wireless communication environments, a terminal implementation complexity when the number of multiple target BLER types increases, should be considered.

When multiple target BLERs exist, the terminal reports a CQI index estimated based on at least one target BLER, and the target BLER value may be configured by a higher signal or signal L1.

In the current 5G NR system, 0.1 and 0.00001 are considered as target BLER values, wherein the latter case may be configured in consideration of a service requiring high reliability or low latency, for example, a service scenario such as URLLC. However, as LTE or 5G NR systems spread, more diverse services for different purposes are required. These various services may require various system conditions in consideration of not only reliability or low-latency characteristics, but also a location where a service is supported, average data traffic, and a terminal type according to each service. Accordingly, a target BLER may be different according to requirements of each service, and a CQI table or an MCS table to be used in a terminal or a base station may be differently configured according to the target BLER or a maximum modulation order required in the system.

Disclosed now is a method of designing a CQI table or configuring or using the designed CQI table in order to transmit CSI by a device (i.e., a base station or a terminal) including a transceiver and at least one processor coupled with the transceiver in the wireless communication system.

In particular, disclosed is a method of designing a CQI table or configuring or using the designed CQI table if supported services or maximum modulation orders are different from each other, and a method of determining, configuring, or using an appropriate MCS by using a designed MCS table or an appropriate MCS table corresponding to the CQI table.

In order to maintain signaling overhead at an LTE level, embodiments are disclosed for when the CQI and MCS indicators are maintained as 4 bits and 5 bits, respectively, and CQI index 0 is also defined as out of range. However, the disclosure is not limited thereto, and configuring the CQI indicator to 5 bits or configuring the MCS indicator to 6 bits is not excluded.

Embodiment 1 discloses a method of designing (or determining or configuring) a CQI table for when a maximum modulation order is 12, that is, a maximum modulation scheme is 4096 QAM, and a method of using the designed (or determined or configured) CQI table in a terminal or a base station. The CQI table is applicable not only to the 5G NR system but also to various wireless communication systems using 4096 QAM.

Embodiment 2 discloses a method of designing (or determining or configuring) an MCS table for when a maximum modulation order is 12, that is, a maximum modulation scheme is 4096 QAM, and a method of using the designed (or determined or configured) MCS table in a terminal or a base station. The MCS table is applicable not only to the 5G NR system but also to various wireless communication systems using 4096 QAM.

Embodiment 3 discloses an operation method and a method (used for MCS index determination) of using the CQI or MCS table, which is designed in Embodiment 1 and Embodiment 2, by a terminal or a base station if support of 4096 QAM is allowed in the 5G NR system.

Embodiment 4 discloses a limited buffer rate matching (LBRM) processing method when support of 4096 QAM is allowed in the 5G NR system.

Embodiment 5 discloses a phase tracking reference signal (PT-RS) reception method when support of 4096 QAM is allowed in the 5G NR system.

Embodiment 6 discloses a method of defining and using RRC signaling and a method of defining and using a physical layer parameter for reporting or configuring UE capability.

Embodiment 7 discloses a method of determining a processing time when support of 4096 QAM is allowed in the 5G or NR system.

Some or all of the respective embodiments may be selectively combined and configured to achieve various implementations via the disclosure.

Embodiment 1

SNR-based channel capacity may be expressed by the number of bits (unit: bits/sec) transmittable in 1 second, bandwidth efficiency in a form normalized to bandwidth, that is, the number of bits (unit: bits/sec/Hz) transmittable when a bandwidth of 1 Hz per second is used, or the number of bits (unit: bits/channel use) transmittable when a channel is used once regardless of bandwidth or time constraints. The channel capacity may vary depending on an available bandwidth. However, when considering a bandwidth-limited waveform having a bandwidth of W [Hz] according to Nyquist-Shannon's sampling theory, since a corresponding signal can be restored by a fixed sampling operation of 2 W per second (=2 W [channel use/sec]), the three values may be considered to have a substantially 1:1 correspondence relationship. In some cases, since a minimum average SNR value for successful transmission of a specific number of bits is referred to as SNR limit or SNR-based channel capacity, depending on an application situation, the channel capacity may be expressed based on the number of transmittable bits or as a minimum SNR value required to transmit the number of bits. Both cases have practically the same concept.

It may be expected intuitively that the channel capacity is influenced by a BLER of a reception bit allowed by the system. For example, when channel coding having code rate R is applied, if channel capacity based on an SNR, in which error free has been assumed, is $C_{SNR}(R)$, channel capacity $C_{SNR,b}(R)$ of when a target bit error rate is Pb may have a relationship in which $C_{SNR,b}(R)<C_{SNR}(R)$. This is because, in a system for a strong condition where the system is error free, an SNR level required under a condition allowing a certain degree of a bit error rate or BLER is low.

Accordingly, since an operation SNR is also variable according to the allowable system target bit error rate or BLER, an optimized modulation order and code rate combination or a target spectral efficiency value may be changed according to the target bit error rate. A bit error rate against an SNR increase decreases exponentially. Therefore, it is necessary to design or configure an optimal CQI table or MCS table by considering a log-scale for the target BLER or bit error rate. For this reason, indices included in the CQI table or the MCS table are typically determined uniformly so as to have an operation SNR interval supporting the target BLER of the system.

As another method of uniformly determining indices included in the CQI table or MCS table, there is a method of determining theoretical spectral efficiency to be as uniform as possible. Depending on a channel coding scheme, actual spectral efficiency according to the operation SNR may be slightly different from the theoretical spectral efficiency, but when an excellent channel coding scheme, such as LDPC coding, Turbo coding, or Polar coding, is applied, the difference is insignificant. Thus, the CQI or MCS table may be designed or determined based on the theoretical spectral efficiency when it is difficult to accurately predict the operation SNR of the system.

Typical channel capacity increases along a log-scale as an SNR increases. However, this corresponds only to when no restriction exists on a modulation scheme, and in reality, depending on a modulation scheme, channel capacity may have a very clear upper limit value. If a system uses a 1024 QAM modulation scheme, the system is assumed to operate on an error-free channel. even if channel coding is not applied (i.e., coding rate=1), only a maximum of 10 bits can be transmitted when the channel is used once, so that 10 cannot be exceeded based on [bits/channel use] regardless of the SNR level. In this case, when a modulation scheme, such as QAM, is determined, channel capacity increases in a log-scale according to an SNR, and when a value approaches a modulation order value, convergence occurs very rapidly, causing the channel capacity to slowly increase.

In order to configure the CQI table or the MCS table as described above, a combination of a modulation scheme and a code rate, which is suitable for the system, may be determined only by considering a channel coding type, a target BLER, and a modulation scheme.

Examples of the CQI table for the system using 4096 QAM are shown below in Table 25 and Table 26.

TABLE 25

| CQI index | modulation | code rate × 1024 | efficiency |
|---|---|---|---|
| 0 | | out of range | |
| 1 | QPSK | 449 | 0.8770 |

TABLE 25-continued

| CQI index | modulation | code rate × 1024 | efficiency |
|---|---|---|---|
| 2 | 16 QAM | 378 | 1.4766 |
| 3 | 16 QAM | 616 | 2.4063 |
| 4 | 64 QAM | 567 | 3.3223 |
| 5 | 64 QAM | 666 | 3.9023 |
| 6 | 64 QAM | 772 | 4.5234 |
| 7 | 64 QAM | 873 | 5.1152 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 853 | 8.3301 |
| 13 | 1024 QAM | 948 | 9.2578 |
| 14 | 4096 QAM | 869 | 10.1836 |
| 15 | 4096 QAM | 948 | 11.1094 |

TABLE 26

| CQI index | modulation | code rate × 1024 | efficiency |
|---|---|---|---|
| 0 | | out of range | |
| 1 | 16 QAM | 378 | 1.4766 |
| 2 | 16 QAM | 490 (or 497) | 1.9141 (or 1.9414) |
| 3 | 16 QAM | 616 | 2.4063 |
| 4 | 64 QAM | 567 | 3.3223 |
| 5 | 64 QAM | 666 | 3.9023 |
| 6 | 64 QAM | 772 | 4.5234 |
| 7 | 64 QAM | 873 | 5.1152 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 853 | 8.3301 |
| 13 | 1024 QAM | 948 | 9.2578 |
| 14 | 4096 QAM | 869 | 10.1836 |
| 15 | 4096 QAM | 948 | 11.1094 |

The system capable of using 4096 QAM refers to an environment in which a very large SNR value is obtainable in communication between a terminal and a base station. It is thus expected that using a low-order modulation scheme is an inefficient environment from an average point of view. Therefore, since it is undesirable to use a possible QPSK modulation scheme, it is configured to include lesson more than one QPSK modulation scheme in the CQI table. For example, in a CQI index 1, it may be seen that a combination having low spectral efficiency in Table 13 to Table 16, such as (modulation scheme, code rate)=(QPSK, 30/1024), (QPSK, 50/1024), or (QPSK, 78/1024), is an undesirable combination. That is, the CQI table corresponding to 4096 QAM preferably has a value greater than or equal to 0.2344 corresponding to when the spectral efficiency is at least (modulation scheme, code rate)=(QPSK, 120/1024). For example, Table 25 is a CQI table designed based on Table 16, a 1024 QAM CQI table, and is when, among QPSK-related combinations in Table 16, combinations of (modulation scheme, code rate)=(QPSK, 78/1024) and (QPSK, 193/1024) corresponding to respective CQI indices 1 and 2 are removed, and two combinations corresponding to 4096 QAM are added. When only one QPSK modulation scheme is included, combinations corresponding to CQI indices 1 and 3 may be removed and (QPSK, 193/1024) instead of (QPSK, 449/1024) may be added to index 1 of a new CQI table among the QPSK-related combinations in Table 16. In addition, with respect to CQI index 1, a combination included in another CQI table, a combination such as (QPSK, 308/1024) or (QPSK, 602/1024) is also possible.

Since Table 25 is configured by, in a 1024 QAM CQI table such as Table 16, removing two (modulation scheme, code rate) combinations corresponding to QPSK and adding two (modulation scheme, code rate) combinations corresponding to 4096 QAM, the number of (modulation scheme, code rate) (or spectral efficiency) combinations included in the CQI table are 1, 2, 4, 4, 2, and 2 according to respective modulation schemes for cases of the QPSK modulation scheme (or modulation order 2), the 16 QAM modulation scheme (or modulation order 4), the 64 QAM modulation scheme (or modulation order 6), the 256 QAM modulation scheme (or modulation order 8), the 1024 QAM modulation scheme (or modulation order 10), and the 4096 QAM modulation scheme (or modulation order 12), respectively.

However, Table 26 corresponds to when a minimum modulation order is configured to 4 by disregarding the QPSK modulation scheme. Since Table 26 is configured by, in a 1024 QAM CQI table such as Table 16, removing all three (modulation scheme, code rate) combinations corresponding to QPSK and adding one (modulation scheme, code rate) combination corresponding to 16 QAM and two (modulation scheme, code rate) combinations corresponding to 4096 QAM, the number of (modulation scheme, code rate) combinations included in the CQI table are 3, 4, 4, 2, and 2 according to respective modulation schemes for cases of the 16 QAM modulation scheme (or modulation order 4), the 64 QAM modulation scheme (or modulation order 6), the 256 QAM modulation scheme (or modulation order 8), the 1024 QAM modulation scheme (or modulation order 10), and the 4096 QAM modulation scheme (or modulation order 12), respectively.

In Table 26, (16 QAM, 490/1024) (spectral efficiency=1.9141) has been added as a (modulation method, code rate) combination, which is when a value corresponding to spectral efficiency between (16 QAM, 378/1024) and (16 QAM, 616/1024) is applied in Table 13 to Table 20. In a newly designed CQI table, 497/1024 which is an average value of 378/1024 and 616/1024 may be applied as a code rate.

If the system supports wide spectral efficiency with respect to QPSK to 4096 QAM, a CQI table including two QPSK combinations may be considered as shown below in Table 27.

TABLE 27

| CQI index | modulation | code rate × 1024 | efficiency |
|---|---|---|---|
| 0 | | out of range | |
| 1 | QPSK | 193 | 0.3770 |
| 2 | QPSK | 449 | 0.8770 |
| 3 | 16 QAM | 378 | 1.4766 |
| 4 | 16 QAM | 616 | 2.4063 |
| 5 | 64 QAM | 567 | 3.3223 |
| 6 | 64 QAM | 666 | 3.9023 |
| 7 | 64 QAM | 772 | 4.5234 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 853 | 8.3301 |
| 13 | 1024 QAM | 948 | 9.2578 |
| 14 | 4096 QAM | 869 | 10.1836 |
| 15 | 4096 QAM | 948 | 11.1094 |

Since Table 27 is configured by, in a 1024 QAM CQI table such as Table 16, removing one (modulation scheme, code rate) combination corresponding to QPSK and one (modulation scheme, code rate) combination corresponding to 64 QAM and adding two (modulation scheme, code rate) combinations corresponding to 4096 QAM, the number of (modulation scheme, code rate) combinations included in the CQI table are 2, 2, 3, 4, 2, and 2 according to respective modulation schemes for cases of the QPSK modulation scheme (or modulation order 2), the 16 QAM modulation scheme (or modulation order 4), the 64 QAM modulation scheme (or modulation order 6), the 256 QAM modulation scheme (or modulation order 8), the 1024 QAM modulation scheme (or modulation order 10), and the 4096 QAM modulation scheme (or modulation order 12), respectively.

A characteristic of a CQI table such as Table 27 corresponds to including two or more combinations for each modulation scheme for flexible support of large-scale spectral efficiency, wherein a combination corresponding to 64 QAM is excluded to maximally include a combination included in existing CQI tables (particularly, 1024 QAM). A combination corresponding to 256 QAM may be excluded. However, as described above, since a situation in which 4096 QAM is applicable is likely to be a very good channel environment, it may be desirable to maintain a combination corresponding to high spectral efficiency or a high-order modulation scheme.

Table 25 to Table 27 and various modified embodiments all include two (modulation scheme, code rate) combinations corresponding to 4096 QAM. As described above for the channel capacity, if a code rate is configured too high and spectral efficiency thus has a value too close to 12, a very high SNR needs to be obtained to satisfy the spectral efficiency while satisfying a target BLER, so that a very high transmission power may be required for a terminal or a base station. Herein, therefore, a maximum code rate is limited to 948/1024 so as to have a sufficient difference from theoretically transmittable spectral efficiency 12. That is, the limitation indicates that maximum spectral efficiency corresponding to CQI index 15 on the CQI table corresponding to 4096 QAM is 11.1094.

A spectral efficiency value corresponding to CQI index 14 may be determined based on (modulation scheme, code rate) combinations of index 13 and index 15, wherein the value may be configured using the following average value: ½× (948/1024×10+948/1024×12). A code rate enabling to support the spectral efficiency for 4096 QAM may be determined as 869/1024. The spectral efficiency value may also be determined using an approximate value within −3% to +3% of an exact average value, in which case, an approximate value, such as 868, 868.5, 869.5, or 870, may be determined as a [code rate×1024] value. (The spectral efficiency in each case is 10.1719 or 10.1953) Accordingly, the disclosed CQI table corresponding to 4096 QAM includes (4096 QAM, 869/1024) for index 14 and (4096 QAM, 948/1024) for index 15 as shown below in Table 28.

TABLE 28

| CQI index | modulation | code rate × 1024 | efficiency |
|---|---|---|---|
| 0 | | out of range | |
| 1 | — | — | — |
| ... | ... | ... | ... |
| 13 | — | — | — |
| 14 | 4096 QAM | 869 | 10.1836 |
| 15 | 4096 QAM | 948 | 11.1094 |

Table 25 to Table 28 described above and other disclosed CQI tables may also be configured and used as parameter cqi_Table in [CQI determination-1] or [CQI determination-2] by a terminal or a base station.

Embodiment 2

Embodiment 2 describes a method of, in a wireless communication system such as 5G NR, designing an appropriate MCS table when a 4096 QAM modulation scheme having a maximum modulation order of 12 is allowed and a method of data transmission or reception based on the MCS table.

A newly defined MCS table is designed based on one of a 5G NR system, a newly designed CQI table, or an MCS table as shown above in Table 13 to Table 28. For convenience, descriptions are provided for when the 4096 QAM modulation scheme, i.e., modulation order 12, corresponds to MCS indices 22 to 25 or MCS indices 23 to 26.

In Table 16, Table 20 or Table 25 to Table 27, a value with a highest code rate corresponding to 1024 QAM is 948/1024, which can be expressed as a (modulation order, code rate) combination such as (10, 948/1024), and spectral efficiency in this case may be rounded up and displayed only up to 4 decimal places for convenience and regarded as 9.2578. It is assumed that a newly designed MCS table having a maximum modulation order of 12 includes a (10, 948/1024) combination corresponding to a largest value among MCS index values corresponding to 1024 QAM. That is, it is described herein when the (10, 948/1024) combination corresponds to MCS index 21 or 22 for convenience of description, but the disclosure is not limited thereto.

When a largest value among the MCS index values corresponding to 1024 QAM is 21, and a (modulation order, code rate) combination corresponding thereto is (10, 948/1024), it is preferable to configure MCS index 22 to a spectral efficiency average value or a value close to the average corresponding to each of CQI indices 13 and 14 in CQI Table 25 to Table 27. For example, the average value of spectral efficiency of CQI index 13 and spectral efficiency of CQI index 14 in Table 25 to Table 27 may be obtained by Equation (2) as follows.

$$\tfrac{1}{2} \times (948/1024 \times 10 + 869/1024 \times 12) \approx 9.7207 \quad (2)$$

For spectral efficiency corresponding to index 22 of a newly defined MCS table, the spectral efficiency may be defined (or determined) by an approximate value of the average value instead of the exact average value, wherein the approximate value may be within +3% or −3% of the exact average value.

When a modulation order corresponding to index 22 in the MCS table is 12, and the spectral efficiency is expressed as $\tfrac{1}{2} \times (948/1024 \times 10 + 869/1024 \times 12)$, [code rate (R)×1024] has a value of 829.5. In this case, the spectral efficiency may be an approximate value which is 9.7207. If an approximate value of 829.5, such as 829 or 830, is selected as the [code rate (R)×1024] value, spectral efficiency may be determined to be 9.7148 and 9.7266, respectively.

As for spectral efficiency and a [code rate (R)×1024] value which correspond to MCS index 23 of the newly defined MCS table, values corresponding to CQI table index 14 of Table 25 to Table 28 may be used as they are. Similarly, as for spectral efficiency and a [code rate (R)× 1024] value which correspond to MCS index 25, values corresponding to CQI table index 15 of Table 25 to Table 28 may be used.

Spectral efficiency corresponding to MCS index 24 of the newly defined MCS table may be determined to be an average value of values corresponding to CQI index 14 and CQI index 15 in Table 25 to Table 28 or an approximate value of the average value. Alternatively, the spectral efficiency may be determined to be an average value of values corresponding to MCS index 23 and MCS index 25 or an approximate value of the average value.

As for MCS index 24, it is preferable to configure spectral efficiency to an average value of spectral efficiency corresponding to each of CQI indices 14 and 15 in CQI Table 25 to Table 27. For example, the average value of the spectral efficiency of CQI index 13 and the spectral efficiency of CQI index 14 of Table 25 to Table 27 may be obtained by Equation (3) as follows.

$$\tfrac{1}{2} \times (869/1024 \times 12 + 948/1024 \times 12) = 10.6465 \quad (3)$$

If a modulation order corresponding to index 24 in the MCS table is 12, and the spectral efficiency is expressed as $\tfrac{1}{2} \times (869/1024 \times 12 + 948/1024 \times 12)$, [code rate (R)×1024] has a value of 908.5. In this case, the spectral efficiency may be an approximate value which is 10.6465. If an approximate value of 908.5, such as 908 or 909, is selected as the [code rate (R)×1024] value, spectral efficiency may be determined to be 10.6406 and 10.6523, respectively.

Table 29 below illustrates an MCS table designed in consideration of the above-described methods. If a last MCS index corresponding to 1024 QAM is I, and (MCS index, modulation order, code rate) corresponds to (I, 10, 948/1024) so that (MCS index, modulation order, code rate)=(I, 10, 948/1024), (MCS index, modulation order, code rate) may correspond to (I+1, 12, 829.5/1024) (or (I+1, 12, 829/1024) or (I+1, 12, 830)/1024)), and (I+2, 12, 869/1024) (or a combination corresponding to index 14 of the CQI table corresponding to 4096 QAM), (I+3, 12, 908.5/1024) (or (I+3, 12, 908/1024) or (I+3, 12, 909)/1024)), and (I+4, 12, 948/1024) (or a combination corresponding to index 15 of the CQI table corresponding to 4096 QAM) may be determined in subsequent indices.

TABLE 29

| MCS index $I_{MCS}$ | Modulation Order Qm | Target Code Rate [R × 1024] | Spectral Efficiency |
|---|---|---|---|
| 0 | — | — | — |
| 1 | — | — | — |
| ... | ... | ... | ... |
|  | 12 | 829.5 | 9.7207 |
|  | 12 | 869 | 10.1836 |
|  | 12 | 908.5 | 10.6465 |
|  | 12 | 948 | 11.1094 |
| ... | ... | ... | ... |
| 31 | 12 |  | reserved |

For example, if I=21, expression may be made as (21, 10, 948/1024), (22, 12, 829.5/1024), (23, 12, 869/1024), (24, 12, 908.5/1024), and (25, 12, 948/1024), and if I=22, expression may be made as (22, 10, 948/1024), (23, 12, 829.5/1024), (24, 12, 869/1024), (25, 12, 908.5/1024), and (26, 12, 948/1024). The above example illustrates that each [code rate (R)×1024] value is allowed up to a unit of 0.5. However, if an integer value is applied as much as possible, combinations such as (10, 948/1024), (12, 829/1024), (12, 868/1024), (12, 908/1024), (12, 948/1024) or (10, 948/1024), (12, 830/1024), (12, 870/1024), (12, 909/1024), (12, 948/1024) may also be expressed. If the MCS table using 4096 QAM is configured, a reserved field corresponding to retransmission or HARQ operation may be assigned for last MCS index 31. The reserved field may be used for various purposes depending on the system. In particular, the reserved field may be used during retransmission or HARQ operation, may indicate transmission of the same transport block as a previously transmitted transport block, and may indicate that application has been made in the same manner as that for a previously applied MCS. That is, the reserved field may indicate that the same modulation scheme and the same code rate are used for the same transport block.

Table 30, Table 31 and Table 32 below illustrate an embodiment of an MCS table that may be used for MCS determination or configuration with respect to when up to 4096 QAM can be used for a PDSCH or a PUSCH, based on Table 29 and various modifications thereof and Table 20.

TABLE 30

| MCS Index $I_{MCS}$ | Modulation Order Qm | Target code Rate R × [1024] | Spectral efficiency |
|---|---|---|---|
| 0 | 2 | 449 | 0.8770 |
| 1 | 4 | 378 | 1.4766 |
| 2 | 4 | 616 | 2.4063 |
| 3 | 6 | 517 | 3.0293 |
| 4 | 6 | 567 | 3.3223 |
| 5 | 6 | 616 | 3.6094 |
| 6 | 6 | 666 | 3.9023 |
| 7 | 6 | 719 | 4.2129 |
| 8 | 6 | 772 | 4.5234 |
| 9 | 6 | 822 | 4.8164 |
| 10 | 6 | 873 | 5.1152 |
| 11 | 8 | 711 | 5.5547 |
| 12 | 8 | 754 | 5.8906 |
| 13 | 8 | 797 | 6.2266 |
| 14 | 8 | 841 | 6.5703 |
| 15 | 8 | 885 | 6.9141 |
| 16 | 8 | 916.5 | 7.1602 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 829.5 | 9.7207 |
| 23 | 12 | 869 | 10.1836 |
| 24 | 12 | 908.5 | 10.6465 |
| 25 | 12 | 948 | 11.1094 |
| 26 | 2 | reserved | |
| 27 | 4 | reserved | |
| 28 | 6 | reserved | |
| 29 | 8 | reserved | |
| 30 | 10 | reserved | |
| 31 | 12 | reserved | |

TABLE 31

| MCS Index $I_{MCS}$ | Modulation Order Qm | Target code Rate R × [1024] | Spectral efficiency |
|---|---|---|---|
| 0 | 2 | 193 | 0.3770 |
| 1 | 2 | 449 | 0.8770 |
| 2 | 4 | 378 | 1.4766 |
| 3 | 4 | 616 | 2.4063 |
| 4 | 6 | 517 | 3.0293 |
| 5 | 6 | 567 | 3.3223 |
| 6 | 6 | 616 | 3.6094 |
| 7 | 6 | 666 | 3.9023 |
| 8 | 6 | 719 | 4.2129 |
| 9 | 6 | 772 | 4.5234 |
| 10 | 6 | 822 | 4.8164 |
| 11 | 8 | 711 | 5.5547 |
| 12 | 8 | 754 | 5.8906 |
| 13 | 8 | 797 | 6.2266 |
| 14 | 8 | 841 | 6.5703 |
| 15 | 8 | 885 | 6.9141 |
| 16 | 8 | 916.5 | 7.1602 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 829.5 | 9.7207 |
| 23 | 12 | 869 | 10.1836 |
| 24 | 12 | 908.5 | 10.6465 |
| 25 | 12 | 948 | 11.1094 |
| 26 | 2 | reserved | |
| 27 | 4 | reserved | |
| 28 | 6 | reserved | |
| 29 | 8 | reserved | |
| 30 | 10 | reserved | |
| 31 | 12 | reserved | |

TABLE 32

| MCS Index $I_{MCS}$ | Modulation Order Qm | Target code Rate R × [1024] | Spectral efficiency |
|---|---|---|---|
| 0 | 2 | 193 | 0.3770 |
| 1 | 2 | 449 | 0.8770 |
| 2 | 4 | 378 | 1.4766 |
| 3 | 4 | 616 | 2.4063 |
| 4 | 6 | 517 | 3.0293 |
| 5 | 6 | 567 | 3.3223 |
| 6 | 6 | 616 | 3.6094 |
| 7 | 6 | 666 | 3.9023 |
| 8 | 6 | 719 | 4.2129 |
| 9 | 6 | 772 | 4.5234 |
| 10 | 6 | 822 | 4.8164 |
| 11 | 6 | 873 | 5.1152 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 829.5 | 9.7207 |
| 23 | 12 | 869 | 10.1836 |
| 24 | 12 | 908.5 | 10.6465 |
| 25 | 12 | 948 | 11.1094 |
| 26 | 2 | reserved | |
| 27 | 4 | reserved | |
| 28 | 6 | reserved | |
| 29 | 8 | reserved | |
| 30 | 10 | reserved | |
| 31 | 12 | reserved | |

Table 30 illustrates when, in an MCS table for 1024 QAM such as Table 20, two (modulation order, code rate) combinations corresponding to QPSK are removed, one (modulation order, code rate) combination corresponding to each of 16 QAM, 64 QAM, and 256 QAM is removed, and four (modulation order, code rate) combinations corresponding to 4096 QAM and a reserved field are added.

Table 31 illustrates when, in an MCS table for 1024 QAM such as Table 20, one (modulation order, code rate) combination corresponding to each of QPSK, 16 QAM, and 256 QAM is removed, two (modulation order, code rate) combinations corresponding to 64 QAM are removed, and four (modulation order, code rate) combinations corresponding to 4096 QAM and a reserved field are added. Table 32 illustrates when, in an MCS table for 1024 QAM such as Table 20, one (modulation order, code rate) combination corresponding to each of QPSK, 16 QAM, and 64 QAM is removed, one (modulation order, code rate) combination corresponding to 256 QAM is removed, and four (modulation order, code rate) combinations corresponding to 4096 QAM and a reserved field are added.

If an MCS table does not support the QPSK modulation scheme, a modulation order of a lowest index may be configured to be 4 as shown below in Table 33.

Table 33 illustrates when, in an MCS table for 1024 QAM such as Table 20, all three (modulation order, code rate) combinations corresponding to QPSK are removed, one (modulation order, code rate) combination corresponding to 64 QAM is removed, and four (modulation order, code rate) combinations corresponding to 4096 QAM and a reserved field are added. For an MCS table, from which a modulation order 2 has been excluded, as shown in Table 33, a reserved field for modulation order 2 may not be included.

TABLE 33

| MCS Index $I_{MCS}$ | Modulation Order Qm | Target code Rate R × [1024] | Spectral efficiency |
|---|---|---|---|
| 0 | 4 | 378 | 1.4766 |
| 1 | 4 | 490 | 1.9141 |
| 2 | 4 | 616 | 2.4063 |
| 3 | 6 | 517 | 3.0293 |
| 4 | 6 | 567 | 3.3223 |
| 5 | 6 | 616 | 3.6094 |
| 6 | 6 | 666 | 3.9023 |
| 7 | 6 | 719 | 4.2129 |
| 8 | 6 | 772 | 4.5234 |
| 9 | 6 | 822 | 4.8164 |
| 10 | 6 | 873 | 5.1152 |
| 11 | 8 | 682.5 | 5.3320 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 8 | 948 | 7.4063 |
| 19 | 10 | 805.5 | 7.8662 |
| 20 | 10 | 853 | 8.3301 |
| 21 | 10 | 900.5 | 8.7939 |
| 22 | 10 | 948 | 9.2578 |
| 23 | 12 | 829.5 | 9.7207 |
| 24 | 12 | 869 | 10.1836 |
| 25 | 12 | 908.5 | 10.6465 |
| 26 | 12 | 948 | 11.1094 |
| 27 | 4 | reserved | |
| 28 | 6 | reserved | |
| 29 | 8 | reserved | |
| 30 | 10 | reserved | |
| 31 | 12 | reserved | |

Table 30 to Table 33 include (modulation order, code rate) combinations for modulation order 12 shown in Table 29, and (modulation order, code) combinations for other modulation orders may be defined differently according to system requirements. In each MCS table, combinations of a modulation order and a code rate, which correspond to some MCS levels, may be excluded or changed. A new MCS table may be generated by appropriately combining combinations of a modulation order and a code rate of each MCS table. Typically, a combination of MCS index 0 indicates a most robust modulation order and code rate combination that the system can tolerate, and therefore MCS index 0 may be defined to be a (modulation order, code rate) combination having less than or equal to the spectral efficiency of a (modulation order, code rate) combination having a lowest spectral efficiency in the CQI table.

Each of spectral efficiency values in the CQI or MCS table may be replaced with an approximate value within −3% to +3%, and accordingly, a [code Rate (R)×1024] value may also be slightly changed. For example, when a spectral efficiency value for index i is SE(i), a [coding rate (R)×1024] value may be generally configured to have one of $\lfloor SE(i)/10\times1024 \rfloor$, $\lceil SE(i)/10\times1024 \rceil$, $\lfloor SE(i)/10\times1024 \rfloor \pm 0.5$, or $\lceil SE(i)/10\times1024 \rceil \pm 0.5$ values, where $\lfloor \cdot \rfloor$ refers to a flooring operation and $\lceil \cdot \rceil$ refers to a ceiling operation.

Embodiment 3

In Embodiments 1 and 2, a method of designing or determining a CQI table or an MCS table to be stored in a base station or a terminal so as to be used to determine CQI or MCS indices has been described.

In the current 5G NR system, different CQI and MCS tables may be used depending on an order of a maximum modulation scheme that a terminal supports.

In this case, by applying different CQI tables according to a target BLER and a maximum modulation order required by the system, a terminal may determine or indicate an appropriate CQI index and transmit a value thereof to a base station. Accordingly, the base station may configure or indicate an MCS index, i.e., a combination of a modulation scheme and a target code rate, based on an appropriate MCS table on the basis of a corresponding CQI index or a CQI value corresponding thereto.

As a specific method, in the 5G NR system, an MCS index for a PDSCH, that is, modulation order (or scheme) Qm and target code rate R, is determined as follows.

With respect to a PDSCH scheduled via a PDCCH including DCI format 1_0 or format 1_1 with a CRC scrambled by C-RNTI, MCS-C-RNTI, TC-RNTI, CS-RNTI, SI-RNTI, RA-RNTI, or P-RNTI, or with respect to a PDSCH scheduled using PDSCH configuration SPS-Config provided by a higher layer without corresponding PDCCH transmission, (a) When higher layer parameter mes-Table given by PDSCH-Config has been configured to qam256, and the PDSCH has been scheduled by the PDCCH of DCI format 1_1 that is together with the CRC scrambled by C-RNTI, a UE uses the MCS index $I_{MCS}$ value of Table 17 to determine modulation order Qm and target code rate R.

(b) When the conditions of section (a) are not satisfied, the UE has not been configured by MCS-C-RNTI (UE is not configured with MCS-C-RNTI), higher layer parameter mes-Tablegiven by PDSCH-Config has been configured to qam64LowSE, and the PDSCH has been scheduled by the PDCCH in a UE-specific search space with the CRC scrambled by C-RNTI, the UE uses the MCS index $I_{MCS}$ value of Table 14 to determine modulation order Qm and target code rate R.

(c) When the conditions of sections (a) and (b) are not satisfied, the UE has been configured by MCS-C-RNTI, and the PDSCH has been scheduled by the PDCCH to which the CRC scrambled by MCS-C-RNTI is applied, the UE uses the MCS index $I_{MCS}$ value of Table 18 to determine modulation order Qm and target code rate R.

(d) When the conditions of (a), (b), and (c) are not satisfied, and the UE has not been configured by higher layer parameter mcs-Table given by SPC-Config, higher layer parameter mcs-Table given by PDSCH-Config has been set to qam256, and (d-1) the PDSCH has been scheduled by the PDCCH of DCI format 1_1 to which the CRC scrambled by CS-RNTI is applied, or (d-2) the PDSCH has been scheduled without corresponding SPDCCH transmission using SPS-Config, the UE uses the MCS index $I_{MCS}$ value of Table 17 to determine modulation order Qm and target code rate R.

(e) When the conditions of sections (a) to (d) are not satisfied, and higher layer parameter mcs-Table given by SPC-Config has been set to qam64LowSE and the UE is thus configured,
(e-1) if the PDSCH has been scheduled by the PDCCH to which the CRC scrambled by CS-RNTI is applied, or
(e-2) the PDSCH has been scheduled without corresponding PDCCH transmission using SPS-Config,
the UE uses the MCS index $I_{MCS}$ value of Table 18 to determine modulation order Qm and target code rate R.
(f) When the conditions of sections (a) to (e) are not satisfied, the UE uses the MCS index $I_{MCS}$ value of Table 16 to determine modulation order Qm and target code rate R.

Contents of determining the MCS index for the PDSCH, i.e., modulation order (or method) Qm and target code rate R, correspond to the following contents of the standards.

For the PDSCH scheduled by a PDCCH with DCI format 1_0 or format 1_1 with CRC scrambled by C-RNTI, MCS-C-RNTI, TC-RNTI, CS-RNTI, SI-RNTI, RA-RNTI, or P-RNTI, or for the PDSCH scheduled without corresponding PDCCH transmissions using the higher-layer-provided PDSCH configuration SPS-Config, (a) if the higher layer parameter mcs-Table given by PDSCH-Config is set to qam256, and the PDSCH is scheduled by a PDCCH with DCI format 1_1 with CRC scrambled by C-RNTI, the UE shall use $I_{MCS}$ and Table 19 to determine the modulation order ($Q_m$) and Target code rate (R) used in the physical downlink shared channel.
(b) else if the UE is not configured with MCS-C-RNTI, the higher layer parameter mcs-Table given by PDSCH-Config is set to qam64LowSE, and the PDSCH is scheduled by a PDCCH in a UE-specific search space with CRC scrambled by C-RNTI, the UE shall use $I_{MCS}$ and Table 18 to determine the modulation order ($Q_m$) and Target code rate (R) used in the physical downlink shared channel.
(c) else if the UE is configured with MCS-C-RNTI, and the PDSCH is scheduled by a PDCCH with CRC scrambled by MCS-C-RNTI, the UE shall use $I_{MCS}$ and Table 18 to determine the modulation order ($Q_m$) and Target code rate (R) used in the physical downlink shared channel.
(d) else if the UE is not configured with the higher layer parameter mes-Table given by SPS-Config, the higher layer parameter mcs-Table given by PDSCH-Config is set to qam256, if the PDSCH is scheduled by a PDCCH with DCI format 1_1 with CRC scrambled by CS-RNTI or if the PDSCH is scheduled without corresponding PDCCH transmission using SPS-Config, the UE shall use $I_{MCS}$ and [Table 15] to determine the modulation order ($Q_m$) and Target code rate (R) used in the physical downlink shared channel.
(e) else if the UE is configured with the higher layer parameter mes-Table given by SPS-Config set to qam64LowSE if the PDSCH is scheduled by a PDCCH with CRC scrambled by CS-RNTI or if the PDSCH is scheduled without corresponding PDCCH transmission using SPS-Config, the UE shall use $I_{MCS}$ and Table 18 to determine the modulation order ($Q_m$) and Target code rate (R) used in the physical downlink shared channel.
(f) else the UE shall use $I_{MCS}$ and Table 17 to determine the modulation order ($Q_m$) and Target code rate (R) used in the physical downlink shared channel.
end If a modulation scheme, such as 1024 QAM or 4096 QAM, is used for a specific service scenario, a specific condition may be added and used between or before/after the above conditions (a), (b), (c), (d), (e), and (f). For example, at least one of the MCS tables included in the specification may be used based on a modulation order by adding or subdividing conditions, according to configured values of mcs-Table of higher layer signaling PDSCH-Config and mcs-Table of SPS-Config, or whether the PDSCH has been scheduled based on the PDCCH, to which a CRC scrambled by a specific RNTI (e.g., C-RNTI, MCS-C-RNTI, TC-RNTI, CS-RNTI, SI-RNTI, RA-RNTI, or P-RNTI, etc.) is applied.

The parameter mes-Table value may be set to a value other than qam256 or qam64LowSE. For example, when the value is configured to a parameter with a different name, such as qam64MidSE, it may be configured to use an MCS table, in which a target BLER is less than 0.1 and is greater than 0.00001 (e.g., the target BLER is close to 0.001) and 64 QAM is defined as a maximum modulation scheme, and similarly, for qam1024 and qam4096, it may be configured to use one of MCS tables corresponding to 4096 QAM, such as Table 29 to Table 33, or an MCS table corresponding to 1024 QAM, such as Table 20. In general, when maximum modulation orders or values of target BLER supportable in a system or a terminal are more diverse, and more various service scenarios are considered, more MCS tables may be additionally used.

As another specific method, in the 5G NR system, with respect to a PUSCH scheduled by a random access response (RAR) UL grant, a PUSCH scheduled by DCI format 0_0 CRC-scrambled by C-RNTI, MCS-C-RNTI, TC-RNTI, or CS-RNTI, a PUSCH scheduled by DCI format 0_1 CRC-scrambled by C-RNTI, MCS-C-RNTI, CS-RNTI, or SP-CSI-RNTI, or a PUSCH having a grant configured using CS-RNTI (a PUSCH with configured grant using CS-RNTI), the MCS index for the PUSCH, that is, modulation order (or scheme) Qm and target code rate R, is determined according to at least one of:

a type in which a PUSCH is scheduled,
whether transform precoding is disabled or enabled,
a value (e.g., qam256 or qam64LowSE) set to parameter mcs-Table or mcs-Table TransformPrecoder of higher layer signaling pusch-Config,
a value (e.g., qam256 or qam64LowSE) set to parameter mcs-Table or mcs-TableTransformPrecoder of higher layer signaling configuredGrantConfig, and
whether scheduling is performed based on a PDCCH, to which a CRC scrambled by a specific RNTI, is applied, for example.

In this case, MCS Table 28 to Table 30 may be additionally used by adding or subdividing the above conditions according to services. In this case, the parameter mcs-Table value may be configured to a value other than qam256 or qam64LowSE, for example, when the value is configured to a parameter with a different name, such as qam4096, qam1024, qam64MidSE, it may be configured to use one of MCS tables, such as Table 29 to Table 33, corresponding to 4096 QAM, an MCS table, such as Table 20, corresponding to 1024 QAM, or an MCS table in which a target BLER is less than 0.1 and is greater than 0.00001 (e.g., the target BLER is close to 0.001) and 64 QAM is defined as a maximum modulation scheme. For convenience, the name of the higher layer parameter that configures qam1024 or qam4096, which is a value related to configuration of the MCS table corresponding to 1024 QAM or 4096 QAM, is simply expressed as mcs-Table. However, for distinguishing from version information of a previous system, the name may be changed into a format of mcs-Table-(version number), such as mcs-Table-r17 (for Release 17), mcs-Table-r18 (for Release 18), or mcs-Table-r19 (for Release 19), so as to be used. Alternatively, DL/UL may be distinguished and expressed as mcs-Table-DL-r for the DL and mcs-Table-UL-r for the UL.

A procedure of determining an MCS index for PDSCH, that is, modulation order (or scheme) Qm and target code rate R, may be modified and indicated as follows.

For the PDSCH scheduled by a PDCCH with DCI format 1_0, format 1_1 or format 1_2 with CRC scrambled by C-RNTI, MCS-C-RNTI, TC-RNTI, CS-RNTI, SI-RNTI, RA-RNTI, MSGB-RNTI, or P-RNTI, or for the PDSCH scheduled without corresponding PDCCH transmissions using the higher-layer-provided PDSCH configuration SPS-Config, (A) if the higher layer parameter mes-Table-r18 (or 19) given by PDSCH-Config is set to qam4096, and the PDSCH is scheduled by a PDCCH with DCI format 1_1 with CRC scrambled by C-RNTI, the UE shall use $I_{MCS}$ and MCS table corresponding to 4096 QAM, such as [Table 25] to [Table 29] to determine the modulation order ($Q_m$) and Target code rate (R) used in the physical downlink shared channel.

(B) else if the higher layer parameter mes-Table-r17 given by PDSCH-Config is set to qam1024, and the PDSCH is scheduled by a PDCCH with DCI format 1_1 with CRC scrambled by C-RNTI, the UE shall use $I_{MCS}$ and MCS table corresponding to 1024 QAM, such as Table 20 to determine the modulation order ($Q_m$) and Target code rate (R) used in the physical downlink shared channel.

(C) else if the UE is not configured with the higher layer parameter mcs-Table given by SPS-Config, and the higher layer parameter mes-Table-r18 (or 19) given by PDSCH-Config is set to qam4096, if the PDSCH is scheduled by a PDCCH with DCI format 1 1 with CRC scrambled by CS-RNTI or if the PDSCH with SPS activated by DCI format 1_1 is scheduled without corresponding PDCCH transmission using SPS-Config, the UE shall use $I_{MCS}$ and MCS table corresponding to 1024 QAM, such as Table 20 to determine the modulation order ($Q_m$) and Target code rate (R) used in the physical downlink shared channel.

(D) else if the UE is not configured with the higher layer parameter mes-Table given by SPS-Config, and the higher layer parameter mes-Table-r17 given by PDSCH-Config is set to qam1024, if the PDSCH is scheduled by a PDCCH with DCI format 1_1 with CRC scrambled by CS-RNTI or if the PDSCH with SPS activated by DCI format 1_1 is scheduled without corresponding PDCCH transmission using SPS-Config, the UE shall use $I_{MCS}$ and MCS table corresponding to 1024 QAM, such as Table 20 to determine the modulation order ($Q_m$) and Target code rate (R) used in the PDSCH.

In a system or a terminal, CQI tables or MCS tables optimized according to a maximum supportable modulation order and target BLER may all be configured differently. Herein, however, a number of modulation scheme (or order) and code rate combinations are shared and used. When a configuration using at least one of a first CQI table or a first MCS table to determine CQI or MCS is referred to as a first table configuration, and a configuration using at least one of a second CQI table or a second MCS table is referred to as a second table configuration, characteristics between operations of the base station or the terminal and respective table configurations may be summarized as follows.

A terminal (UE being operable to apply a first table configuration in a radio communication with a radio node of a cellular network) capable of performing the first table configuration (e.g., Table 25 to Table 27 or Table 29 to Table 33) for wireless communication with one base station (or radio node) of a cellular network receives an instruction for applying or performing the second table configuration (e.g., Table 16 or Table 20) from the base station. Based on the instruction, the second table configuration is applied for wireless communication with the base station (or radio node). Based on the second table configuration, control information (e.g., CQI information, etc.) or data is transmitted to the base station.

The second MCS table or the second CQI table for the second table configuration supports spectral efficiency less than minimum spectral efficiency of a first MCS table configuration.

When the second table configuration has been applied and it is desirable to use at least one of modulation order and code rate combinations for spectral efficiency included in at least one of the first MCS table or the first CQI table (as a fallback), at least one of the combinations is maintained in at least one of the second MCS table or the second CQI table.

Modulation order and code rate combinations for spectral efficiency included in at least one of the first MCS table or the first CQI table maintained in at least one of the second MCS table or the second CQI table may include a modulation order and code rate combination for lowest spectral efficiency of the first table configuration.

The terminal may transmit an appropriate CQI index to the base station, based on a CQI table determined according to a table configuration, or may determine a modulation scheme and a code rate, based on a determined MCS table. Subsequently, the terminal may determine a TBS for transmitting data, and then may encode the data so as to transmit encoded bits to the base station.

The terminal may determine the modulation scheme and the code rate, based on the determined MCS table, may determine the TBS for data corresponding to the encoded bits transmitted from the base station, and then may decode the received encoded bits so as to restore the data.

When summarizing the operations from the viewpoint of the base station, the operations may be as follows.

In order to perform wireless communication with one terminal of the cellular network, the base station capable of performing the first table configuration transmits, to the terminal, the instruction for applying or performing the second table configuration.

Control information (e.g., CQI information, etc.) or data transmitted based on the second table configuration is received from the terminal.

The base station may determine an appropriate MCS based on the CQI index transmitted from the terminal or the CQI table determined according to the table configuration, or may determine the TBS of data corresponding to the encoded bits received from the terminal, based on the modulation scheme and code rate determined based on the determined MCS table, and then may restore the data by appropriately decoding the received encoded bits.

The base station may determine the modulation scheme and the code rate, based on the determined MCS table, determine the TBS for data transmission, and encode the data so as to transmit encoded bits to the terminal.

The TBS may be determined using a code rate indicated by an index included in the MCS table. In 5G NR, a TBS may be determined by the number of allocated REs, the number of layers to be used, a modulation order, a code rate, and the like. Among various factors for determination of a TBS, a modulation order and a code rate may be determined via an MCS in signaling information.

A modulation order determined via an MCS may be used as it is, and a code rate determined via an MCS may be used as it is, wherein additional adjustment may be performed according to RRC configuration information.

When only an MCS table for a service having a specific target BLER is defined, and according to RRC signaling, a maximum modulation order is the same but is configured to support a service having a BLER different from the specific target BLER, a transceiver may determine a modulation order and a code rate from the defined MCS table, and may adjust only the code rate for use. As an example, a method of adding or subtracting a predetermined constant value or multiplying a specific ratio in a code rate may be used, wherein the constant value for subtraction or addition or the specific ratio for multiplication in the code rate may use the same value with respect to all CQI indices, or a value varying according to a modulation order may be used.

Embodiment 4

Embodiment 4 discloses a method of configuring an MCS table suitable for use by a base station and a terminal when a CQI table, in which 4096 QAM is a maximum modulation scheme, is configured as shown in Table 29 to Table 33. When 4096 QAM support is allowed in the 5G NR system, additional operations may be required in the base station and the terminal.

As an example, an additional operation for a limited buffer rate matching (LBRM) technique of the 5G NR system is disclosed.

In the 5G NR system, when the terminal/base station determines a TBS, $N'_{RE}$ that is the number of REs allocated to PDSCH mapping in one PRB in allocated resources is first calculated in Equation (4) as follows.

$$N'_{RE} = N_{sc}^{RB} \cdot N_{symb}^{sh} - N_{DMRS}^{PRB} - N_{oh}^{PRB} \quad (4)$$

A total number $N_{RE}$ of REs allocated to a PDSCH is calculated in Equation (5) as follows.

$$N_{RE} = \min(156, N'_{RE}) \cdot n_{PRB} \quad (5)$$

Then, $N_{info}$ is calculated in Equation (6) as follows.

$$N_{info} = N_{RE} \cdot R \cdot Q_m \cdot v \quad (6)$$

Specifically, $N_{info}$ is calculated to determine the TBS based on a value of $N_{info}$, where $N_{sc}^{RB}$ is the number (e.g., 12) of subcarriers included in one RB, $N_{symb}^{sh}$ is the number of OFDM symbols allocated to a PDSCH, $N_{DMRS}^{PRB}$ is the number of REs in one PRB, which are occupied by a DMRS of the same code division multiplexing (CDM) group, and $N_{oh}^{PRB}$ indicates the number (e.g., configured to 0, 6, 12, or 18) of REs occupied by overhead in one PRB configured by higher signaling. R and Qm denote a code rate and a modulation order indicated by an MCS, and v denotes the number of supported layers.)

In the 5G NR system, when one TB or code block (CB) is input to an LDPC encoder, parity bits may be determined or generated so as to be output. In this case, codes used in the LDPC encoder are determined according to an LDPC base graph. In particular, in 5N NR, a base graph (or base matrix) is determined according to a TBS length and a code rate as follows, and LDPC encoding and decoding are performed according to the determined base graph during initial transmission and retransmission.

Method of Selecting a Base Graph (or Base Matrix)

When a code rate indicated by an MCS is R, TBS≤292 or TBS≤3824 and R≤0.67

Alternatively, if R≤0.25, LDPC encoding is performed based on BG(2) (base graph 2 or base matrix 2).

In other cases, LDPC encoding is performed based on BG(1) (base graph 1 or base matrix 1).

A parity check matrix is also determined based on the LDPC base graphs BG(1) and BG(2), and a code block size (CBS), and an LDPC code may generate a parity bit, based on the parity check matrix.

In this case, a method of sending all parity bits generated by LDPC coding with respect to a specific input may be referred to as full buffer rate matching (FBRM), and a method of limiting the number of transmittable parity bits may be referred to as limited buffer rate matching (LBRM).

When resources are allocated for data transmission, an output of the LDPC encoder is made to a circular buffer, and bits of the buffer are repeatedly transmitted as many times as the number of the allocated resources, and a length of the circular buffer may be referred to as $N_{cb}$. If the number of all LDPC codeword bits generated by LDPC coding is N, $N_{cb} = N$ in the FBRM method. For reference, in 5G NR, in LDPC codeword bits for initial transmission, some of information word bits are always excluded and are not transmitted.

In the LBRM method, Neb denotes min (N, $N_{ref}$), $N_{ref}$ is given by $\lfloor TBS_{LBRM}/C \cdot R_{LBRM}$, and $R_{LBRM}$ may be determined to be 2/3. For $TBS_{LBRM}$ in TBS determination described above, the number v of layers is assumed to be a maximum number of layers supported by the terminal in a corresponding cell, Qm is assumed to be a maximum modulation order configured for the terminal in the corresponding cell or is assumed to be 64 QAM if Qm is not configured, code rate R is assumed to be 948/1024 that is a maximum code rate, $N_{RE}$ is assumed to be 156 $n_{PRB}$, and $n_{PRB}$ is assumed to be $n_{PRB,LBRM}$ for determination. Factor $n_{PRB,LBRM}$ may be given as in Table 34 below.

TABLE 34

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, an (approximated) maximum data rate supported by the terminal for a given number of aggregated carriers in a band or a band combination may be determined based on Equation (7) as follows.

$$\text{data rate(in Mpbs)} = 10^{-6} \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right) \quad (7)$$

In Equation (7), J may denote the number of carriers bound by carrier aggregation, Rmax=948/1024, $v_{Layers}^{(j)}$ may denote the maximum number of layers, $Q_m^{(j)}$ may denote a maximum modulation order, $f^{(j)}$ may denote a scaling index, and μ may denote a subcarrier spacing. The terminal may report $f^{(j)}$ as one value among 1, 0.8, 0.75, and 0.4, and μ may be given as shown in Table 35 below. (j) is an index indicating an j-th component carrier (CC).

TABLE 35

| μ | Δf = $2^μ$ · 15[kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

$T_s^μ$ is an average OFDM symbol length, $T_s^μ$ may be calculated based on $$\frac{10^{-3}}{14 \cdot 2^μ},$$

and $N_{PRB}^{BW(j),μ}$ is the maximum number of RBs in BW(j). $OH^{(j)}$ is an overhead value, and $OH^{(j)}$ may be given as 0.14 in a DL of FR1 (a band less than or equal to 6 GHz, also referred to as B6G (below 6 GHz)) and given as 0.18 in a UL of FR1, and may be given as 0.08 in a DL of FR2 (a band over 6 GHZ, also referred to as A6G (above 6 GHz)) and given as 0.10 in a UL of FR2.

The overhead values may be defined as different values according to a service or a modulation order. For example, when an MCS table supporting 4096 QAM as in Table 29 to Table 33 is configured in the wireless communication system and indicates a special situation where a channel environment is very good, the $OH^{(j)}$ value may also be configured differently. When use in an environment with a very good channel environment is assumed, the overhead value may be configured to a smaller value, but since the 4096 QAM modulation scheme is vulnerable to a phase error, a peak-to-average power-ratio (PAPR) problem of the OFDM system, or a value greater than a current reference may be configured. Data transmission or reception through a physical sidelink shared channel (PSSCH) when a vehicle-to-Infra or vehicle-to-vehicle (V2X) service is supported may have a different symbol allocation scheme for data transmission or reception through a PDSCH, so that the $OH^{(j)}$ value may be configured differently.

As a more specific example for the V2X service, in the case of PSSCH data transmission or reception, at least a first symbol is allocated for automatic gain control (AGC) and a last symbol is allocated as a gap symbol for gap measurement, so that the maximum number of OFDM symbols for data transmission and reception may actually be 12 (or less). In this case, the $OH^{(j)}$ value may have a specific value or greater regardless of a configuration of a physical sidelink feedback channel (PSFCH), and the value may be greater than or equal to 2/12. Regardless of FR1/B6G and FR2/A6G, the $OH^{(j)}$ value may be configured to values that are greater than 2/12 and include a specific value such as 0.21. Alternatively, in a resource pool configuration of a corresponding carrier, the $OH^{(j)}$ may be determined according to a ratio of slots in which a PSFCH resource is configured, or a periodicity of the PSFCH resource. In this case, as the ratio in which the PSFCH resource is configured increases, the $OH^{(j)}$ value may increase. For example, when a value of the PSFCH being configured for every slot is referred to as A, a value of when the PSFCH is configured for one slot in every two slots is referred to as B, and a value of when the PSFCH is configured for one slot in every four slots is referred to as C, a relationship of A>B>C may be configured. (e.g., A=0.42, B=0.32, and C=0.26) For reference, the ratio of slots in which the PSFCH resource is configured or the periodicity of the PSFCH resource may be determined based on parameter sl-PSFCH-Period in a PSFCH-related configuration.

One or more sidelink resource pools may be configured for the terminal for PSSCH transmission or reception, wherein the $OH^{(j)}$ value may be determined based on a parameter of a resource pool having a greatest bandwidth from among the configured sidelink resource pools according to a higher layer configuration.

In the standard for a data rate supportable by the terminal, which is determined via Equation (7), a maximum value of the modulation order was 8 or 10 previously, but since a maximum value of the modulation order is 12 in the system to which 4096 QAM is applied, the maximum data rate by Equation (7) may also be determined differently from the 5G NR system of Release-17 and earlier versions. In the 5G NR system, a data rate supportable by a terminal may be mutually agreed upon between a base station and the terminal and may be calculated using a maximum frequency band supported by the terminal, a maximum modulation order, the maximum number of layers, and the like. However, the calculated data rate may be different from a value calculated from a TTI length and a size TBS of a TB used for actual data transmission.

Accordingly, the terminal may be allocated with a TBS greater than a value corresponding to a data rate supported by the terminal. It may be necessary to minimize such a case, and define operations of the terminal in such a case. In the current communication system defined in NR, when LBRM is applied, $TBS_{LBRM}$ is determined based on a modulation order supported by the terminal, wherein it is necessary to present a clear configuration method so that the determination procedure is efficient or a parameter configuration is unambiguous. The following embodiments provide a method and a device for achieving these ends.

First, when PDSCH-LBRM needs to be applied, a maximum modulation order configured for a serving cell is configured as follows.

Modulation Order Configuration for PDSCH-LBRM $Q_m=12$ is assumed for a maximum modulation order for a DL-SCH when MCS table configuration-related parameter mcs-Table included in higher layer signaling pdsch-Config for one or more BWPs of a serving cell is configured to qam4096 (or an indicator indicating 4096 QAM), $Q_m=10$ is assumed for the maximum modulation order for the DL-SCH when parameter mcs-Table included in higher layer signaling pdsch-Config for one or more BWPs of the serving cell is configured to qam1024 (or an indicator indicating 1024 QAM), $Q_m=8$ is assumed for the maximum modulation order for the DL-SCH when parameter mes-Table included in higher layer signaling pdsch-Config for one or more BWPs of the serving cell is configured to qam256 (or an indicator indicating 256 QAM), and $Q_m=6$ is assumed in other cases.

This may also be expressed as, if the higher layer parameter mcs-Table-r18 [or mcs-TableDCI-1-2-r18] given by a pdsch-Config for at least one DL BWP of the serving cell is set to qam4096, maximum modulation order $Q_m=12$ is assumed for DL-SCH; else if the higher layer parameter mcs-Table-r17 given by a pdsch-Config for at least one DL BWP of the serving cell is set to qam1024, maximum modulation order $Q_m=10$ is assumed for DL-SCH; else if the higher layer parameter mcs-Table given by a pdsch-Config for at least one DL BWP of the serving cell is set to qam256, maximum modulation order $Q_m=8$ is assumed for DL-SCH; else a maximum modulation order $Q_m=6$ is assumed for DL-SCH.

Therefore, modified PDSCH-LBRM procedures may be summarized as follows:

The bit sequence after encoding $d_0, d_1, \ldots, d_{N-1}$ from Clause 5.3.2 is written into a circular buffer of length $N_{cb}$ for the r-th coded block, where N is defined in Clause 5.3.2.

For the r-th code block, let $N_{cb}=N$ if $I_{LBRM}=0$ and $N_{cb}=\min(N, N_{ref})$ otherwise, where $$N_{ref} = \left\lfloor \frac{TBS_{LBRM}}{C \cdot R_{LBRM}} \right\rfloor,$$

$R_{LBRM}=2/3$, $TBS_{LBRM}$ is determined according to Clause 5.1.3.2 in [TS 38.214] for DL-SCH/PCH, assuming the following:
  maximum number of layers for one TB for DL-SCH/PCH is given by the minimum of X and 4, where
    if the higher layer parameter maxMIMO-Layers of PDSCH-ServingCellConfig of the serving cell is configured, X is given by that parameter
    otherwise, X is given by the maximum number of layers for PDSCH supported by the UE for the serving cell
  if the higher layer parameter mcs-Table-r18 [or mcs-TableDCI-1-2-r18] given by a pdsch-Config for at least one DL BWP of the serving cell is set to 'qam4096', maximum modulation order $Q_m=12$ is assumed for DL-SCH; else if the higher layer parameter mes-Table-r17 given by a pdsch-Config for at least one DL BWP of the serving cell is set to 'qam1024', maximum modulation order $Q_m=10$ is assumed for DL-SCH; else if the higher layer parameter mes-Table given by a pdsch-Config for at least one DL BWP of the serving cell is set to 'qam256', maximum modulation order $Q_m=8$ is assumed for DL-SCH; else a maximum modulation order $Q_m=6$ is assumed for DL-SCH;

If 4096 QAM is also allowed in the UL of the wireless communication system, a maximum modulation order configured for the serving cell for applying of PUSCH-LBRM is configured as follows.

Modulation Order Configuration for PUSCH-LBRM $Q_m=12$ is assumed for a maximum modulation order for a UL-SCH when MCS configuration-related parameter mes-Table or mcs-TableTransformPrecoder included in higher layer signaling pusch-Config or configuredGrantConfig for one or more BWPs of the serving cell is configured to qam4096, $Q_m=10$ is assumed for the maximum modulation order for the UL-SCH when parameter mes-Table or mcs-TableTransformPrecoder included in higher layer signaling pusch-Config or configuredGrantConfig for one or more BWPs of the serving cell is configured to qam1024, $Q_m=8$ is assumed for the maximum modulation order for the UL-SCH when parameter mcs-Table or mcs-TableTransformPrecoder included in higher layer signaling pusch-Config or configuredGrantConfig for one or more BWPs of the serving cell is configured to qam256, and $Q_m=6$ is assumed in other cases.

This may also be expressed as, if the higher layer parameter mcs-Table-r18 or mcs-TableTransformPrecoder-r18 [or mcs-TableDCI-0-2-r18 or mcs-TableTransformPrecoder-DCI-0-2-r18] given by a pusch-Config or the higher layer parameter mcs-Table-r18 or mcs-TableTransformPrecoder-r18 given by configuredGrantConfig for at least one UL BWP of the serving cell is set to qam1024, maximum modulation order $Q_m=10$ is assumed for UL-SCH; else if the higher layer parameter mcs-Table or mcs-TableTransformPrecoder or mcs-TableDCI-0-2 or mcs-TableTransformPrecoderDCI-0-2 given by a pusch-Config or the higher layer parameter mcs-Table or mcs-TableTransformPrecoder given by configuredGrantConfig for at least one UL BWP of the serving cell is set to qam256, maximum modulation order $Q_m=8$ is assumed for UL-SCH; else a maximum modulation order $Q_m=6$ is assumed for UL-SCH.

Therefore, modified PUSCH-LBRM procedures may be summarized as follows:

The bit sequence after encoding $d_0, d_1, \ldots, d_{N-1}$ from Clause 5.3.2 is written into a circular buffer of length Neb for the r-th coded block, where N is defined in Clause 5.3.2.

For the r-th code block, let $N_{cb}=N$ if $I_{LBRM}=0$ and $N_{cb}=\min(N, N_{ref})$ otherwise, where $$N_{ref} = \left\lfloor \frac{TBS_{LBRM}}{C \cdot R_{LBRM}} \right\rfloor,$$

Figure 8:
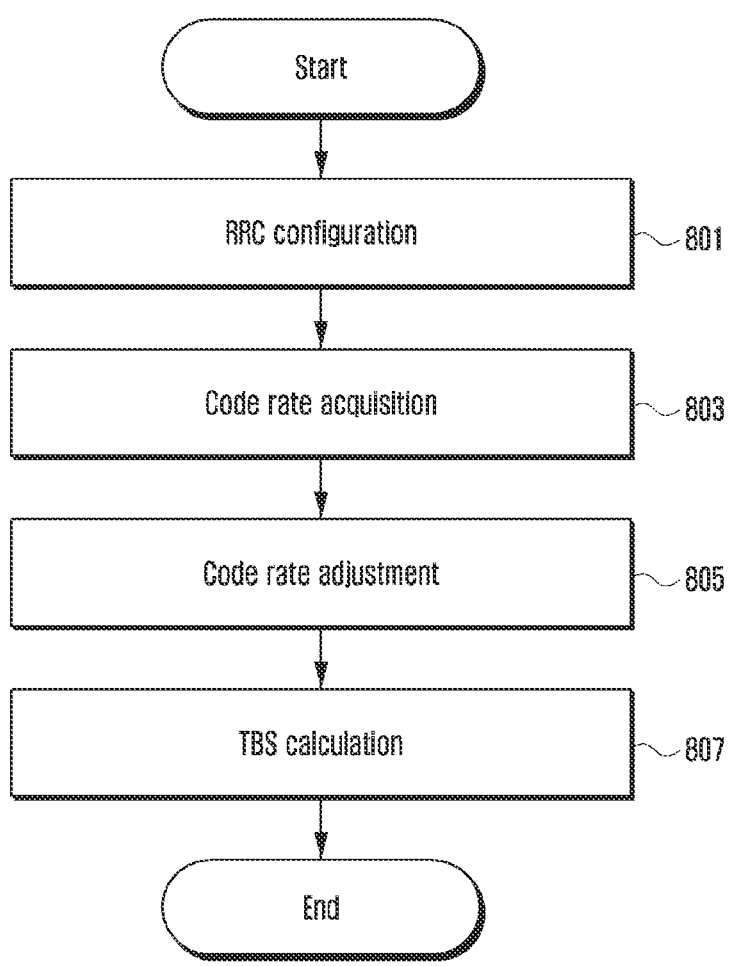
FIG. 8 illustrates a method for a terminal to calculate a transport block size (TBS) by using a CQI table and an MCS table according to an embodiment.

$R_{LBRM}=2/3$, $TBS_{LBRM}$ is determined according to Clause 6.1.4.2 in [TS 38.214] for UL-SCH, assuming the following:
  maximum number of layers for one TB for UL-SCH is given by X, where
    if the higher layer parameter maxMIMO-Layers of PUSCH-ServingCellConfig of the serving cell is configured, X is given by that parameter
    elseif the higher layer parameter maxRank of pusch-Config of the serving cell is configured, X is given by the maximum value of maxRank across all BWPs of the serving cell
    otherwise, X is given by the maximum number of layers for PUSCH supported by the UE for the serving cell
  if the higher layer parameter mcs-Table-r18 or mcs-TableTransformPrecoder-r18 [or mcs-TableDCI-0-2-r18 or mes-TableTransformPrecoderDCI-0-2-r18] given by a pusch-Config or the higher layer parameter mcs-Table-r18 or mcs-TableTransformPrecoder-r18 given by configuredGrantConfig for at least one UL BWP of the serving cell is set to 'qam1024', maximum modulation order $Q_m=10$ is assumed for UL-SCH; else if the higher layer parameter mcs-Table or mcs-TableTransformPrecoder or mcs-TableDCI-0-2 or mcs-TableTransformPrecoderDCI-0-2 given by a pusch-Config or the higher layer parameter mcs-Table or mcs-TableTransformPrecoder given by configuredGrantConfig for at least one UL BWP of the serving cell is set to 'qam256', maximum modulation order $Q_m=8$ is assumed for UL-SCH; else a maximum modulation order $Q_m=6$ is assumed for UL-SCH FIG. 8 illustrates a method for a terminal to calculate a transport block size (TBS) by using a CQI table and an MCS table according to an embodiment. FIG. 8 illustrates an operation method of the terminal 120 illustrated in FIG. 1 and FIG. 3.

Referring to FIG. 8, a base station may perform RRC signaling for a terminal (i.e., the base station transmits an RRC message to the terminal) in consideration of a service to be provided to the terminal.

Referring to FIG. 8, in operation 801, a terminal may receive (or process) an RRC configuration, based on RRC signaling provided by a base station. In step 803, the terminal may acquire a code rate and a modulation order which serve as a reference, based on the RRC configuration received (or processed) in step 801.

In step 805, the terminal may adjust the code rate if a service defined in the RRC configuration is different from a service serving as a reference. In this case, although service information for adjustment of the code rate may be indicated via RRC signaling, a BLER value or other parameters classified according to a service may be indicated. A specific method of acquiring (or determining) a code rate and a modulation order, and a method of adjusting a code rate are described in embodiments herein.

In step 807, the terminal may calculate a TBS by using the code rate adjusted in step 805.

Figure 9:
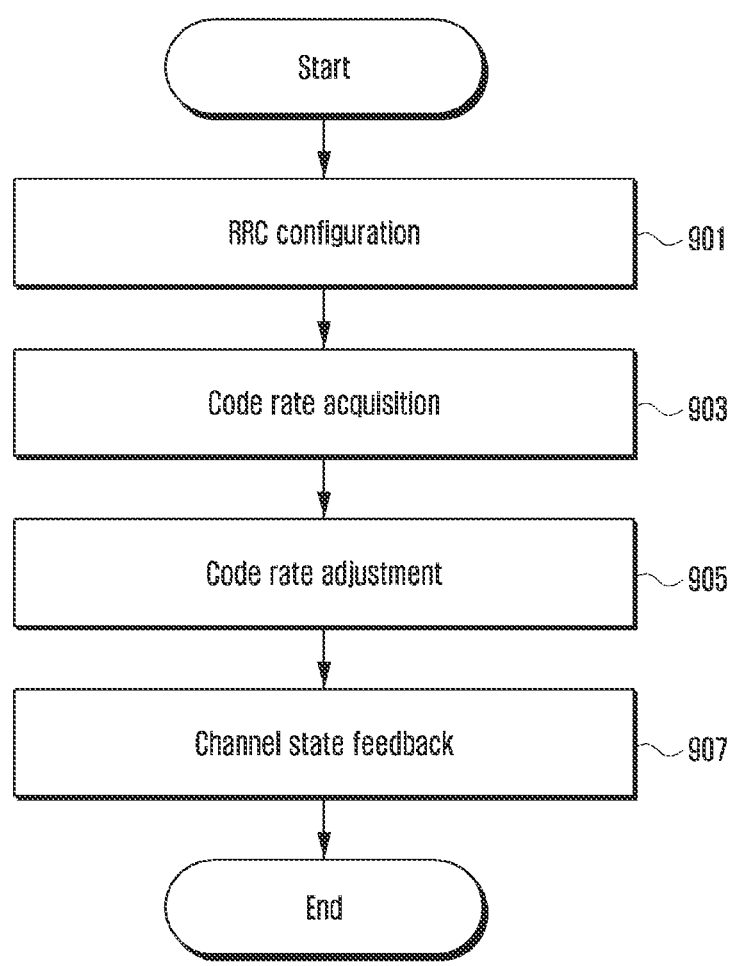
FIG. 9 illustrates a method for a terminal to calculate a TBS by using a CQI and an MCS table according to an embodiment.

FIG. 9 illustrates another method for a terminal to calculate a TBS by using a CQI table and an MCS table according to an embodiment.

Referring to FIG. 9, a base station may perform RRC signaling for a terminal (i.e., the base station transmits an RRC message to the terminal) in consideration of a service to be provided to the terminal.

Referring to FIG. 9, in step 901, a terminal may receive (or process) an RRC configuration, based on RRC signaling provided by a base station. In step 903, the terminal may acquire (or determine) a code rate and a modulation order which serve as a reference, based on the RRC configuration received (or processed) in step 901.

In step 905, the terminal may adjust the code rate if a service defined in the RRC configuration is different from a service serving as a reference. In this case, although service information itself for adjustment of the code rate may be indicated via RRC signaling, a BLER value or other parameters classified according to a service may be indicated.

A specific method of acquiring (or determining) a code rate and a modulation order, and a method of adjusting a code rate are described in embodiments herein.

In step 907, the terminal may feed back a channel state, based on the code rate adjusted in step 905.

In some embodiments, the base station 110 and the terminal 120 may perform communication using at least one of wireless and wired communication.

Embodiment 5

If support of 1024 QAM or 4096 QAM is allowed in the 5G NR system, an operation additionally required in a terminal or a base station may include receiving a phase tracking reference signal (PT-RS). This embodiment discloses a method of determining a PT-RS-related parameter by a base station and a terminal for PT-RS transmission and reception. In other words, the base station and the terminal determine PT-RS-related parameters, based on the methods of the embodiments, and perform appropriate PT-RS transmission and reception based on the parameters.

In order to transmit a PT-RS for a PDSCH during initial transmission or retransmission, the base station maps the PT-RS to physical resources via the following procedures.

First, for PT-RS mapping, the terminal assumes that the PT-RS exists only in a resource block used for the corresponding PDSCH (the same even for a PUSCH PT-RS). If the PT-RS exists, the terminal assumes that the PDSCH PT-RS is scaled by $\beta_{PT-RS,i}$, where $\beta_{PT-RS,i}$ is a factor for following a transmission power defined according to the standard when the PT-RS port associated with the corresponding PDSCH is scheduled (UE may assume the PDSCH PT-RS is scaled by a factor $\beta_{PT-RS,i}$ to conform with the transmission power specified in a standard (e.g., TS 38.214)), which is as follows.

If the UE is configured by higher layer parameter epre-Ratio, ratio $\beta_{PT-RS,i}$ of a PT-RS energy per resource element (EPRE) to a PDSCH EPRE per layer and per RE for the PT-RS port (the ratio of PT-RS EPRE to PDSCH EPRE per PT-RS layer per RE for PT-RS port) is given as shown in Table 36 below according to an epre-Ratio value. In addition, PT-RS scaling factor $\beta_{PT-RS,i}$ is determined in Equation (8) as follows.

$$\beta_{PT-RS,i}=10^{\rho_{PTRS}/20} \tag{8}$$

If the UE is not configured by higher layer parameter epre-Ratio, the UE assumes the epre-Ratio value to be state "0", and determines $\rho_{PTRS}$ and $\beta_{PT-RS,i}$, based on Table 36 below (PT-RS EPRE to PDSCH EPRE per layer per RE ($\rho_{PTRS}$)).

TABLE 36

| epre-Ratio | The number of PDSCH layers | | | | | |
|---|---|---|---|---|---|---|
| | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | | | reserved | | | |
| 3 | | | reserved | | | |

If the following two conditions (PT-RS condition 1) and (PT-RS condition 2) are satisfied, the PT-RS is mapped to resource element (k, l)$_{p,\mu}$, based on Equation (9) as follows.

$$a_{k,l}^{(p,\mu)}=\beta_{PT-RS,i} \cdot r_k=\beta_{PT-RS,i} \cdot r(2m+k') \tag{9}$$

However, $r_k$ denotes a PT-RS for subcarrier k and $r_k=r(2m+k')$. In TS38.211 which is the 5G NR standard, r(2m+k') indicates a DM-RS for subcarrier k and position $l_o$.

(PT-RS condition 1): A l value corresponds to a value in OFDM symbols allocated for PDSCH transmission. (l is within the OFDM symbols allocated for the PDSCH transmission)

(PT-RS condition 2): The resource element (k, l)$_{p,\mu}$ is not used for a DM-RS, an NZP CSI-RS (however, an NZP CSI-RS configured for mobility measurement or in which parameter resourceType of corresponding higher layer signaling CSI-ResourceConfig is configured to "aperiodic" is excluded), a ZP CSI-RS, SS/PBCH blocks, and a detected PDCCH. Alternatively, the resource element (k, l)$_{p,\mu}$ may correspond to a resource element declared as unavailable according to the PDSCH resource mapping scheme of 3GPP standard TS 38.214.

A set of time indices relative to a start point of PDSCH allocation is defined as follows (for reference, if transform precoding is disabled, a set of time indices relative to a starting point of PUSCH allocation is also defined in the same manner).

Procedure of Time Index Determination for PT-RS
1. set i=0 and $l_{ref}$
2. if any symbol in the interval max ($l_{ref}$+(i−1)$L_{PT-RS}$+1, $l_{ref}$, . . . , $l_{ref}$+i$L_{PT-RS}$) overlaps with a symbol used for DM-RS,
    set i=1,
    set $l_{ref}$ to the symbol index of the DM-RS symbol in case of a single-symbol DM-RS and to the symbol index of the second DM-RS symbol in case of a double-symbol DM-RS.
  repeat from step 2 as long as $l_{ref}$+i$L_{PT-RS}$ is inside the PDSCH allocation 3. add $l_{ref}+iL_{PT-RS}$ to the set of time indices for PT-RS.
4. increment i by one.
5. repeat from step 2 above as long as $l_{ref}+iL_{PT-RS}$ is inside the PDSCH allocation. where $L_{PT-RS} \in \{1,2,4\}$.

In the above procedure, a $L_{PT-RS} \in \{1,2,4\}$ value may be determined by PT-RS transmission/reception to be described later herein.

For the purpose of PT-RS mapping, resource blocks allocated for PDSCH transmission are numbered from 0 to $N_{RB}-1$ from a lowest (ordered) scheduled resource block to a highest (ordered) scheduled resource block. In this set of resource blocks, corresponding subcarriers are numbered from 0 to $N_{sc}^{RB}N_{RB}-1$ in an increasing order starting from a lowest (ordered) frequency. The subcarriers are determined by the following indices, wherein the UE assumes that the PT-RS is mapped to the subcarriers (for reference, when transform precoding is disabled, PUSCH transmission is determined in Equation (10) as follows.

$$k = k_{ref}^{RB} + (iK_{PT-RS} + k_{ref}^{RB})N_{sc}^{RB}, \quad (10)$$

$$k_{ref}^{RB} = \begin{cases} n_{RNTI} \bmod K_{PT-RS} & \text{if } N_{RB} \bmod K_{PT-RS} = 0, \\ n_{RNTI} \bmod (N_{RB} \bmod K_{PT-RS}) & \text{otherwise.} \end{cases}$$

In Equation (10), i=0, 1, 2, . . . , $k_{ref}^{RE}$ is a value determined by Table 37 below for a DM-RS port related to the PT-RS port. However, if parameter resourceElementOffset of higher layer signaling PTRS-DownlinkConfig is not configured, values of columns corresponding to offset00 in Table 37 should be used. $n_{RNTI}$ is an RNTI associated with DCI via which transmission has been scheduled using C-RNTI, CS-RNTI, MCS-C-RNTI, or SP-CSI-RNTI, or is CS-RNTI in a case of a configured grant. $N_{RB}$ is the number of scheduled resource blocks. $K_{PT-RS} \in \{2,4\}$, and this may be determined by PT-RS transmission/reception to be described later herein.

TABLE 37

| DM-RS antenna | $k_{ref}^{RE}$ | | | | | | | |
|---|---|---|---|---|---|---|---|---|
| | DM-RS Configuration type 1 resourceElementOffset | | | | DM-RS Configuration type 2 resourceElementOffset | | | |
| port p | offset00 | offset01 | offset10 | offset11 | offset00 | offset01 | offset10 | offset11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

For reference, when transform precoding is disabled, Table 38 below is used for a $k_{ref}^{RE}$ value for PUSCH transmission.

TABLE 38

| DM-RS antenna | $k_{ref}^{RE}$ | | | | | | | |
|---|---|---|---|---|---|---|---|---|
| | DM-RS Configuration type 1 resourceElementOffset | | | | DM-RS Configuration type 2 resourceElementOffset | | | |
| port p̃ | offset00 | offset01 | offset10 | offset11 | offset00 | offset01 | offset10 | offset11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | — | — | — | — | 4 | 5 | 10 | 11 |
| 5 | — | — | — | — | 5 | 10 | 11 | 4 |

The UE needs to report, based on UE capability at a given carrier frequency during initial transmission or retransmission, a preferred MCS and frequency bandwidth thresholds to the base station with respect to each subcarrier spacing applicable to a data channel at the carrier frequency. In this case, an MCS table corresponding to a maximum modulation order reported to be supportable by the terminal is assumed.

If the UE is configured with parameter phaseTrackingRS in higher layer signaling DMRS-DownlinkConfig, parameters timeDensity and frequencyDensity in higher layer signaling PTRS-DownlinkConfig indicate thresholds ptrs-$MCS_i$ (i=1,2,3) and $N_{RB,i}$ (i=0,1) of below Table 39 and Table 40, respectively.

If one or both of additional higher layer parameters timeDensity and frequencyDensity is configured, and RNTI is MCS-C-RNTI, C-RNTI, or CS-RNTI, the UE assumes the presence and pattern of a PT-RS antenna port to be a function of a scheduled bandwidth in a corresponding BWP and a corresponding scheduled MCS of a corresponding codeword, as shown below in Table 39 and Table 40.

If parameter timeDensity in higher layer signaling PTRS-DownlinkConfig is not configured, the UE assumes that $L_{PT-RS}=1$.

If parameter frequencyDensity in higher layer signaling PTRS-DownlinkConfig is not configured, the UE assumes that $K_{PT-RS}=2$.

Table 39 below concerns time density of PT-RS as a function of scheduled MCS.

TABLE 39

| Scheduled MCS | Time density ($L_{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

Table 40 below concerns frequency density of PT-RS as a function of scheduled bandwidth.

TABLE 40

| Scheduled bandwidth | Frequency density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

If both additional higher layer parameters timeDensity and frequencyDensity are not configured, and RNTI is MCS-C-RNTI, C-RNTI, or CS-RNTI, the UE assumes that the PT-RS is present with values of $L_{PT-RS}=1$ and $K_{PT-RS}=2$, wherein it is assumed that the PT-RS is not present in the following cases:
  when an MCS index scheduled from the MCS table of Table 17 is less than 10,
  when an MCS index scheduled from the MCS table of Table 19 is less than 5,
  when an MCS index scheduled from the MCS table of Table 18 is less than 15, or
  when the number of scheduled RBs is less than 3.

Regardless of whether the additional higher layer parameters timeDensity and frequencyDensity are configured, if RNTI is RA-RNTI, [MsgB-RNTI], SI-RNTI, or P-RNTI, the UE assumes that no PT-RS has been provided. (The expression "present" as used above may also be expressed as other appropriate words, such as appearance or existence in some cases.)

When the system allows application of 1024 QAM, especially, if the MCS table in Table 20 is configured, a condition such as "an MCS index scheduled from the MCS table in Table 20 is less than 3," may be added to the preceding PT-RS configuration-related condition. In general, the added MCS table may be expressed with an MCS index scheduled from the MCS table being less than a smallest index value among indices corresponding to modulation order 4.

Therefore, when the system allows application of 4096 QAM, particularly, if an MCS table corresponding to 4096 QAM, such as Table 30, is configured, a condition such as "an MCS index scheduled from the MCS table is less than 1," may be configured, and if an MCS table corresponding to 4096 QAM, such as Table 31 or Table 32, is configured, a condition such as "an MCS index scheduled from the MCS table is less than 2" may be configured.

If an MCS table that does not support QPSK, such as Table 33, is configured, whether "PT-RS not present" is not determined via the MCS index, and whether "PT-RS not present" may be determined according to the range of a scheduled bandwidth. Even if an MCS table that does not support QPSK, such as Table 33, has been configured, a condition such as "—an MCS index scheduled from the MCS table is less than X" may be added, in which case a value of X is configured to a small integer value, such as 1 or 2. If a condition where X=0 is configured, since the MCS index is always a positive integer, it may be seen that the condition corresponds to an operation same as not determining whether "PT-RS not present" via the MCS index. In this case, if a lowest MCS index, i.e., index 0, is configured, it may be seen that a time density for index 0 satisfies $L_{PT-RS}=4$.

If the UE is not configured by parameter phaseTrackingRS in higher layer signaling DMRS-DownlinkConfig, and when at least one of PT-RS time density corresponding parameter LPT-RS of Table 39 or frequency density corresponding parameter KPT-RS of Table 40 indicates "PT-RS not present", the UE may consider that PT-RS is not provided.

For the higher layer parameter PTRS-DownlinkConfig, in providing of each parameter ptrs-MCS$_i$, where (i=1,2,3), one value from 0 to 29 is determined if the MCS table of Table 17 or Table 18 is configured, one value from 0 to 28 is determined if the MCS table of Table 19 is configured, one value from 0 to 27 is determined if the MCS table of Table 20 including the 1024 QAM modulation scheme or modulation order 10 is configured, one value from 0 to 26 is determined if the MCS table of Table 30 or Table 32 including the 4096 QAM modulation scheme or modulation order 12 is configured, and one value from 0 to 27 is determined if the MCS table of Table 33 is configured. In general, a relationship in which ptrs-MCS$_1$≤ptrs-MCS$_2$≤ptrs-MCS$_3$≤(a lowest index value among reserved fields in the MCS table) is satisfied.

However, with respect to Table 38, a value of ptrs-MCS3 is 29 if the MCS table of Table 17 or Table 18 is configured, the value of ptrs-MCS3 is 28 if the MCS table of Table 19 is configured, the value of ptrs-MCS3 is 27 if the MCS table of Table 20 including the 1024 QAM modulation scheme or modulation order 10 is configured, the value of ptrs-MCS3 is 26 if the MCS tables of Table 30 to Table 32 including the 4096 QAM modulation scheme or modulation order 12 are configured, or the value of ptrs-MCS3 is 27 if the MCS table of Table 33 is configured, and an $I_{MCS}$ value satisfying a condition of ptrs-MCS$_3$≤$I_{MCS}$<ptrs-MCS$_4$ is always an MCS index available only at retransmission, so that it may be considered that when LPT-RS-1 does not exist. (Depending on the system, $L_{PT-RS}=1$ may be configured for retransmission.) In the current 5G NR system, information on a value of ptrs-MCS$_4$ is not transferred via higher layer signaling, but, in general, 29 may be assumed and used if the MCS table of Table 17 or Table 18 is configured, 28 may be assumed and used if the MCS table of Table 19 is configured, a value of 27 may be assumed and used if the MCS table of Table 20 including the 1024 QAM modulation scheme or modulation order 10 is configured when application of 1024 QAM is allowed, a value of 26 may be assumed and used if the MCS tables of Table 30 to Table 32 including the 4096 QAM modulation scheme or modulation order 12 are configured when application of 4096 QAM is allowed, and a value of 27 may be assumed and used if MCS table of Table 33 is configured.

If higher layer parameter PTRS-DownlinkConfig indicates that ptrs-MCS$_i$=ptrs-MCS$_{i+1}$ in each time density-related parameter ptrs-MCS$_i$, (i=1,2,3), this indicates that time density value LPT-RS corresponding to ptrs-MCS$_i$≤I$_{MCS}$<ptrs-MCS$_{i+1}$ is unavailable or disabled. Similarly, higher layer parameter PTRS-DownlinkConfig is determined to be one of values from 1 to 276 in providing of each parameter N$_{RB,i}$ (i=0,1), and if N$_{RB,i}$=N$_{RB,i+1}$ is indicated, this indicates that frequency density value K$_{PT-RS}$ corresponding to N$_{RB,i}$≤N$_{RB}$<N$_{RB,i+1}$ is unavailable or disabled.

If a value of L$_{PT-RS}$ is configured to 2 or 4 when the UE receives a PDSCH having an allocation duration of 2 symbols, or if the value of L$_{PT-RS}$ is configured to 4 when the UE receives a PDSCH having an allocation duration of 4 symbols, it may be considered that no PT-RS is being transmitted.

For configurations of the time density and the frequency density, the UE may apply different configurations according to frequency bands being used. In general, an FR2/A6G band has diffraction/propagation characteristics of frequency worse than those of FR1/B6G, and relatively strong straightness, and may be thus more susceptible to a phase error. On the other hand, since an FR1/B6G band has better frequency characteristics compared to the FR2/A6G band, the FR1/B6G band may be relatively less sensitive to a phase error. Therefore, when the UE or base station is using the FR2/A6G band, it can be configured to provide higher time density and frequency density compared to FR1/B6G.

For example, for the same MCS table configuration and the same MCS index I$_{MCS}$, when a value of L$_{PT-RS}$ configurable for the FR1/B6G band is referred to as L$_{PT-RS}$ (FR1/B6G, I$_{MCS}$), and a value of L$_{PT-RS}$ configurable for the FR2/A6G band is referred to as L$_{PT-RS}$ (FR2/A6G, I$_{MCS}$), ptrs-MCS$_i$, (i=1,2,3) may be configured so that an average value of L$_{PT-RS}$ (FR1/B6G, I$_{MCS}$) is greater than an average value of L$_{PT-RS}$ (FR2/A6G, I$_{MCS}$). In particular, ptrs-MCS$_i$, (i=1,2,3) may be configured so that L$_{PT-RS}$ (FR1/B6G, I$_{MCS}$)≥L$_{PT-RS}$ (FR2/A6G, I$_{MCS}$) is satisfied for any MCS index, and L$_{PT-RS}$ (FR1/B6G, I$_{MCS}$)>L$_{PT-RS}$ (FR2/A6G, I$_{MCS}$) is satisfied for at least one MCS index. As another example, ptrs-MCS$_i$, (i=1,2,3) may be configured so that "PT-RS is not present" in the FR1/B6G band, and the value of L$_{PT-RS}$ is configured to at least one of 1, 2, or 4 only for FR2/A6G. For reference, a value of L$_{PT-RS}$ may be determined according to an MCS index, but as described above, the value may also be determined according to configuration/non-configuration of higher layer signaling.

When the UE is receiving a PDSCH for retransmission, if the UE is scheduled or configured with an MCS index greater than V, an MCS for PT-RS time density determination may be obtained based on DCI received for the same TB scheduled or configured with an MCS index less than or equal to V in initial transmission. For a value of V herein, V=28 may be used if the MCS table of Table 17 or Table 18 is configured, V=27 may be used if the MCS table of Table 19 is configured, V=26 may be used if the MCS table of Table 20 including 1024 QAM modulation scheme or modulation order 10 is configured, V=25 may be used if the MCS tables of Table 30 to Table 32 including the 4096 QAM modulation scheme or modulation order 12 are configured, and V=26 may be used if the MCS table of Table 33 is configured.

As a modulation order increases, a change in performance of a system due to a phase error may become more sensitive. In a case of insufficient performance in phase error tracking caused by an existing time density due to introduction of 1024 QAM or 4096 QAM, when a parameter corresponding to the time density is less than 1 (e.g., 0.5, indicating that more PT-RSs are allocated or a PT-RS is allocated more frequently compared to the time intensity described above may be additionally defined by introducing ptrs-MCS5 as in Table 41 below. In this case, higher layer parameter PTRS-DownlinkConfig may provide each parameter ptrs-MCS$_i$, (i=1,2,3,4). The time density values in Table 41 are merely an example, and it is possible to express the values in a more generalized relationship as shown below in Table 42, and in which it may be possible for A, B, C, and D to have positive values and a relationship of A>B>C>D. In Table 42, it may be possible that only at least one value of A, B, C, and D exists, and therefore, that only at least some values among ptrs-MCS$_1$, ptrs-MCS$_2$, ptrs-MCS$_3$, ptrs-MCS$_4$, and ptrs-MCS$_5$ exist. As shown below in Table 41, when at least one of parameter values A, B, C, and D corresponding to the time density (or frequency density) is defined to be a value less than 1, since a value of (i−1) L$_{PT-RS}$ or iL$_{PT-RS}$ may not be an integer in [Procedure of time index determination for PT-RS], an additional operation for a PT-RS location may be required. For example, the additional operation may be implemented via a method by which a frequency density is substantially increased.

TABLE 41

| Scheduled MCS | Time density (L$_{PT-RS}$) |
|---|---|
| I$_{MCS}$ < ptrs-MCS$_1$ | PT-RS is not present |
| ptrs-MCS1 ≤ I$_{MCS}$ < ptrs-MCS2 | 4 |
| ptrs-MCS2 ≤ I$_{MCS}$ < ptrs-MCS3 | 2 |
| ptrs-MCS3 ≤ I$_{MCS}$ < ptrs-MCS4 | 1 |
| ptrs-MCS4 ≤ I$_{MCS}$ < ptrs-MCS5 | 0.5 |

TABLE 42

| Scheduled MCS | Time density (L$_{PT-RS}$) |
|---|---|
| I$_{MCS}$ < ptrs-MCS$_1$ | PT-RS is not present |
| ptrs-MCS1 ≤ I$_{MCS}$ < ptrs-MCS2 | A |
| ptrs-MCS2 ≤ I$_{MCS}$ < ptrs-MCS3 | B |
| ptrs-MCS3 ≤ I$_{MCS}$ < ptrs-MCS4 | C |
| ptrs-MCS4 ≤ I$_{MCS}$ < ptrs-MCS5 | D |

In the above description, a PT-RS for a PDSCH has been described for convenience, but a similar operation may be applied to a PUSCH PT-RS. The embodiments of the disclosure may be similarly applied to not only a PDSCH but also a PUSCH, even without being specifically mentioned. However, in a PUSCH PT-RS, the above operations may be performed similarly based on parameter phaseTrackingRS in higher layer signaling DMRS-UplinkConfig, parameters timeDensity and frequencyDensity included in higher layer signaling PTRS-UplinkConfig, and whether transform precoding is enabled/not-enabled.

Unlike PDSCH PT-RS transmission/reception or PUSCH PT-RS transmission/reception of when transform precoding is disabled, a PUSCH PT-RS may require an additional operation when transform precoding is enabled.

In 5G NR, if transform precoding is enabled, a time density of a PUSCH PT-RS is configured to L$_{PT-RS}$=2 by higher layer parameter timeDensityTransformPrecoding, otherwise, the UE considers L$_{PT-RS}$=1. PT-RS r$_m$(m') to be mapped to position m before transform precoding is generated in Equation (11) as follows. (However, m is a value dependent on the number $N_{group}^{PT-RS}$ of PT-RS groups, the numbers $N_{samp}^{group}$ and $M_{sc}^{PUSCH}$ of samples per PT-RS group (Scheduled samp bandwidth for uplink transmission, expressed as a number of subcarriers)):

$$r_m(m') = \frac{w(k')\exp\left(\frac{j\pi}{2}(m \bmod 2)\right)}{\sqrt{2}}[(1-2c(m')) + j(1-2c(m'))], \quad (11)$$

$$m' = N_{samp}^{group} s' + k',$$

$$s' = 0, 1, \ldots, N_{group}^{PT-RS} - 1,$$

$$k' = 0, 1, \ldots, N_{samp}^{group} - 1,$$

Here, c(i) denotes a pseudo-random sequence determined according to the standard, and w(i) denotes a value obtained from an orthogonal sequence as shown below in Table 43.

TABLE 43

| $n_{RNTI}$ mod $N_{samp}^{group}$ | $N_{samp}^{group} = 2$ [w(0) w(1)] | $N_{samp}^{group} = 4$ [w(0) w(1) w(2) w(3)] |
|---|---|---|
| 0 | [+1 +1] | [+1 +1 +1 +1] |
| 1 | [+1 −1] | [+1 −1 +1 −1] |
| 2 | — | [+1 +1 −1 −1] |
| 3 | — | [+1 −1 −1 +1] |

Sequence $r_m(m')$ generated in this way is multiplied by scaling factor β', so as to be mapped to multiple $N_{samp}^{group} N_{group}^{PT-RS}$ symbols. Here, β' denotes a ratio of sizes between one of samp group outermost constellation points a signal constellation for a given modulation scheme (or modulation order) for PUSCH and one of outermost constellation points in a signal constellation for π/2-BPSK. If transform precoding is enabled, and the UE is configured with parameter transformPrecoderEnabled of higher layer signaling PTRS-UplinkConfig, the scaling factor β' is determined based on a scheduled modulation order (or modulation scheme) as shown below in Table 44. If also applicable to 4096 QAM, a value of PT-RS scaling factor β' is 63/$\sqrt{1365}$.

TABLE 44

| Scheduled modulation | PT-RS scaling factor (β') |
|---|---|
| π/2-BPSK | 1 |
| QPSK | 1 |
| 16QAM | 3/$\sqrt{5}$ |
| 64QAM | 7/$\sqrt{21}$ |
| 256QAM | 15/$\sqrt{85}$ |
| 1024QAM | 31/$\sqrt{341}$ |

Embodiment 6

Although briefly described in Embodiment 4, in support of 1024 QAM or 4096 QAM in a downlink or an uplink of a wireless communication system, appropriate RRC signaling information may be defined and used as needed in the system. For example, RRC signaling (e.g., mcs-Table-r18 (19) or mcs-Table-DL-r18 (19)) for indicating use of an MCS table for a PDSCH scheduled by DCI format 1_1 may be present in PDSCH-Config, wherein, if the UE is configured via the RRC signaling set with a parameter corresponding to 4096 QAM, such as "qam4096" (when the UE is configured with an RRC signaling (e.g., mcs-Table-DL-r18) set to "qam4096" in PDSCH-Config), the UE may use a 4096 QAM MCS table for the PDSCH scheduled via DCI format 1_1 to which a CRC scrambled with C-RNTI is applied. If the UE is not configured via RRC signaling to indicate use of the MCS table provided in SPS-Config, the UE may use the 4096 QAM MCS table for the PDSCH scheduled via DCI format 1_1 to which the CRC scrambled with CS-RNTI is applied. With respect to DCI format 1_2, similarly to the above, a 4096 QAM MCS table may also be configured and used.

RRC signaling (e.g., mcs-TableTransformPrecoder-UL-r18 (19) or mcs-Table-UL-r18 (19)) for indicating use of an MCS table for a PUSCH scheduled by DCI format 0_1 may be present in PUSCH-Config, wherein, if the UE is configured via the RRC signaling set with a parameter corresponding to 1024 QAM, such as qam1024 ((in case that UE is configured with an RRC signaling (e.g., mcs-Table-UL-r18) set to qam1024 in PUSCH-Config), the UE may use a 1024 QAM MCS table for the PUSCH scheduled via DCI format 0_1 to which a CRC scrambled with C-RNTI is applied. If the UE is not configured via RRC signaling to indicate use of the MCS table provided in ConfiguredGrantConfig, the UE may use the 1024 QAM MCS table for the PUSCH scheduled via DCI format 0_1 to which the CRC scrambled with CS-RNTI is applied. With respect to DCI format 0_2, similarly to the above, a 1024 QAM MCS table may also be configured and used.

If the wireless communication system supports 1024 QAM or 4096 QAM, whether a UE is able to support 1024 QAM or 4096 QAM should be indicated. For example, in 5G NR, whether the UE supports 1024 QAM or 4096 QAM for PDSCH for FR1 may be indicated using parameter pdsch-1024QAM-FR1 or pdsch-4096QAM-FR1 for only FR1 for each UE of Phy-Parameters from among physical layer parameters. In addition, whether the UE supports 1024 QAM or 4096 QAM for PDSCH for FR2 may be indicated using parameter pdsch-1024QAM-FR2 or pdsch-4096QAM-FR2 for only FR2 for each band of BandNR parameters.

A maximum modulation order to be applied to downlink may be indicated with respect to a carrier for calculation of an (approximated) maximum data rate, based on Equation (7) using FSPC-specific parameter supportedModulationOrderDL of FeatureSetDownlinkPerCC. If the parameter is included, a corresponding serving cell may apply a modulation order greater than (or greater than or equal to) a value indicated in this field. (However, only when the UE supports a modulation order for downlink)

If the parameter is not included, for FR1, the network may use a modulation order indicated in pdsch-256QAM-FR1, pdsch-1024QAM-FR1, or pdsch-4096QAM-FR1. For FR2, the network may use a modulation order indicated for each band. The modulation order indicated for each band refers to its value (8, 10, or 12) when pdsch-256QAM-FR2, pdsch-1024QAM-FR2, or pdsch-4096QAM-FR2 is signaled, and if there is no signaling for a given band, modulation order 6, i.e., 64 QAM, is used.

In the case of PUSCH, if 1024 QAM or 4096 QAM is supported, an indication may be made using parameter pusch-1024QAM or pusch-4096QAM for each band of BandNR parameters in the same manner. A maximum modulation order to be applied to uplink may be indicated with respect to a carrier for calculation of an (approximated) maximum data rate, based on Equation (7) using FSPC-specific parameter supportedModulationOrderUL of FeatureSetUplinkPerCC. If the parameter is included, a corresponding serving cell may apply a modulation order greater than or equal to a value indicated in this field, when the UE supports a modulation order for uplink.

If the parameter is not included, for FR1/FR2, the network may use a modulation order indicated for each band. The modulation order indicated for each band refers to its value (8, 10, or 12) when pusch-256QAM, pusch-1024QAM, or pusch-4096QAM is signaled, and if there is no signaling for a given band, modulation order 6, i.e., 64 QAM, is used.

For reference, "FSPC" indicates that signaling is performed for each feature set and or each component carrier (CC). (FSPC indicates it is signaled per feature set per component carrier (per CC per band per band combination))

Embodiment 7

Figure 10:
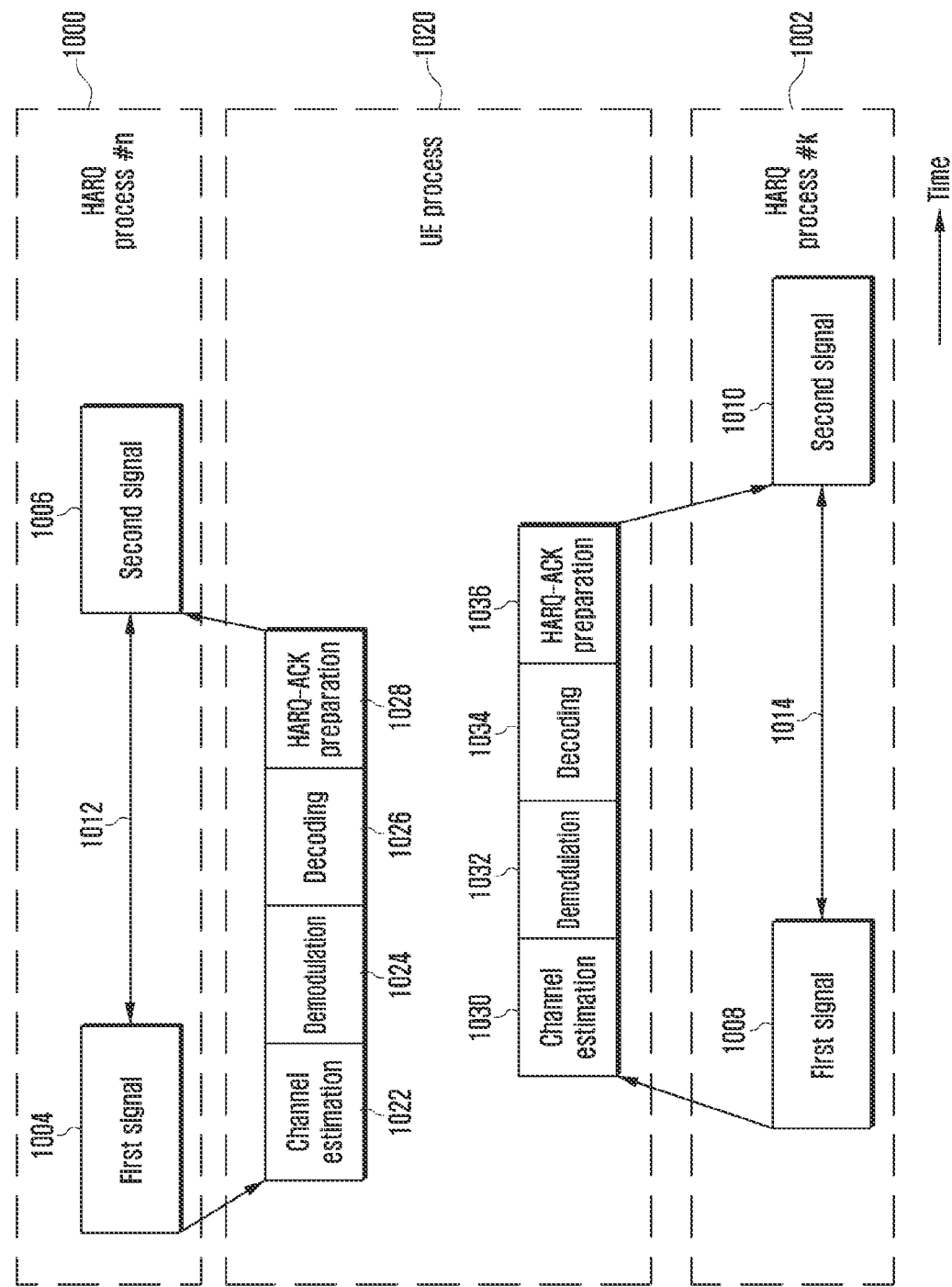
FIG. 10 illustrates processing of a terminal according to generation of multiple hybrid automatic repeat request (HARQ) processes in the wireless communication system according to an embodiment.

FIG. 10 illustrates terminal processing according to occurrence of multiple HARQ processes when a terminal receives a first signal and transmits a second signal corresponding to the first signal in the 5G or NR system according to an embodiment.

In particular, Embodiment 7 discloses a method of determining a processing time when support of 1024 QAM or 4096 QAM is allowed in the 5G or NR system.

Referring to FIG. 10, via an n-th HARQ process 1000, a base station and a terminal transmit or receive a first signal 1004, and the terminal and the base station transmit or receive a second signal 1006 corresponding thereto. More specifically, if a time interval 1012 between the first signal 1004 and the second signal 1006 is greater than or equal to $T_{proc,1}$ (or $T_{proc,2}$), the second signal is transmitted. Otherwise, the terminal may disregard second signal transmission or may perform invalid second signal transmission.

Via a k-th HARQ process 1002, the base station and the terminal transmit or receive a first signal 1008, and the terminal and the base station transmit or receive a second signal 1010 corresponding thereto. More specifically, if a time interval 1014 between the first signal 1008 and the second signal 1010 is greater than or equal to $T_{proc,1}$ (or $T_{proc,2}$), the second signal is transmitted. Otherwise, the terminal may disregard second signal transmission or may perform invalid second signal transmission.

Specifically, UE processing is required for transmitting or receiving the first and second signals of the n-th and k-th HARQ processes within a UE process 1020. For example, a UE process necessary when the first signal is downlink data information and the second signal is HARQ-ACK information may include channel estimation, demodulation, decoding, and HARQ-ACK preparation blocks. It may be general for the terminal to use one of respective blocks regardless of the number of HARQ processes. In this situation, the terminal performs channel estimation 1022, demodulation 1024, decoding 1026, and HARQ-ACK preparation 1028 in order to process the first signal 1004 and the corresponding second signal 1006 of the n-th HARQ process. In addition, the terminal performs channel estimation 1030, demodulation 1032, decoding 1034, and HARQ-ACK preparation 1036 in order to process the first signal 1008 and the corresponding second signal 1010 of the k-th HARQ process.

In the 5G or NR system, the terminal processes the first signal and the corresponding second signal in multiple HARQ processes in pipeline operations. That is, respective blocks constituting the UE process may operate in parallel for each HARQ process as shown in FIG. 4. However, in this case, channel estimation (or demodulation, decoding, or HARQ ACK preparation) for processing of the first signal 1008 of the k-th HARQ process may not be possible until the channel estimation (or demodulation, decoding, or HARQ ACK preparation) for processing of the first signal 1004 of the n-th HARQ process is completed. The terminal is able to support multiple HARQ processes while using a limited amount of resources (e.g., the number or performance of blocks constituting the process, etc.) via a pipeline operation.

In the 5G or NR system, when the base station transmits a PDSCH including downlink data, DCI for scheduling of the PDSCH indicates a $K_1$ value which is a value corresponding to timing information for the terminal to transmit HARQ-ACK information of the PDSCH. Unless the HARQ-ACK information having timing advance included therein is indicated to be transmitted earlier than OFDM symbol $L_1$, the terminal may transmit the HARQ-ACK information to the base station. That is, with the timing advance included, the HARQ-ACK information may be transmitted from the terminal to the base station at the same time point as OFDM symbol $L_1$ or at a time point later than that for OFDM symbol $L_1$. When the HARQ-ACK information with the timing advance included therein is indicated to be transmitted earlier than OFDM symbol $L_1$, the HARQ-ACK information may be invalid HARQ-ACK information in the HARQ-ACK transmission from the terminal to the base station. OFDM symbol $L_1$ may be a first OFDM symbol in which cycle prefix (CP) starts after $T_{proc,1}$ from a last time point of a last OFDM symbol of the PDSCH. $T_{proc,1}$ may be calculated in Equation (12) as follows.

$$T_{proc,1}=((N_1+d_{1,1}+d_{1,2})(2048+144)\cdot\kappa 2^{-\mu})\cdot T_c \quad (12)$$

In Equation (12), $N_1$, $d_{1,1}$, $d_{1,2}$, k, µ, and $T_C$ may be defined as follows.

$N_1$ is based on a value of u presented below in Table 45 and Table 46, and corresponds to µ that generates a largest $T_{proc,1}$ among ($\mu_{PDCCH}$, $\mu_{PDSCH}$, $\mu_{UL}$). That is, µ=min ($\mu_{PDCCH}$, $\mu_{PDSCH}$, $\mu_{UL}$). In the aforementioned expressions, $\mu_{PDCCH}$ refers to subcarrier spacing applied to a PDCCH scheduling. $\mu_{PDSCH}$ refers to subcarrier spacing applied to a scheduled PDSCH. $\mu_{UL}$ refers to subcarrier spacing of an uplink channel on which HARQ-ACK is transmitted.

If HARQ-ACK information is transmitted via a PUCCH (uplink control channel), $d_{1,1}$=0, and if HARQ-ACK information is transmitted via a PUSCH (uplink shared channel, data channel), $d_{1,1}$=1.

When the terminal is configured with carriers or multiple enabled configuration carriers, a maximum timing difference between carriers may be reflected in the second signal transmission.

For PDSCH mapping type A, i.e., when a first DMRS OFDM symbol position is a third or a fourth OFDM symbol in a slot, if a position index i of the last OFDM symbol is less than 7, $d_{1,2}$=7-i. Otherwise, $d_{1,2}$=0.

For PDSCH mapping type B for UE processing capability 1, i.e., when the first DMRS OFDM symbol position is the first OFDM symbol of the PDSCH, $d_{1,2}$=3 if the PDSCH has a length of 4 OFDM symbols, and $d_{1,2}$=3+d if the PDSCH has a length of 2 OFDM symbols, where d is the number of OFDM symbols in which the PDSCH and the PDCCH including a control signal for scheduling of the PDSCH overlap. Otherwise, $d_{1,2}$=0.

For PDSCH mapping type B for UE processing capability 2, i.e., when the first DMRS OFDM symbol position is the first OFDM symbol of the PDSCH, if the PDSCH has a length of 2 or 4 OFDM symbols, $d_{1,2}$ is the number of OFDM symbols in which the PDSCH and the PDCCH including a control signal for scheduling of the PDSCH overlap. Otherwise, $d_{1,2}=0$.

$N_1$ is defined according to u as in Table 45 or Table 46 below. μ=0, 1, 2, and 3 refer to subcarrier spacings of 15 kHz, 30 kHz, 60 kHz, and 120 kHz, respectively. Table 45 below is a PDSCH processing time for UE processing capability 1 (PDSCH processing time for PDSCH processing capability 1), and Table 46 below is a PDSCH processing time for the UE processing capability 2 (PDSCH processing time for PDSCH processing capability 2).

TABLE 45

| | PDSCH decoding time N1 [symbols] | |
|---|---|---|
| μ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

TABLE 46

| | PDSCH decoding time N1 [symbols] | |
|---|---|---|
| μ | No additional PDSCH DM-RS configured | Additional PDSCH DM-RS configured |
| 0 | 3 | 13 |
| 1 | 4.5 | 13 |
| 2 | 9 for FR 1 | 20 |

The $N_1$ values described above may be used as in Table 45 or Table 46 according to UE capability.

$T_c=1/\Delta f_{max}\cdot N_f$, $\Delta f_{max}=480\times10^3$ Hz, $N_f=4096$, $T_s/T_c=64$, $T_s=1/\Delta f_{ref}\cdot N_{f,ref}$, $\Delta f_{ref}=15\times10^3$ Hz, and $N_{f,ref}=2048$ are defined respectively.

In the 5G or NR system, when the base station transmits control information including uplink scheduling approval, the terminal may indicate a $K_2$ value corresponding to timing information for transmission of PUSCH or uplink data.

Unless the PUSCH having timing advance included therein is indicated to be transmitted earlier than OFDM symbol $L_2$, the terminal may transmit the PUSCH to the base station. That is, with the timing advance included, the PUSCH may be transmitted from the terminal to the base station at the same time point as OFDM symbol $L_2$ or at a time point later than that for OFDM symbol $L_1$. If the PUSCH having timing advance included therein is indicated to be transmitted earlier than OFDM symbol $L_2$, the terminal may disregard uplink scheduling grant control information from the base station. OFDM symbol $L_2$ may be a first OFDM symbol in which cycle prefix (CP) of a PUSCH OFDM symbol to be transmitted starts $T_{proc,2}$ after the last time point of the last OFDM symbol of the PDCCH. $T_{proc,2}$ may be calculated as in Equation (13) below.

$$T_{proc,2}=\max\{(N_2+d_{2,1}+d_{2,2})(2048+144)\cdot\kappa 2^{-\mu}\cdot T_c, d_{2,3}\} \quad (13)$$

In Equation (12), $N_2$, $d_{2,1}$, $d_{2,2}$, $d_{2,3}$, k, μ, and $T_C$ may be defined as follows.

$N_2$ is based on a value of μ presented below in Table 47 and Table 48, and corresponds to μ that generates a largest $T_{proc,1}$ in ($\mu_{DL}$, $\mu_U$). That is, $\mu=\min(\mu_{DL}, \mu_U)$. In the aforementioned expressions, $\mu_{DL}$ refers to subcarrier spacing in which the PDSCH including DCI for scheduling of the PUSCH is transmitted. $\mu_{UL}$ refers to subcarrier spacing of an uplink channel on which the PUSCH is transmitted.

If a first OFDM symbol among OFDM symbols allocated to the PUSCH includes only a DMRS, $d_{2,1}=0$, otherwise, $d_{2,1}=1$.

HARQ-ACK is multiplexed in the PUSCH scheduled as described above, $d_{2,2}=1$, and otherwise, $d_{2,2}=0$.

When the terminal is configured with carriers or multiple enabled configuration carriers, a maximum timing difference between carriers may be reflected in the second signal transmission.

If DCI indicating bandwidth part (hereinafter, BWP) switching is scheduled, $d_{2,3}$ refers to a time required for the BWP switching. Otherwise, $d_{2,3}=0$.

$N_2$ is defined according to u as in Table 47 or Table 48 below. μ=0, 1, 2, and 3 refer to subcarrier spacings of 15 kHz, 30 kHz, 60 kHz, and 120 kHz, respectively. Table 47 is a PUSCH preparation time for UE processing capability 1, and Table 48 is a PUSCH preparation time for UE processing capability 1 for UE processing capability 2.

TABLE 47

| μ | PUSCH preparation time (PUSCH preparation time) N2 [symbols] |
|---|---|
| 0 | 10 |
| 1 | 12 |
| 2 | 23 |
| 3 | 36 |

TABLE 48

| μ | PUSCH preparation time (PUSCH preparation time) N2 [symbols] |
|---|---|
| 0 | 3 |
| 1 | 4.5 |
| 2 | 9 for FR1 |

The $N_2$ values described above may be used as in Table 47 or Table 48 according to UE capability.

$T_c=1/\Delta f_{max}\cdot N_f$, $\Delta f_{max}=480\times10^3$ Hz, $N_f=4096$, $T_s/T_c=64$, $T_s=1/\Delta f_{ref}\cdot N_{f,ref}$, $\Delta f_{ref}=15\times10^3$ Hz, and $N_{f,ref}=2048$ are defined respectively.

Since a terminal supporting 1024 QAM or 4096 QAM needs to process a larger transport block size (TBS) than a terminal supporting 64 QAM or 256 QAM, a slightly more processing time than the minimum terminal processing of existing Equation (12) or Equation (13) may be required.

Therefore, Equation (12) or Equation (13) may be applied to a terminal supporting 1024 QAM or 4096 QAM with a modified equation as shown in Equation (14) or Equation (15), as follows.

$$T_{proc,1}=((N_1+d_{1,1}+d_{1,2}+d_{1,3})(2048+144)\cdot\kappa 2^{-\mu})\cdot T_c \quad (14)$$

$$T_{proc,2}=\max\{((N_2+d_{2,1}+d_{2,2}+d_{2,3})(2048+144)\cdot\kappa 2^{-\mu})\cdot T_c, d_{2,3}\} \quad (15)$$

Most of the variables included in Equation (14) and Equation (15) are the same as those described in Equation (12) and Equation (13). In Equation (14) and Equation (15), $d_{1,3}$ and $d_{2,3}$ may have 0 or positive integer value d". As for positive integer value d", a specific value or a set of values may be determined according to terminal capability.

For example, when the terminal reports a value of 1 as the UE capability, $d_{1,3}$ or $d_{2,3}$ may have a value of 1. For the terminal capability, $d_{1,3}$ and $d_{2,3}$ can be indicated separately or simultaneously. For values of $d_{1,3}$ and $d_{2,3-}$, positive integer values determined according to the UE capability report may always be applied regardless of scheduling, or may be applied only if a specific MCS table is applied or a specific MCS value is applied. Alternatively, at least a part of the combinations thereof may be applied.

For example, if an MCS table indicated by a DCI format includes 1024 QAM or 4096 QAM, the terminal considers $d_{1,3}$ or $d_{2,3-}$ to be a positive integer value and if an MCS table indicated by a DCI format does not include 1024 QAM and 4096 QAM, the terminal considers $d_{1,3}$ or $d_{2,3-}$ to be 0.

If an MCS value indicated by a DCI format is 1024 QAM or 4096 QAM, the terminal considers $d_{1,3}$ or $d_{2,3-}$ to be a positive integer value and if an MCS value indicated by a DCI format is not 1024 QAM and 4096 QAM, the terminal considers $d_{1,3}$ or $d_{2,3-}$ to be 0. 1024 QAM or 4096 QAM is merely an example, and other values with different modulation orders are also sufficiently applicable.

A DCI format for determining $d_{1,3-}$ is a DCI format for scheduling of a PDSCH, and a DCI format for determining $d_{2,3-}$ is a DCI format for scheduling of a PUSCH. It may be possible that UE capabilities for determination of values of $d_{1,3-}$ and $d_{2,3}$ exist separately. It may be possible that higher signals for determination of values of $d_{1,3-}$ and $d_{2,3}$ exist separately. $d_{1,3-}$ and $d_{2,3}$ may be applied only if $N_1$ and $N_2$ are configured to respective specific UE processing capability values.

For example, if $N_1$ is configured to UE processing capability 2, the terminal applies Equation (14) including $d_{1,3-}$ to a PDSCH processing time, and if $N_1$ is not configured to UE processing capability 2, the terminal applies Equation (12), which is not included in $d_{1,3-}$, to the PDSCH processing time, or considers the value of $d_{1,3-}$ to be 0 in Equation (14). For example, if $N_2$ is configured to UE processing capability 2, the terminal applies Equation (15) including $d_{2,3-}$ to a PUSCH preparation time, and if $N_2$ is not configured to UE processing capability 2, the terminal applies Equation (13), which is not included in $d_{2,3-}$, to the PUSCH preparation time, or considers the value of $d_{2,3-}$ to be 0 in Equation (15).

Alternatively, limited to Equation (12) or Equation (13), when values of $N_1$ or $N_2$ are configured to UE processing capability 2 by respective higher signals, if the MCS table included in the DCI format for scheduling of the PDSCH or PUSCH includes 1024 QAM or 4096QAM, or if the MCS index indicated by the DCI format is 1024 QAM or 4096 QAM, the terminal may consider that the values of $N_1$ or $N_2$ fall back to a value associated with UE processing capability 1 rather than a value associated with UE processing capability 2. Alternatively, limited to Equation (12) or Equation (13), when values of $N_1$ or $N_2$ are configured to UE processing capability 2 by respective higher signals, if the MCS table included in the DCI format for scheduling of the PDSCH or PUSCH includes 1024 QAM or 4096QAM, the terminal may consider that the values of $N_1$ or $N_2$ fall back to a value associated with UE processing capability 1 rather than a value associated with UE processing capability 2. 1024 QAM is merely an example, and values of other different modulation orders are sufficiently applicable. For example, in a situation where $\mu=0$, and the terminal has been configured with processing capability 2 for the PDSCH, the terminal considers a value of $N_2$ for calculation of a minimum PDSCH processing time to be 3 as shown in Table 45. However, if the MCS index value indicated by the DCI format for scheduling of the PDSCH indicates 1024 QAM or 4096 QAM, The terminal may consider the value of $N_2$ for calculation of the minimum PDSCH processing time to be 8 as shown in Table 45. The operation, in which values of $N_1$ or $N_2$ fall back from processing capability 2 to processing capability 1, may be applied by, in addition to the MCS index described above, an MCS table, the size of a scheduled frequency resource area, the size of a scheduled time resource area, an MCS index threshold, CQI table configuration information, or other specific value in a field within a DCI format, or it may be sufficiently possible that the fallback operation occurs by at least some combinations of the contents described above.

Fallback is not performed in other cases. Some of the aforementioned variables in Equation (12) to Equation (15) may not exist or may be applied by being replaced with other terms. In summary, regardless of UE processing time capability according to an MCS table or an MCS index value indicated by a higher signal or a DCI format (or by limiting to specific UE processing time capability), it may be possible that the terminal considers or does not consider a processing time margin value, such as $d_{1,3-}$ and $d_{2,3}$, as shown in Equation (14) or Equation (15). The processing time margin value may be a value previously reported by the UE capability or may be considered to be a fixed value, such as 1, at all times.

Alternatively, by limiting to specific UE processing time capability according to an MCS table or an MCS index value indicated by a higher signal or a DCI format, it may be possible that the terminal considers or does not consider a processing time margin value, such as $d_{1,3-}$ and $d_{2,3}$, as shown in Equation (14) or Equation (15). The processing time margin value may be a value previously reported by the UE capability or may be considered to be a fixed value, such as 1, at all times.

Based on Embodiment 7, the terminal may have different processing times according to different MCS tables or MCS values having different modulation or code rates. Therefore, the base station may provide the terminal with an appropriate processing preparation time.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to embodiments of the disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), Wide LAN (WLAN), and storage area network (SAN) or a combination thereof. Such a storage device may access the electronic device via an external port. Further, a separate storage device on the communication network may access a portable electronic device.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. A method performed by a terminal in a wireless communication system, the method comprising:
   receiving, from a base station, channel state information (CSI) report configuration information including a channel quality indicator (CQI) table-related parameter;
   identifying a CQI table to be used based on the CQI table-related parameter; and
   transmitting, to the base station, a CQI index using the CQI table,
   wherein a maximum modulation scheme of the CQI table is 4096 quadrature amplitude modulation (QAM), and
   wherein the COI table includes a COI index entry in which a modulation scheme is 4096 QAM and a code rate is 869/1024.

2. The method of claim 1, wherein the COI table includes a CQI index entry in which a modulation scheme is 4096 QAM and a code rate is 948/1024.

3. The method of claim 1, wherein the CQI table does not include a CQI index entry in which a modulation scheme is quadrature phase shift keying (QPSK).

4. The method of claim 1, further comprising:
   receiving, from the base station, downlink control information (DCI) including a modulation and coding scheme (MCS) field; and
   determining a modulation order and a target code rate for a downlink data based on the MCS field in the DCI and an MCS table,
   wherein the MCS table is identified based on an MCS table-related parameter received from the base station, and
   wherein a maximum modulation order of the MCS table is 12.

5. The method of claim 4, wherein the MCS table includes at least one of:
   an MCS index entry in which a modulation order is 12 and a target code rate is 829.5/1024,
   an MCS index entry in which a modulation order is 12 and a target code rate is 869/1024,
   an MCS index entry in which a modulation order is 12 and a target code rate is 908.5/1024, or
   an MCS index entry in which a modulation order is 12 and a target code rate is 948/1024.

6. A method performed by a base station in a wireless communication system, the method comprising:
   determining a channel quality indicator (CQI) table to be used for a terminal;
   transmitting, to the terminal, channel state information (CSI) report configuration information including a CQI table-related parameter indicating the CQI table; and
   receiving, from the terminal, a CQI index associated with the CQI table,
   wherein a maximum modulation scheme of the CQI table is 4096 quadrature amplitude modulation (QAM), and
   wherein the COI table includes a COI index entry in which a modulation scheme is 4096 QAM and a code rate is 869/1024.

7. The method of claim 6, wherein the CQI table includes a CQI index entry in which a modulation scheme is 4096 QAM and a code rate is 948/1024.

8. The method of claim 6, wherein the CQI table does not include a CQI index entry in which a modulation scheme is quadrature phase shift keying (QPSK).

9. The method of claim 6, further comprising:
   determining a modulation and coding scheme (MCS) table to be used for the terminal; and
   transmitting, to the terminal, downlink control information (DCI) including an MCS field associated with the MCS table,
   wherein an MCS table-related parameter indicating the MCS table is transmitted to the terminal, and
   wherein a maximum modulation order of the MCS table is 12.

10. The method of claim 9, wherein the MCS table includes at least one of:
    an MCS index entry in which a modulation order is 12 and a target code rate is 829.5/1024,
    an MCS index entry in which a modulation order is 12 and a target code rate is 869/1024,
    an MCS index entry in which a modulation order is 12 and a target code rate is 908.5/1024, or
    an MCS index entry in which a modulation order is 12 and a target code rate is 948/1024.

11. A terminal in a wireless communication system, the terminal comprising:
    a transceiver; and
    a controller configured to:
      receive, from a base station via the transceiver, channel state information (CSI) report configuration information including a channel quality indicator (CQI) table-related parameter,
      identify a CQI table to be used based on the CQI table-related parameter, and
      transmit, to the base station via the transceiver, a CQI index using the CQI table,
    wherein a maximum modulation scheme of the CQI table is 4096 quadrature amplitude modulation (QAM), and
    wherein the COI table includes a COI index entry in which a modulation scheme is 4096 OAM and a code rate is 869/1024.

12. The terminal of claim 11, wherein the CQI table includes a CQI index entry in which a modulation scheme is 4096 QAM and a code rate is 948/1024.

13. The terminal of claim 11, wherein the CQI table does not include a CQI index entry in which a modulation scheme is quadrature phase shift keying (QPSK).

14. The terminal of claim 11, wherein the controller is further configured to:
    receive, from the base station via the transceiver, downlink control information (DCI) including a modulation and coding scheme (MCS) field, and
    determine a modulation order and a target code rate for a downlink data based on the MCS field in the DCI and an MCS table,
    wherein the MCS table is identified based on an MCS table-related parameter received from the base station, and
    wherein a maximum modulation order of the MCS table is 12.

15. The terminal of claim 14, wherein the MCS table includes at least one of:
    an MCS index entry in which a modulation order is 12 and a target code rate is 829.5/1024, an MCS index entry in which a modulation order is 12 and a target code rate is 869/1024, an MCS index entry in which a modulation order is 12 and a target code rate is 908.5/1024, or an MCS index entry in which a modulation order is 12 and a target code rate is 948/1024.

16. A base station in a wireless communication system, the base station comprising:

a transceiver; and a controller configured to:

determine a channel quality indicator (CQI) table to be used for a terminal, transmit, to the terminal via the transceiver, channel state information (CSI) report configuration information including a CQI table-related parameter indicating the CQI table, and receive, from the terminal via the transceiver, a CQI index associated with the CQI table, wherein a maximum modulation scheme of the CQI table is 4096 quadrature amplitude modulation (QAM), and wherein the COI table includes a COI index entry in which a modulation scheme is 4096 OAM and a code rate is 869/1024.

17. The base station of claim 16, wherein the CQI table includes a CQI index entry in which a modulation scheme is 4096 QAM and a code rate is 948/1024.

18. The base station of claim 16, wherein the CQI table does not include a CQI index entry in which a modulation scheme is quadrature phase shift keying (QPSK).

19. The base station of claim 16, wherein the controller is further configured to:

determine a modulation and coding scheme (MCS) table to be used for the terminal, and transmit, to the terminal via the transceiver, downlink control information (DCI) including an MCS field associated with the MCS table, wherein an MCS table-related parameter indicating the MCS table is transmitted to the terminal, and wherein a maximum modulation order of the MCS table is 12.

20. The base station of claim 19, wherein the MCS table includes at least one of:

an MCS index entry in which a modulation order is 12 and a target code rate is 829.5/1024, an MCS index entry in which a modulation order is 12 and a target code rate is 869/1024, an MCS index entry in which a modulation order is 12 and a target code rate is 908.5/1024, or an MCS index entry in which a modulation order is 12 and a target code rate is 948/1024.

* * * * *